(12) United States Patent
Enomoto

(10) Patent No.: US 7,383,936 B2  
(45) Date of Patent: Jun. 10, 2008

(54) CONVEYING APPARATUS

(75) Inventor: Masahiro Enomoto, Shiga (JP)

(73) Assignee: Daifuku Co., Ltd. (JP)

(*) Notice: Subject to any disclaimer, the term of this patent is extended or adjusted under 35 U.S.C. 154(b) by 0 days.

(21) Appl. No.: 11/716,903

(22) Filed: Mar. 12, 2007

(65) Prior Publication Data

US 2007/0215436 A1 Sep. 20, 2007

(30) Foreign Application Priority Data

Mar. 15, 2006 (JP) .............................. 2006-070066
Mar. 15, 2006 (JP) .............................. 2006-070067
Mar. 15, 2006 (JP) .............................. 2006-070068

(51) Int. Cl.
*B65G 47/46* (2006.01)

(52) U.S. Cl. .............................................. 198/370.02

(58) Field of Classification Search ........... 198/370.01, 198/370.02, 370.07
See application file for complete search history.

(56) References Cited

U.S. PATENT DOCUMENTS

| | | | |
|---|---|---|---|
| 5,127,510 A * | 7/1992 | Cotter et al. .......... | 198/370.02 |
| 5,595,279 A * | 1/1997 | Wilkins et al. ........ | 198/370.02 |
| 5,613,591 A * | 3/1997 | Heit et al. ............ | 198/370.02 |
| 6,860,376 B1 * | 3/2005 | Heit et al. ............ | 198/370.02 |
| 6,910,567 B2 * | 6/2005 | Van Den Goor ....... | 198/370.02 |
| 2004/0089513 A1 * | 5/2004 | Van Den Goor ....... | 198/370.02 |
| 2005/0241911 A1 * | 11/2005 | Veit ...................... | 198/370.02 |

FOREIGN PATENT DOCUMENTS

| | | |
|---|---|---|
| EP | 0 784 025 | 7/1997 |
| EP | 1 707 511 | 10/2006 |
| JP | 04-144827 | 5/1992 |
| JP | 06-155680 | 4/1994 |
| JP | 2002-370820 | 12/2002 |
| JP | 2003-128235 | 5/2003 |

OTHER PUBLICATIONS

EPO Form 1503, Partial European Search Report (corresponding European App. No. EP 07 00 4234), 1 page.

* cited by examiner

*Primary Examiner*—James R Bidwell
(74) *Attorney, Agent, or Firm*—Kusner & Jaffe

(57) ABSTRACT

When a pulling force acts on an insertion joint in a conveying apparatus used for transferring an article conveyed on a main conveying path to a branch conveying path, an endless chain separates from an article support body and the joint state is disrupted. By contrast, when a collar section abuts against an outer end surface on the side of a moving member, an outward concave section inwardly separates from an inclined expanding surface and a tongue piece section can be withdrawn against the elasticity thereof. When the collar section separates from the outer end surface, the outward convex section abuts against the inclined expanding surface and the withdrawal movement of the tongue piece section against the elasticity thereof is prevented. As a result, a strong joint state can be maintained at all time, while ensuring that the endless rotary body and moving member are easily linked and disengaged.

17 Claims, 29 Drawing Sheets

F I G. 14
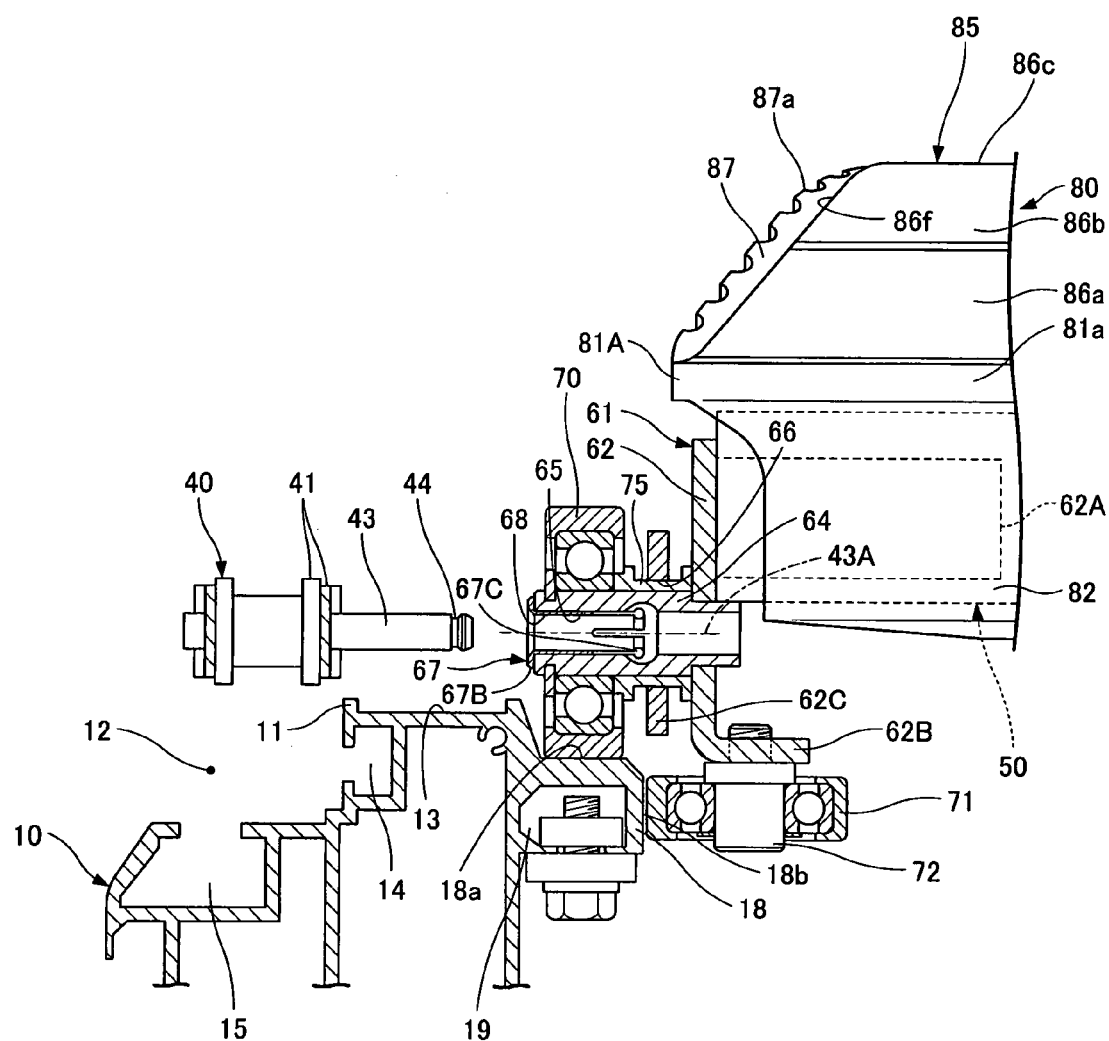

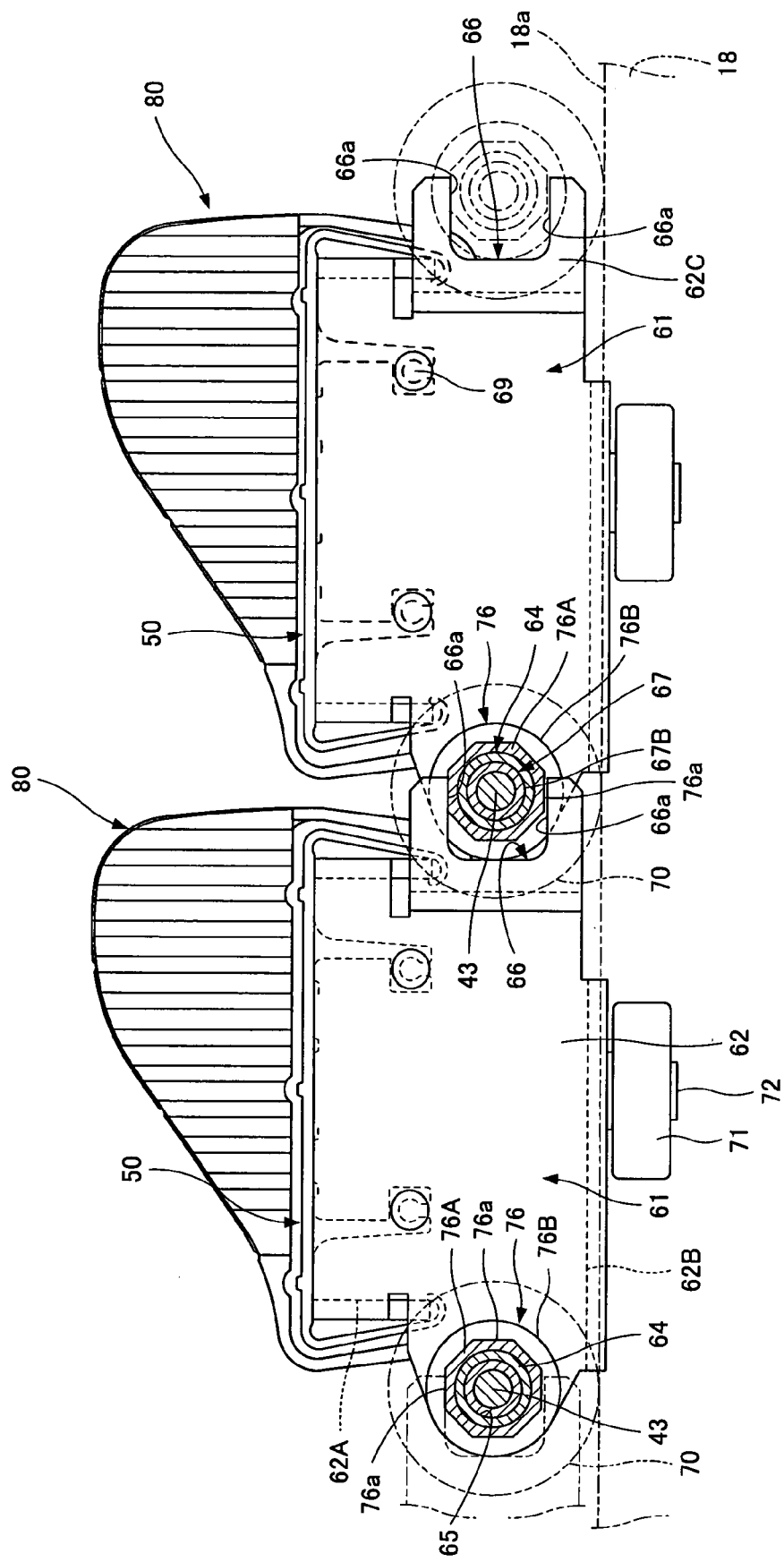

CONVEYING APPARATUS

FIELD OF THE INVENTION

The present invention relates to a conveying apparatus suitable for transferring articles conveyed, for example, on a main conveying path to a branch conveying path provided outwardly at a side of the main conveying path.

BACKGROUND OF THE INVENTION

Japanese Patent Application Laid-open No. 2003-128235 discloses a conveying apparatus for transferring articles. A large number of article support bodies oriented in the direction perpendicular to a main conveying path are attached between a pair of left and right endless rotary bodies installed along the main conveying path, a guided body is provided at the rear surface side of article sidewise push bodies that are guided by the article support bodies, and a guide device is provided for guiding the guided body. The endless rotary bodies are of an endless chain system and special linking pins are provided inwardly at the endless rotary bodies. Side members are provided at both ends of the article support bodies and the special linking pins are inserted into and joined with tubular linking sections formed in the side members, whereby both ends of the article support bodies are linked to the endless chain via the respective side members. Furthermore, a mating section that can be externally fitted onto the linking section of the adjacent side member is formed at the other end of the side member.

The linking portions located between the side members are configured by taking into account assemblability and maintainability and also so that they can extend or contract with respect to each other and bend with respect to each other in a reversal section at the start and finish ends of the main conveying path. Thus, a large-diameter portion is formed in the tubular linking section and the mating section is formed as a recess that is open on both, inner and outer, sides and outwardly on the other side. As a result, the circumferential surface of the large-diameter portion is mated with a pair of parallel mating surfaces in the mating section in a state of point contact (linear contact in the left-right direction) in the side view thereof.

However, with the above-described conventional configuration, the article support bodies are linked to the endless chain by inserting the special linking pins and joining them to linking sections of the side member, and such a joint state is difficult to maintain. Thus, for example, when the article support body or endless chain vibrates in the lateral direction and a pull-out force acts at the insertion and joining section, the endless chain withdraws from the article support body and the joint state is disrupted. As a result, the endless chain cannot rotate smoothly, and there is a risk of noise generation by the play or separation from the sprockets.

Furthermore, in the portion where the circumferential surface is in point contact (linear contact) with a flat mating surface, a gap is necessary to provide for smooth extension-contraction or bending in the reversal section. Due to such a gap in the point contact portion, noise is generated by play in the reversal section. Furthermore, the portions of the circumferential surface that are in point contact are easily worn out by repeated extension-shrinkage movement or bending movement, thereby enlarging the gap and increasing the noise produced by play.

Yet another conventional configuration of a conveying apparatus is described in Japanese Patent Application Laid-open No. 6-115680. In this configuration, the linking shaft that links the links in a chain has a large protrusion length. A mounting member is attached to the end surface of a slat, and the linking shaft of the chain is inserted and fixed in a tubular section formed in the plate section of the mounting members. As a result, a large number of slats are attached between a pair of left and right chains, and shoes are provided that are externally fitted on the slats and guided thereby. In a shoe, a face surface section, a rear surface section, and a front surface section are formed integrally, and mounting surface sections with a rear side inclined inwardly are formed at an inclination angle of 30 degrees at both sides of the rear portion of the face surface section. Buffer members made from a urethane resin are detachably attached to the mounting surface sections.

However, with the above-described other conventional configuration, the slats are linked to the chain by inserting and fixing the linking shaft in the tubular section of the mounting member, and such a joint state is difficult to maintain. Thus, for example, when the slat or chain vibrates in the lateral direction and a pull-out force acts at the insertion and fixing section, the chain withdraws from the slat and the joint state is disrupted. As a result, the chain cannot rotate smoothly, and there is a risk of noise generation by the play or separation from sprockets.

Further, because the buffer member is attached only to both sides of the rear portion of the face surface section of the shoe, a gap appears between the rear end of the buffer member provided at a shoe positioned in front and a front end of the buffer member provided at the shoe positioned behind. As a result, in particular, in the case of small articles, the pushing surfaces of the buffer members abut against the eccentric positions (eccentric locations) and the distribution of the articles cannot be performed with good stability. To resolve this problem, a shoe can be increased in size to decrease the front-rear spacing of the shoes (the front-rear gap), but when the shoes themselves are increased in size, there is a risk of clasping an article between the rearmost shoe that advances forward at a side and a front most shoe that is distributed and moves sidewise.

SUMMARY OF THE INVENTION

Accordingly, it is a first object of the present invention to provide a conveying apparatus that allows a strong joined state to be maintained at all times, while ensuring that linking and separation (unlinking) of endless rotary bodies and moving members can be performed in an easy manner.

It is a second object of the present invention to provide a conveying apparatus that can reduce noise produced by unsteadiness in a reversal section and also decrease wear in the contact portions.

Further, it is a third object of the present invention to provide a conveying apparatus in which front-rear spacing of article sidewise push bodies can be decreased and clasping of articles can be reduced.

In order to attain the first object, the first present invention provides a conveying apparatus configured to comprise an insertion hole section in the direction perpendicular to the rotation direction of an endless rotary body is formed at a side of a moving member linked to the endless rotary body, an inclined expanding surface that has a diameter increasing inwardly is formed at the inner side of the insertion hole section in the insertion direction thereof, a tubular linking body that can be inserted into the insertion hole section is provided, a collar section that can abut against an outer end surface of the moving member side is formed at the outer end of a tubular section of the tubular linking body, an inner end forming portion of the tubular section is formed as a plurality of tongue piece sections split in the circumferential direction, a protruding section that protrudes from the endless rotary body side is configured to be freely inserted from the outside into the tubular section of the tubular linking body, an annular concave section is formed at the inner end portion of the protruding section, the inner side of the annular concave section is formed as an inclined surface that has a diameter increasing inwardly, an outward convex section that can be set opposite the inclined expanding surface from the inside and an inward convex section that can be elastically engaged with the annular concave section are formed at the tongue piece section, when the collar section is abutted against the outer end surface on the side of the moving member the outward convex section is inwardly separated from the inclined expanding surface and the tongue piece section can be withdrawn against the elasticity thereof, and when the collar section is separated from the outer end surface the outward convex section is abutted against the inclined expanding surface, thereby preventing the withdrawal motion of the tongue piece section against the elasticity thereof.

With the above-described configuration of the first present invention, the tubular linking body is inserted from the outside into the insertion hole section located at the moving member, and this insertion is performed, while the group of tongue piece sections are deformed against the elasticity thereof toward the tubular shaft center and the group of outward convex sections is caused to slide over the inner peripheral surface of the insertion hole section. As, a result of such an insertion, the collar section can be positioned by being abutted against the outer end surface of the moving member, the outward convex sections of the group of tongue piece sections can be set opposite the inclined expanding surface from inside thereof via a withdrawal space and engaged therewith, and the tubular linking body can be linked by internal fitting to the moving member, whereby the tubular linking body can be set.

After the protruding section and the tubular section of the tubular linking body have been set opposite each other, the protruding section is inserted from the outside into the tubular section, and when this insertion becomes close to completion, the distal end of the protruding section can be brought into contact with the group of the inward convex sections. Since at this time the outward convex section is withdrawn inwardly via a withdrawal space with respect to the inclined expanding surface, the group of tongue piece sections are deformed against the elasticity thereof in the direction of withdrawing from the tubular shaft center and, therefore, the insertion of the protruding section can be performed, while causing the group of inward convex sections to slide over the outer peripheral surface of the distal end of the protruding section. Further, by elastically engaging the inward convex sections of the group of tongue piece sections with the annular concave section, the protruding section can be joined to the tubular linking body, whereby the moving body can be joined to the endless rotary body. Therefore, the insertion (linking) of the protruding section from the outside can be performed rapidly, in an easy manner, and with good operability.

Further, when a force acts so as to withdraw the endless rotary body and moving member from each other, that is, when a force acts in the direction of pulling the protruding section and moving member from one another due to a malfunction or secondary accident during the operation in which the moving member is moved by the rotation of the endless rotary body, the group of outward convex sections of the tubular linking body that will be pulled out together with the protruding section will abut against the inclined expanding surface, and the pull-out movement of the protruding section with respect to the tubular linking body can be prevented. Thus, a strong joint state of the protruding section and moving member can be advantageously maintained at all times, and the protruding section and moving member can be prevented from being pulled out with respect to each other, whereby the malfunction or secondary accident can be automatically prevented from spreading.

Further, in order to perform a repair in which the moving member is replaced or an inspection operation, first, in a state in which the protruding section is joined to the moving member, an external force causing the abutment against the outer end surface of the moving member is applied to the collar section, and the outward convex sections of the group of tongue piece sections is set opposite the inclined expanding surface from inside thereof via a withdrawal space therefrom. If the protruding section is pulled out, while maintaining the above-described state, the inclined surface is brought into contact with the group of inward convex sections, and the group of tongue piece sections is deformed in the direction of withdrawal against the elasticity thereof from the tubular shaft center. At this time, because the outward convex section faces the inclined expanding surface from inside thereof via the withdrawal space, the deformation of the group of the tongue piece sections against the elasticity thereof proceeds without any obstacle and, therefore, the protruding section can be pulled out, while leaving the tubular linking body at the moving member. Thus, similarly to the operation of inserting (linking) the protruding section from the outside, the operation of pulling out (unlinking) the protruding section can be performed rapidly in an easy manner and with good operability.

In the first preferred embodiment of the conveying apparatus of the first present invention, the endless rotary bodies are installed as a pair of left and right bodies along a main conveying path, and a large number of the moving members, for which a direction perpendicular to the main conveying path is taken as a lengthwise direction, are attached between these endless rotary bodies.

With the first preferred embodiment, a large number of the moving members for which a direction perpendicular to the main conveying path is a lengthwise direction can be attached between a pair of left and right endless rotary bodies and a group of the moving members can be moved on the main conveying path by the rotation of the two endless rotary bodies.

In the second preferred embodiment of the conveying apparatus of the first present invention, the moving members are article support bodies.

With the second preferred embodiment, the articles supplied on a group of the article support bodies in a start-end section can be conveyed by moving the group of the article support bodies by the rotation of the endless rotary bodies.

In the third preferred embodiment of the conveying apparatus of the first present invention, article sidewise push bodies that are fitted externally on the article support bodies and guided in the lengthwise direction are provided.

With the third preferred embodiment, the articles supplied on a group of the article support bodies in a start-end section can be conveyed by moving the group of the article support bodies by the rotation of the endless rotary bodies, and the articles can be pushed sidewise and delivered outwardly on a side section by moving the article sidewise push bodies in the lengthwise direction of the article support bodies.

In the fourth preferred embodiment of the conveying apparatus of the first present invention, a side bracket is provided at the moving member, and a tubular body having on the side of an insertion hole section formed therein is provided at the side bracket.

With the fourth preferred embodiment, the tubular linking body can be set at the side bracket by inserting the tubular linking body from the outside into the insertion hole section of the tubular body, and the moving member can be linked to the endless rotary body via the side bracket by inserting the protruding section from the outside into the insertion hole section of the tubular linking body. Further, the protruding section can be pulled out to the outside, while leaving the tubular linking body at the side bracket.

In the fifth preferred embodiment of the conveying apparatus of the first present invention, the endless rotary body is formed of an endless chain, and the protruding section is configured by an elongated linking pin that is formed by causing a predetermined linking pin, from amongst a group of linking pins that perform linking between links, to protrude inwardly.

With the fifth preferred embodiment, the moving member is linked to the endless chain by inserting the predetermined elongated linking pin in the endless chain into the tubular section of the tubular linking section and joining the elongated linking pin to the tubular section.

In order to attain the second object, the second present invention provides a conveying apparatus comprising a pair of left and right endless rotary bodies installed along a main conveying path and a large number of article support bodies that are attached between the endless rotary bodies and have a direction perpendicular to the main conveying path as a lengthwise direction thereof, two ends of the article support body are linked to the endless rotary body via respective side brackets, a linking section for linking to the endless rotary body is provided protruding outwardly at one of front and rear sections at the outer surface side of these side brackets, a mated body is externally fitted on the linking section so that the mated body can rotate thereon, a mating section in the form of a recess that is open on both inner and outer sides and outwardly on the other side is formed at the other side bracket, this mating section is configured to be freely fitted externally on the mated body in the adjacent side bracket, and the mated body and mating section are mated to slide freely with respect to each other in the rotation direction of the endless rotary body due to surface contact.

With the configuration of the second invention described hereinabove, linking between the front and rear side brackets can be performed by bringing the mating section of the side bracket close to the mated section of the adjacent side bracket and mating the mating section and the mated body by surface contact. Further, an article supported on the group of article support bodies in the start-end section can be conveyed on the main conveying path by moving the group of the article support bodies on the main conveying path by the movement of both endless rotary bodies during the operation. When reversal is performed during such an operation, the front and rear side brackets are extended or contracted with respect to each other and also bent with respect to each other in the rotation direction of the endless rotary body. This relative extension and contraction makes it possible to reduce noise caused by unsteadiness in the reversal section, without increasing the structure in size or degrading the assemblability or maintainability, by causing the mated body and mating body to slide with respect to each other in a state of surface contact. Further, the extension and contraction based on the surface contact reduced wear in the contact portions and improved reliability. This relative bending can be performed smoothly due to relative rotation of the linking section and mated body.

In the first preferred embodiment of the conveying apparatus of the second present invention, the outer periphery of the mated body is formed as a regular polygon with an even number of sides, a pair of parallel mating surfaces are formed in the mating section, and a pair of polygonal surfaces displaced by 180 degrees are set opposite these mating surfaces.

With the first preferred embodiment, when a certain wear appears on a pair of polygonal surfaces that are in a surface contact state in long-term operation, the front and rear side brackets are moved so as to be withdrawn in the rotation direction of the endless rotary body, the mating section and mated body are separated, and then the mated body is rotated through the predetermined angle with respect to the linking section, whereby a pair of new (different) flat surfaces that have not been worn can be brought into surface contact with the mating surfaces. Therefore, the usage modes can be switched multiple times, thereby enabling the cost-efficient use. In the case of the mated body of a regular hexagonal shape or regular octagonal shape, when the mating section and mated body are brought close to one another and a pair of polygonal surfaces are mated by surface contact with a pair of parallel upper and lower mating surfaces, a pair of flat surfaces positioned in the mating direction continuously with a pair of flat surfaces that are set tightly opposite the mating surfaces will be positioned in inclined facing corners and will serve as guides, thereby ensuring that that the mating based on bringing the surfaces close to each other will be always performed smoothly without any resistance.

In the second preferred embodiment of the conveying apparatus of the second present invention, article sidewise push bodies that are fitted externally on the article support bodies and guided in the lengthwise direction are provided.

With the second preferred embodiment, the articles supplied on a group of the article support bodies in a start-end section can be conveyed by moving the group of the article support bodies by the rotation of the endless rotary bodies, and the articles can be pushed sidewise by moving the article sidewise push body in the lengthwise direction of the article support body, thereby making it possible to provide conveyor equipment advantageously suitable for sorting the articles.

In the third preferred embodiment of the conveying apparatus of the second present invention, an insertion hole section in the lengthwise direction is formed in the linking section, and a protruding section that protrudes from the side of the endless rotary body is configured to be inserted freely from the outside into this insertion hole section.

With the third preferred embodiment, both ends of the article support body can be linked to the endless rotary body via respective side brackets by inserting the protruding section from the outside into the insertion hole section.

In the fourth preferred embodiment of the conveying apparatus of the second present invention, the endless rotary body is formed of an endless chain, and an elongated linking pin that is formed by causing a predetermined linking pin, from amongst a group of linking pins that perform linking between links, to protrude inwardly is linked to the linking section of the side bracket.

With the fourth preferred embodiment, the article support body can be linked to the endless chain via a side bracket by inserting the predetermined elongated linking pin located in the endless chain into the tubular section and joining the elongated linking pin to the tubular section.

In the fifth preferred embodiment of the conveying apparatus of the second present invention, a guide rail section that supports and guides the article support body is provided along the main conveying path, and a guided member that is positioned outside the mated body and guided by the guiding rail section is fitted externally on the linking sections.

With the fifth preferred embodiment, the mated body that was fitted externally on the linking section can be stabilized by guiding the guided member by the guide rail section. Therefore, the mating of the mating section and mated body in the surface contact state can be advantageously maintained.

In order to attain the third object, the third present invention provides a conveying apparatus comprising a pair of left and right endless rotary bodies installed along a main conveying path, a large number of article support bodies that are attached between the endless rotary bodies and have a direction perpendicular to the main conveying path as a lengthwise direction thereof, and an article sidewise push body that is fit externally on the article support body and guided thereby, wherein the article sidewise push body is provided with a sidewise push action section in the upper section thereof, sidewise push abutment members are provided on both side surfaces of the sidewise action section, and the rear end portions of these sidewise push abutment members are protruded rearward with respect to the rear end of the sidewise push action section.

With the configuration of the third present invention, the articles supplied on the group of article support bodies in the start-end section can be conveyed on the main conveying path by moving the group of the article support bodies on the main conveying path by the movement of two endless rotary bodies. Further, the articles can be pushed sidewise and delivered outwardly on the side sections of the main conveying path by moving the article sidewise push bodies in the lengthwise direction of the article support bodies. At this time, by causing the rear end portions of the sidewise push abutment member to protrude rearward by a set length with respect to the rear end of the sidewise push action section, the sidewise push action surface (push surface) produced by the sidewise push abutment member can be increased (elongated), thereby enabling the stable sidewise movement. Further, the gap between the sidewise push abutment members in the front and rear article sidewise push bodies can be reduced and the sidewise movement can be implemented in a state in which the articles are hardly clasped.

In the first preferred embodiment of the conveying apparatus of the third present invention, the rear end portion of the sidewise push abutment member is formed to be elastically deformed in the left-right direction.

With the first embodiment, when a state is assumed in which the article is clasped, for any reason, between the front and rear article sidewise push bodies, the rear end portions of the sidewise push abutment members are deformed elastically (bent) in the left-right direction and retracted, whereby the article sidewise push bodies and articles can be prevented from damage even when the articles are clasped.

In the second preferred embodiment of the conveying apparatus of the third present invention, both side surfaces of the sidewise push action section are formed as sidewise inclined surfaces in which the rear section is inclined with respect to the front section toward the other side surface, and the sidewise push abutment members are provided in portions of these sidewise inclined surfaces.

With the second embodiment, when the group of article sidewise push bodies cross the main conveying path, while moving in the conveying direction, the inclined side surfaces of the sidewise push action sections can push the articles sidewise. Therefore, the articles can be branched in a state of inclination with respect to the main conveying path, while changing the orientation thereof.

In the third preferred embodiment of the conveying apparatus of the third present invention, the article sidewise push body is configured of a lower rectangular tubular portion and an upper sidewise action section, the sidewise action section that is provided on an upper surface side of an upper plate member of the rectangular tubular portion has a top plate member that covers from above the remaining section excluding a front end section of the top plate member, and a front end section of the upper plate member is formed at a start-end upper surface that has a convex circular arc shape and rises gradually with small inclination.

With the third embodiment, when the article is clasped between the front and rear article sidewise push bodies, for example, when the sidewise pushing is started, first, the start-end upper surface in the form of a concave circular arc with a small angle can be more smoothly introduced below the article and the articles can be then raised by the inclined upper surface.

In the fourth preferred embodiment of the conveying apparatus of the third present invention, a gap is present between a rear end of the sidewise push abutment member provided at the article sidewise push body that is positioned in front and a front end of the sidewise push abutment member provided at the article sidewise push body that is positioned behind.

With the fourth embodiment, the sidewise push action surface (push surface) produced by the sidewise push abutment member can be further increased (elongated).

BRIEF DESCRIPTION OF THE DRAWINGS

FIG. 14 is a vertical section of a rear surface view of the main components illustrating the disengaged state of the endless rotary body in the conveying apparatus;

FIG. 16 is a partially cut out side view of the main components illustrating the linked state of a side bracket in a conveying apparatus in the second embodiment of the present invention;

FIG. 21 illustrates a modification example of the second embodiment.

DESCRIPTION OF THE PREFERRED EMBODIMENTS

Figure 1:
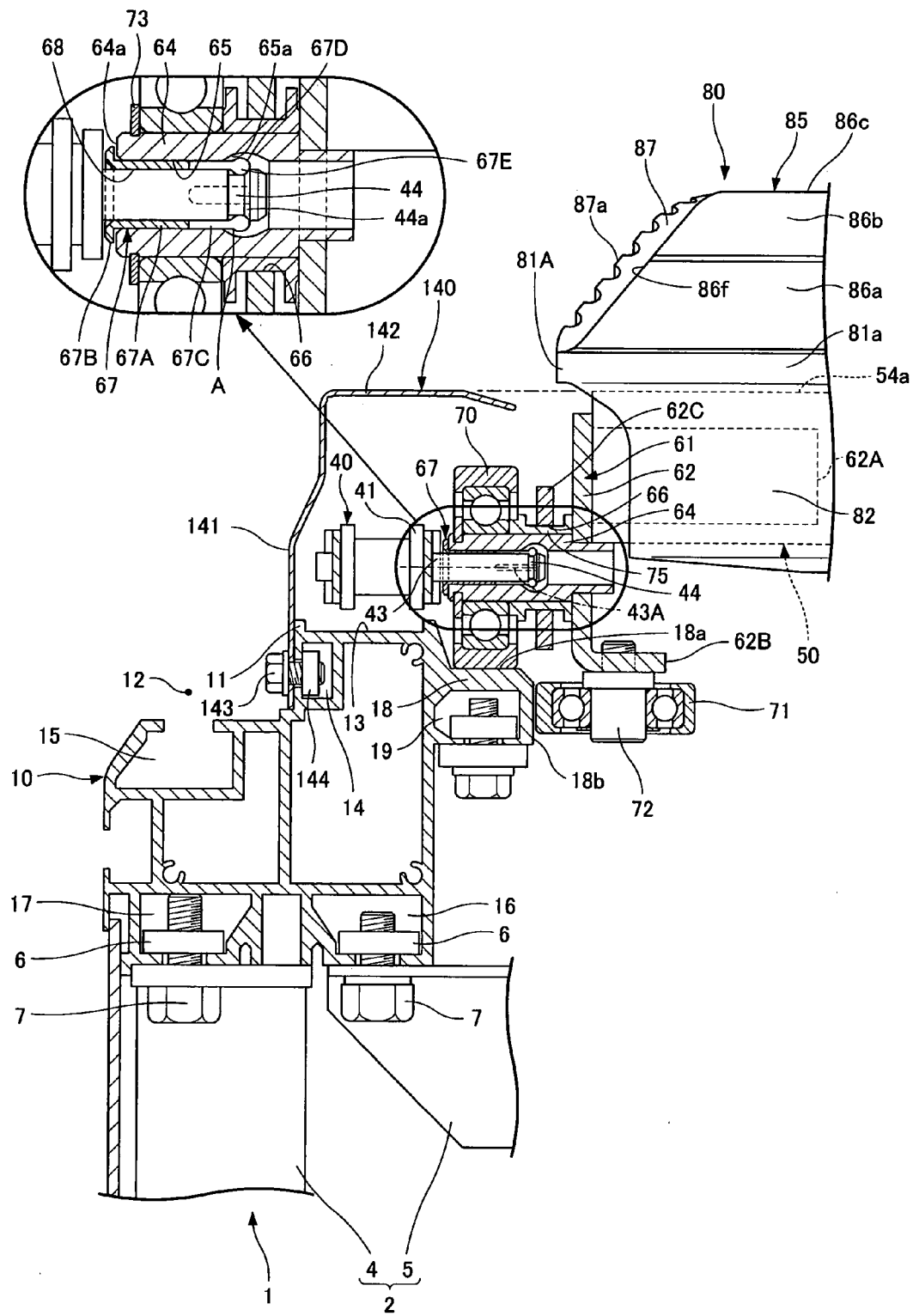
FIG. 1 is a partially cut out rear surface view of a portion of an upper frame member in a conveying apparatus that illustrates first embodiment of the present invention.

The first embodiment of the present invention will be described below with reference to FIG. 1 to FIG. 15.

In FIGS. 1 to 7, the reference numeral 1 stands for a main frame that comprises frame members 10, 20 installed in pairs of upper and lower members, respectively, on both sides, middle frame members 2 joining the upper and lower and left and right frame members 10, 20, and a group of legs 3 that are installed downward from the lower frame members 20. The middle frame member 2 is composed of a vertical linking member 4 or a transverse linking member 5.

The upper frame member 10 is formed from an aluminum molding and has a rectangular cross section. A rising section 11 that rises upward is formed in the central portion thereof. A notch-shaped step section 12 is formed on the outer side of the upper portion of the rising section 11, and a lubricating oil receptacle 13 in the form of an upward groove is formed on the inner side of the upper portion of the rising section 11. Furthermore, in the upper frame member 10, an outward dovetail groove 14 is formed in a position above the rising section 11, and an upward dovetail groove 15 is formed in the position of the outside step section 12. Moreover, an inner downward dovetail groove 16 and an outer downward dovetail groove 17 are formed at the lower end of the upper frame member. Further, in the upper frame member 10, a forward-side guide rail section 18 protrudes inwardly from a position slightly below the inner lubricating oil receptacle 13, and this forward-side guide rail section 18 serves to support and guide an article support body (descried hereinbelow).

In the forward-side guide rail section 18, an upward support surface 18a is formed by the upper surface thereof, and a sidewise guide surface 18b extending inward is formed by the inner surface thereof. Furthermore, a downward dovetail groove 19 is formed in a portion of the forward-side guide rail section 18. The lubricating oil receptacle 13, dovetail grooves 14 to 17, 19, and forward-side guide rail section 18 are formed over the entire length in the lengthwise direction when the upper frame member 10 is molded. An example of the upper frame member 10 is configured of the components 11 to 19.

The lower frame member 20 is formed from an aluminum molding and has a rectangular cross section. An inner upward dovetail groove 21 and an outer upward dovetail groove 22 are formed at the upper end and an inner downward dovetail groove 23 and outer downward dovetail groove 24 are formed at the lower end of the lower frame member. Further, in the lower frame member 20, a lubricating oil receptacle 25 in the form of an upward groove is formed inside the middle section, a return-side guide rail section 26 protrudes inwardly therein, and the return-side guide rail section 26 serves to support and guide the article support body. In the return-side guide rail section 26, an upward support surface 26a is formed by the upper surface thereof. Furthermore, a downward dovetail groove 27 is formed in a portion of the return-side guide rail section 26.

Further, an upper end extending section 29 is formed integrally so as to be positioned above a step section 28 formed by the return-side guide rail section 26 and the like, whereby a sidewise guide surface 29a is formed by the inner surface of the upper end extending section 29. The dovetail grooves 21 to 24, 27, return-side guide rail section 26, and upper end extending section 29 are formed over the entire length in the lengthwise direction when the lower frame member 20 is molded. An example of the upper frame member 20 is configured of the components 21 to 29.

The middle frame member 2 is integrated with the upper frame member 10 by positioning plate-shaped nut bodies 6 in both downward dovetail grooves 16, 17 of the upper frame member 10 and screwing bolt bodies 7 into the nut bodies 6 and tightening, the bolt bodies being passes from below with respect to the vertical linking member 4 or transverse linking member 5 of the middle frame member 2. By using the two upward dovetail grooves 21, 22 of the lower frame member 20, the middle frame member is also integrated with the lower frame member 20 with the nut bodies 6 and bolt bodies 7 in the same manner as described above. A plurality of the middle frame members 2 are disposed with a predetermined spacing in the lengthwise direction of both frame members 10, 20. The leg bodies 3 are joined to the lower frame member 20 with nut bodies 6 and bolt bodies 7 by using the downward dovetail grooves 23, 24 of the lower frame member 20.

A driven shaft 30 extending in the left-right direction is rotatably installed at the forward end section of the main frame 1 that has the above-described configuration, and a drive shaft 31 extending in the left-right direction is rotatably installed at the rear end section of the main frame. The driven shaft 30 and drive shaft 31 are herein rotatably supported via respective bearing units 33 on a pair of left and right support members 32 installed between the two frame members 10, 20. A drive unit 34 that is interlock linked to the drive shaft 31 comprises an electric motor 35 and a gear reducer 36 integrated therewith. The output unit of the gear reducer 36 is connected to the drive shaft 31.

Endless chains (an example of "endless rotary body") 40 are installed via sprockets 38, 39 (an example of "wheel body") between the mutually opposing sections at the left and right ends of the driven shaft 30 and drive shaft 31. Here, the sprockets 38, 39 are installed inside the support member 32 and linked to the driven shaft 30 and drive shaft 31. The endless chain 40 comprises links 41 and linking pins 42. Here, the endless chain 40 is positioned above the lubricating oil receptacle 13 on the forward side and in the step section 28 above the lubricating oil receptacle 25 on the rearward side. A large number of article support bodies (an example of "moving member") 50 are attached between the left and right endless chains 40.

From amongst the sections that protrude from the side of the endless chain 40, that is, from amongst the linking pins 42, elongated linking pins (an example of "protruding section") 43 that are formed by causing the linking pins installed with a predetermined pitch to protrude inwardly are used for attaching the article support bodies 50. Annular concave sections 44 are formed at the inner end portions, that is, the distal ends of the protruding portions of the elongated linking pins 43, and the inner sides of the annular concave sections 44 are formed as inclined surfaces 44a that have a diameter increasing inwardly.

As shown in FIGS. 1 to 3 and 6 to 12, the article support bodies 50 are installed so that a direction perpendicular to the direction of the main conveying path 45 that is a rotation direction of both endless chains 40 serves as a lengthwise direction 51. The article support body 50 is composed of a flat article carrying plate 54 having formed on an upper surface (from surface) 54a thereof a total of three (a plurality of) upward convex sections 52 extending in the lengthwise direction 51 and spaced in the direction of a main conveying path 45 and having formed in the middle portion of the lower surface (rear surface) thereof a total of four (a plurality of) downward convex sections 53 extending in the lengthwise direction 51 and spaced in the direction of a main conveying path 45, leg plate sections 55, 56 that are installed in pairs in the direction of a main conveying path 45 from the middle section of the lower surface (middle portion of the rear surface) of the article carrying plate 54 and extending in the lengthwise direction 51, a front plate section 57 extending downward and rearward from the front end of the article carrying plate 54, a front circular arc section 57A facing rearward from the lower end of the front plate section 57, a rear plate section 58 extending downward and forward from the rear end of the article carrying plate 54, and a rear circular arc section 58A facing forward from the lower end of the rear plate section 58; the article support body is configured to have a rail-like shape open at the lower surface side.

In such a configuration, the lower ends of both leg plate sections 55, 56 are formed as thick sections by being caused to protrude to the sides (inwardly) that face each other, and the groove-shaped guide sections 59, 60 that are open on the sides that face each other are formed between the two leg plate sections 55, 56 and between the lower ends of the leg plate sections and the middle portions of the lower surface of the article carrying plate 54.

The front plate section 57 and rear plate section 58 are formed to be inclined inwardly so that they gradually come close to each other on the mutually facing sides as they extend downward. The front circular arc section 57A and rear circular arc section 58A are in the form of tubes split in half and positioned below the lower ends of the two leg plate sections 55, 56. By forming the front circular arc section 57A and rear circular arc section 58A in the above-described manner at the lower ends of the front plate section 57 and rear plate section 58, the lower ends of these front plate section 57 and rear plate section 58 can be prevented from being easily caught on other articles. At the same time, sufficient strength can be ensured. Further, positioning the front circular arc section 57A and rear circular arc section 58A below the lower ends of the two leg plate sections 55, 56 makes it possible to protect the guide sections 59, 60 and prevent damage. Groove-shaped threaded sections 55A, 56A that are open downward are formed at the lower ends of the two leg plate sections 55, 56. An example of the article support body 50 is configured by the components 52 to 60. With the article support body 50 configured, as described above, to have a rail-like shape open at the lower surface side, the entire structure can be formed to have a light weight and can be provided at a low cost.

The respective side brackets 61 are attached by inserting and joining to both ends in the lengthwise direction 51 of the article support body 50 that has the above-described configuration. The side brackets 61 are made from iron and, as shown in FIG. 1, FIGS. 8 to 10, FIG. 12, and FIG. 13, have linking protruding sections 62A provided in two (front and rear) locations in the upper section at the inner surface side of the body section 62 that is elongated in the direction of the main conveying path 45. The linking protruding sections are provided by bending and protrude inwardly. A through hole 63 is formed between the linking protruding sections 62A. Further, in the lower part of the body section 62, a support protruding section 62B that protrudes inwardly is formed by bending. Further, a tubular body (an example of "linking section") 64 that protrudes outwardly is attached (fixed) by inserting a small-diameter portion located at the inner end thereof in one location of the front section (one side) on the outer surface side of the side bracket 61. Further, a displaced sheet section 62C that is displaced by a predetermined dimension outwardly is formed by bending in the rear section (other side), and a mating section 66 in the form of a recess that is open on both (inner and outer) sides and on the rear side (outwardly on the other side) is formed in the displaced sheet section 62C.

An insertion hole section 65 in the direction perpendicular to the rotation direction of the endless chain 40 (direction of the main conveying path 45) is formed by the tubular body 64, and the inner side in the insertion direction of the insertion hole section 65 is formed as an inclined expanding surface 65a that has a diameter increasing inwardly.

A tubular linking body 67 is provided that can be inserted (fitted inwardly) in the insertion hole section 65 of the tubular body 64, and an insertion hole 68 in the lengthwise direction 51 is formed by the inner peripheral surface of a tubular section 67A of the tubular linking body 67. Thus, in the tubular linking body 67, a collar section 67B that can be brought into contact with an outer end surface 64a of the tubular body (on the moving body side) 64 is formed at the outer end of the tubular section 67A, and the inner end side formation portion of the tubular section 67A is formed as a tongue piece section 67C that is split into four (a plurality of) sections in the circumferential direction. At the inner end of each tongue piece section 67C, there are formed an outward convex section 67D that is free to move from the inside in the opposite direction to the inclined expanding surface 65a of the insertion hole section 65 and an inward convex section 67E that can be elastically locked with the annular concave section 44 of the elongated linking pin 43. Here, the tubular linking body 67 is formed integrally from a resin.

The tubular body 64 and the tubular linking body 67 are so configured that when the collar section 67B comes into contact with the outer end surface 64a under the effect of the pushing action of the tubular body 64, the outward convex section 67D is withdrawn inwardly with respect to the inclined expanding surface 65a so that a withdrawal space A is formed therebetween, whereby the tongue piece section 67C is made free to withdraw against the elastic resistance thereof, and when the collar section 67B is withdrawn with respect to the outer end surface 64a due to the pulling action of the tubular body 64, the outward convex section 67D comes into contact with the inclined expanding surface 65a and the withdrawal thereof against the elastic resistance of the tongue piece section 67C is prevented.

The side bracket 61 formed in the above-described manner can be attached to body ends of the article (support body 50 by inserting a pair of the linking protruding sections 62A into a pair (front and rear) of space sections formed by the front plate section 57 or rear plate section 58 and the article carrying plate 54 of the article support body 50 and then a bolt body 69 inserted from the outside into the through hole 63 is screwed into any of the threaded sections 55A, 56A. The tubular linking body 67 can be linked in the internal fitting fashion to the tubular body 64 by inserting and internally fitting the tubular linking body 67 from the outside into the tubular body 64 and bringing the collar section 67B into contact with the outer end surface 64a of the tubular body 64 as well as by setting the outward convex sections 67D of a group of the tongue piece sections 67C opposite the inclined expanding surface 65a from the inner side.

Then, the protruding portion of the elongated linking pin 43 that protrudes from the side of the endless chain 40 is inserted from the outside into the insertion hole 68 of the tubular linking body 67, the inward convex sections 67E of the group of the tongue piece sections 67C are elastically engaged with the annular concave section 44, and the elongated linking pin 43 is joined to the tubular linking body 67, whereby both ends of the article support body 50 can be linked to the endless chain 40 via the respective side brackets 61 and, therefore, multiple article support bodies 50 can be attached between a pair of left and right endless chains 40. At this time, a ring body 75 made from a resin is fit externally on the tubular body 64 of the side bracket 61, and the mating section 66 located in the adjacent side bracket 61 is fit externally on the ring body 75. Thus, the mating surfaces of the mating section 66 and ring body 75 are formed from dissimilar materials, namely, from iron and resin.

A rotary body (an example of "guided member"; it comprises a bearing system or a roller system) 70 positioned outside of the ring body 75 and having an external peripheral section made from urethane is fit externally on the tubular body 64. The rotary bodies 70 are supported and guided by the upward support surfaces 18a, 26a of both guide rail sections 18, 26 of the main frame 1. A side roller (an example of "guided member") 71 having an outer peripheral section composed of urethane is provided so that it is free to rotate via a vertical shaft 72 on the support protruding section 62B, and such side rollers 71 are guided by the sidewise guide surface 18b of the guide rail section 18 or by the sidewise guide surface 29a of the upper end extending section 29. A lock wheel 73 positioned outside the rotary body 70 is provided at the tubular body 64.

When the rotary body 70 is thus supported and guided by the forward guide rail section 18, the endless chain 40 is positioned above the lubricating oil receptacle 13. Due to the configuration in which the upward support surface 18a of the guide rail section 18 is positioned at this time slightly below the upper end of the rising section 11 and has to support and guide the rotary body 70, the aforementioned upper end is positioned below a linking shaft center (center of the rotary body 70) 43A created by the elongated linking pin 43 and also below the lower surface of the endless chain (endless rotary body) 40. As a result, the lower surface of the endless chain 40 can be positioned above the upper end of the rising section 11 and, therefore, the insertion of the elongated linking pin 43 from the outside designed to move (bend) the endless chain 40 in the lengthwise direction 51 can be performed rapidly, without being impeded by the rising section 11.

Each article support body 50 is provided with an article sidewise push body 80 that is fit externally on the article support body 50 and can move in the lengthwise direction 51 by being guided thereby. These article side push bodies 80 are composed of a lower rectangular tubular portion and an upper sidewise push action section 85. Thus, as shown in FIG. 3 and FIGS. 6 to 12, in each article sidewise push body 80, the rectangular tubular portion is formed by a flat upper plate member 81 that faces the article carrying plate section 54 from above, a front plate member 82 that faces the front plate section 57 from the outside by extending downward and rearward from the front end of the upper plate member 81, a rear plate member 83 that faces the rear plate section 58 from the outside by extending downward and forward from the rear end of the upper plate member 81, and a flat bottom plate member 84 that faces the front circular arc section 57A or rear circular arc section 58A from below (that is located under it) by being positioned between the lower ends of the front plate member 82 and rear plate member 83.

Further, a sidewise push action section 85 is provided on the upper surface side of (above) the upper plate member 81. Thus, the sidewise push action section 85 is formed by a top sheet member 86 that covers the upper side of the remaining portion (flat portion) of the upper plate member 81, except the front end section 81A, and a plurality of rib plate members (not shown in the figure) that link the top plate member 86 to the upper plate member 81. In this case, a portion of the front end section 81A is formed by beak-shaped start-end concave upper surface (an example of "start-end upper surface) 81a that rises gradually with a small inclination and has a concave circular arc shape, when the front end section 81A and top plate member 86 of the upper plate member 81 are viewed from the side surface (upper surface shape). The front section of the top plate member 86 is formed by an inclined upper surface 86a that has a linear shape and rises gradually at an inclination angle larger than that of the start-end concave upper surface 81a. The middle section of the top plate member 86 is formed by a front convex circular-arc upper surface 86b that has a convex circular arc shape and rises gradually and a rear convex circular arc upper surface 86c that has a convex circular arc shape and forms an apex section. The rear end portion of the top plate member 86 is formed by a corner surface 86d that has a convex circular arc shape and descends sharply and a convex circular arc rear surface 86e that has a convex circular arc shape and descends sharply.

Further, in a plan view (side surface shape) of the top plate member 86 (sidewise push action section 85) and front end section 81A of the upper plate member 81, the left and right corner sections of the front end section 81A are formed by a circular-arc side surface 81b that has a convex circular arc shape, and a concave side surface 81c that has a concave circular arc shape and recedes sharply is formed continuously with the rear end of the circular-arc side surface. Both side surfaces of the top plate member 86 are formed by rising sidewise inclined surfaces 86f in which the rear section is inclined toward the other side surface with respect to the front section, that is, so that the front end section linked to the concave side surface 81c has a large width and this width decreases gradually, resulting in the formation of a narrow rear end section. As a result, the top plate member 86 is formed to have a trapezoidal shape with an inclination angle $\theta_1$ of 30 degrees in the plan view thereof.

A sidewise push abutment member 87 that is composed of a rubber sheet or the like and has a sidewise push abutment surface 87a of a peak-valley shape in a plan view thereof is detachably attached to a portion of the sidewise inclined surface 86f. Thus, the sidewise push abutment member 87 has a shape such that the side surface along the upper plate member 81 is covered from the sidewise push action section 85, that is, a shape such that the upper surface is joined to the upper surface of the sidewise push action section 85. Further, the sidewise push abutment member is formed to have a thickness such that in the attached state thereof, the front end portion abuts against the concave side surface 81c, and the convex side surface section (outer side surface) in the sidewise push abutment surface 87a of a peak-valley shape is joined to the rear end of the circular-arc side surface 81b. An example of the sidewise push action section 85 is configured of the components 86 to 87.

An upward protruding mating section 90 that is to be joined between a pair of leg plate sections 55, 56 is installed on the upper surface side of the bottom plate member 84, and the upper half-portion of the mating section 90 is caused to protrude to opposite sides (outwardly) so as to form thick sections. These thick sections form guided sections 91, 92 that mate with the guide sections 59, 60 and are slidingly guided thereby. An upward elastic body that can come into contact from below with the article carrying plate 54 in the article support body 50 and a forward elastic body that can come into contact from inside with the front leg plate section 55 are provided on the sides of these guided sections 91, 92.

Thus, upward tongue bodies (an example of "upward elastic body") 94 are formed via a pair of slits 93 in the direction of the main conveying path 45 between the two guided sections 91, 92 at both end portions of the mating section 90 in the lengthwise direction 51, and these upward tongue piece bodies 94 are configured so that they can be elastically deformed in the up-down direction. Upward abutment portions are formed at the free ends of both upward tongue piece bodies 94, and the abutment portions are so configured that they can be abutted from below against the article carrying plate 54.

Further, forward tongue piece bodies (an example of "forward elastic body") 96 are formed via a pair of slits 95 in the up-down direction at both end portions of the front guided section 91 in the lengthwise direction 51, and these forward tongue piece bodies 96 are configured so that they can be elastically deformed in the front-rear direction. Forward abutment sections are formed at the free ends of both forward tongue piece bodies 96, and the abutment sections are so configured that they can elastically abut from inside against the front leg plate section 55. An example of the sidewise push body 80 is configured of the components 81 to 96. The sidewise push body 80 is molded integrally from a synthetic resin, except the sidewise push abutment member 87.

A guided body is attached by using the mating section 90 to the lower side of the article sidewise push body 80. Thus, a roller shaft (an example of "support shaft") 100 is provided vertically from the central portion of the mating section 90, that is, from the central portion between the guided sections 91, 92 by supporting the upper section of the roller shaft by embedded molding. A guide roller (an example of "guided body") 101 is attached, so that it can rotate, to the protruding lower section of the roller shaft 100, whereby the guide roller 101 is positioned outwardly of the rear surface of the article sidewise push body 80.

As shown in FIGS. 4 to 7, a forward guide device 110 that performs guiding of the guide roller 101 is installed at the upper transverse linking member 5 of the middle frame member 2 of the main frame 1. Further, a return guide device 116 is installed at the lower transverse linking member 5. An upper switching means 130 on the forward side and a lower switching means 131 of the return side are installed in a central branch section, and a pair of left and right distribution means 132A, 132B are installed in the vicinity of the front end on the forward side.

The forward guide device 110 comprises start-end guide sections 111A, 111B installed as a pair of left and right sections respectively on both side of the start-end section, a pair of left and right inner movement guide sections 112A, 112B that are inclined inward with an inclination angle increasing downward and face the finish end of these start-end guide sections 111A, 111B via the distribution means 132A, 132B, a pair of left and right outer movement guide sections 113A, 113B that are inclined outward with the inclination angle increasing downward and face the finish end of these inner movement guide sections 112A, 112B via the upper switching means 130, and a pair of left and right finish end guide sections 114A, 114B that are installed opposite the finish ends of the outer movement guide sections 113A, 113B.

The return guide device 116 comprises a pair of left and right inner movement guide sections 117A, 117B that are inclined inward with the inclination angle increasing downward and a pair of left and right outer movement guide sections 118A, 118B that are inclined outward with the inclination angle increasing downward and face the finish ends of the inner movement guide sections 117A, 117B via the lower switching means 131.

The start-end guide sections 111A, 111B or finish end guide sections 114A, 114B of the forward guide device 110, and the outer movement guide sections 118A, 118B of the return guide device 116 are composed of a bracket 120 fixed to the upper side linking member 5, a guide body 121 attaches so as to be opposite the bracket 120, and a guide plate 122. The guide body 121 is composed of an extrusion molded aluminum article, the guide plate 122 is molded from a resin, and the guide roller 101 is positioned between the mutually opposing surfaces of the guide body 121 and guide plate 122.

Figure 2:
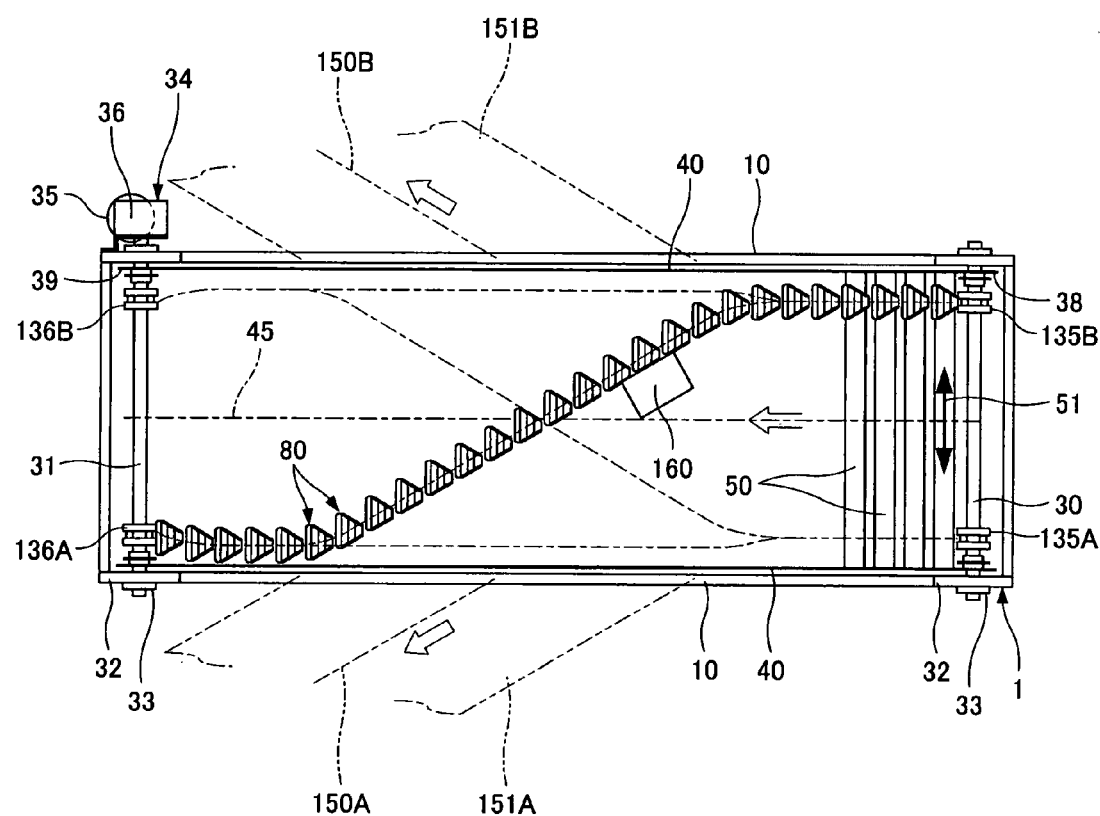
FIG. 2 is a schematic plan view of the conveying apparatus.
Figure 3:
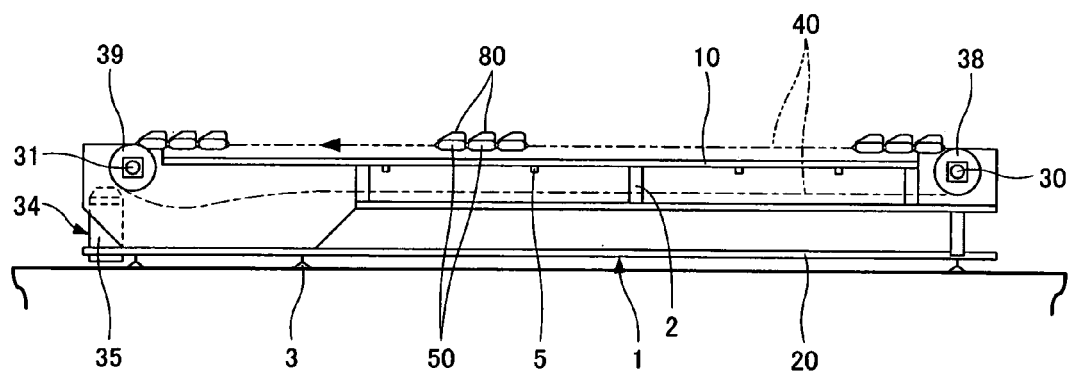
FIG. 3 is a schematic side view of the conveying apparatus.
Figure 4:
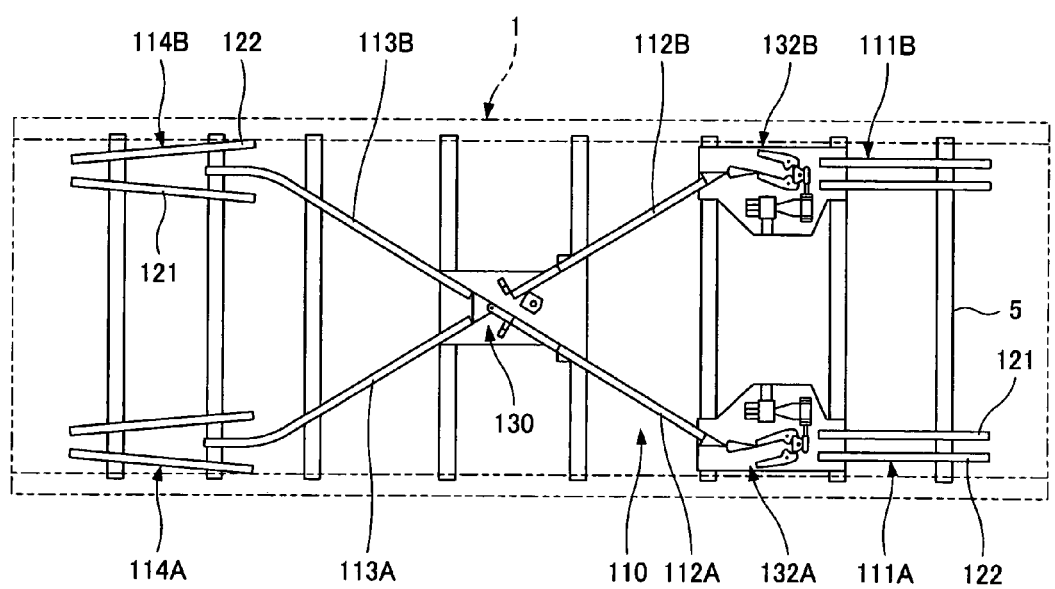
FIG. 4 is a schematic plan view illustrating a group of forward guide devices of the conveying apparatus.
Figure 5:
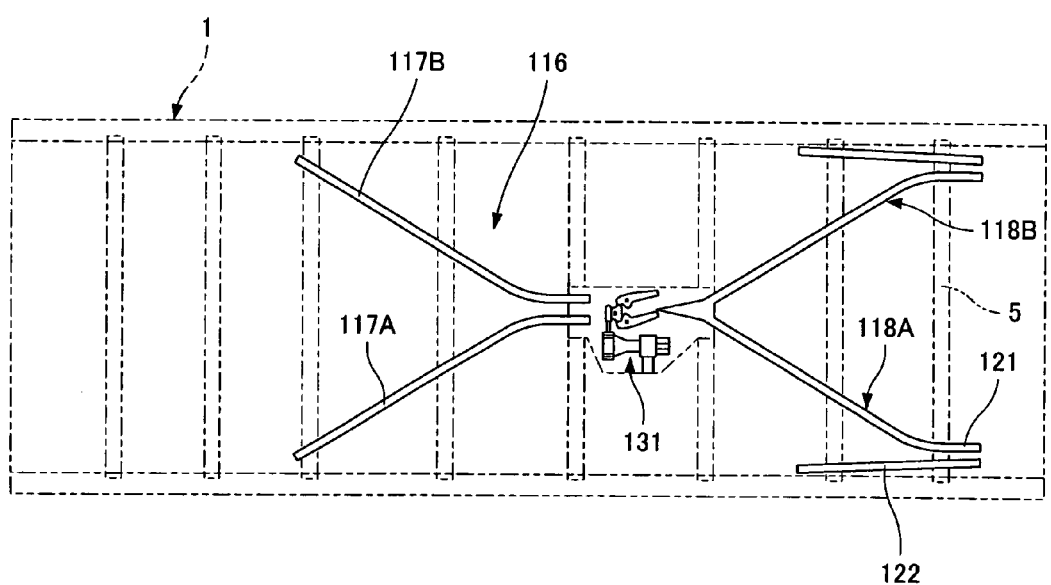
FIG. 5 is a schematic plan view illustrating a group of return guide devices of the conveying apparatus.
Figure 6:
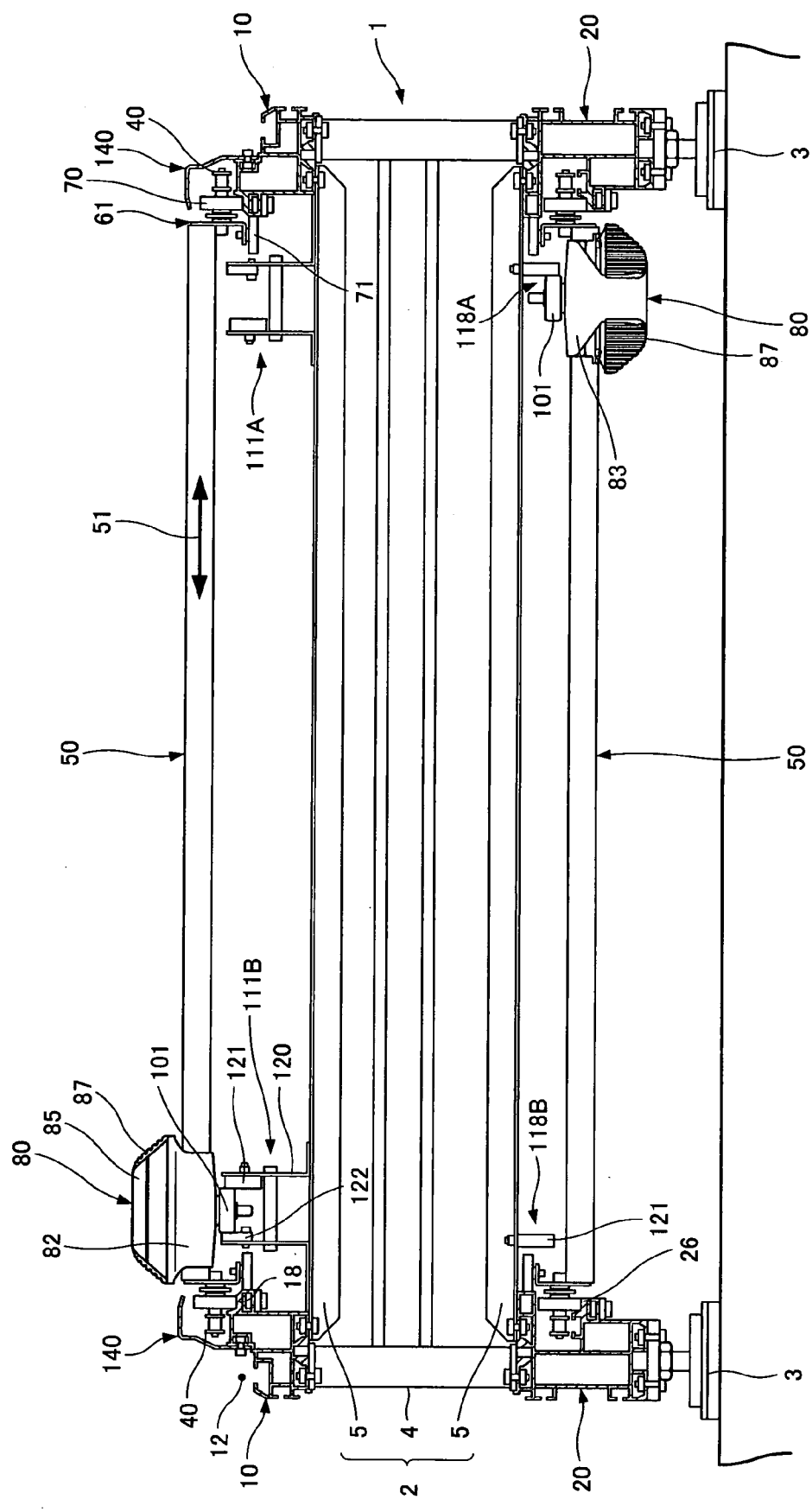
FIG. 6 is a partially cut out rear surface view of the conveying apparatus.
Figure 7:
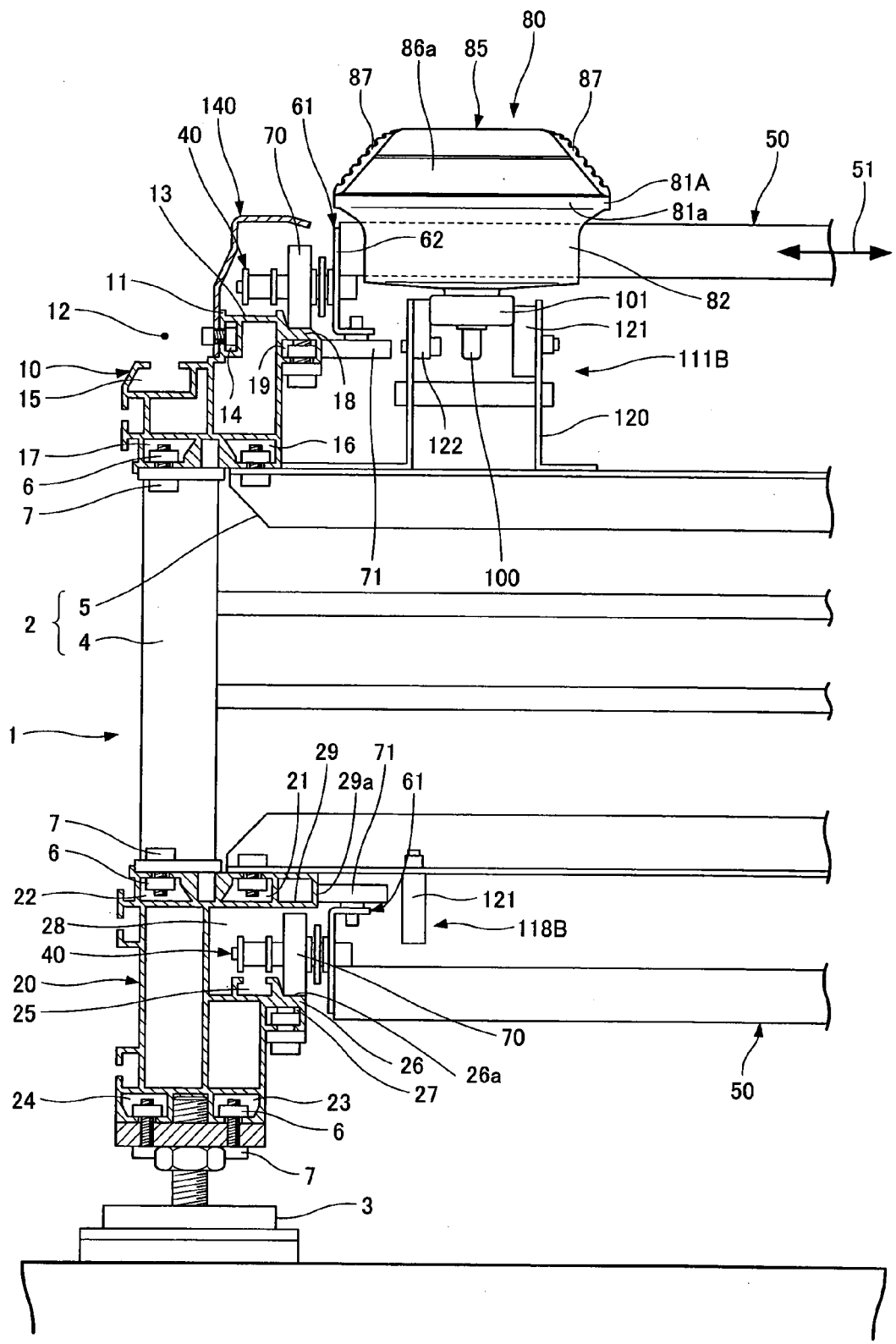
FIG. 7 is a partially cut out rear surface view of the main components of the conveying apparatus.

The inner movement guide sections 112A, 112B or outer movement guide sections 113A, 113B of the forward guide device 110 and the inner movement guide sections 117A, 117B of the return guide device 116 are composed by fixing the guide body 121 directly to the lower side linking member 5, and the guide roller 101 is guided by the side surface of the guide body 121. As shown in FIG. 2, reverse guide bodies 135A, 135B, 136A, 136B that allow for the mating of the guide roller 101 are attached to the portions of both shafts 30, 31 so as to guide the guide roller 108 with a reversal section at the start and finish positions.

As shown in FIG. 1 and FIGS. 6 to 8, a cover body (chain cover) 140 for covering the endless chain 40 or rotary body 70 is disposed in the portion where the endless chain 40 is installed and the forward-side guide rail section 18 is formed, at the upper frame member 10 (above the main frame 1). The cover body 140 is formed as a shaped rail with a cross sections in the form of inverted L by a side plate section 141 and an upper plate section 142 that is bent at a right angle inwardly from the upper part of the side plate section 141. When the side plate section 141 of the cover body 140 is abutted from the outside against the rising section 11, a bolt body 143 that is passed from the outside into the lower end portion of the side plate section 141 can be screwed into a nut body 144 that was positioned in advance inside the afterward groove section 14, thereby making it possible to fix the cover body detachably to the rising section 11 of the upper frame member 10. At this time, the uppermost surface of the upper plate section 142 is at the same level as the upper surface 54a of the article carrying plate 54.

Figure 8:
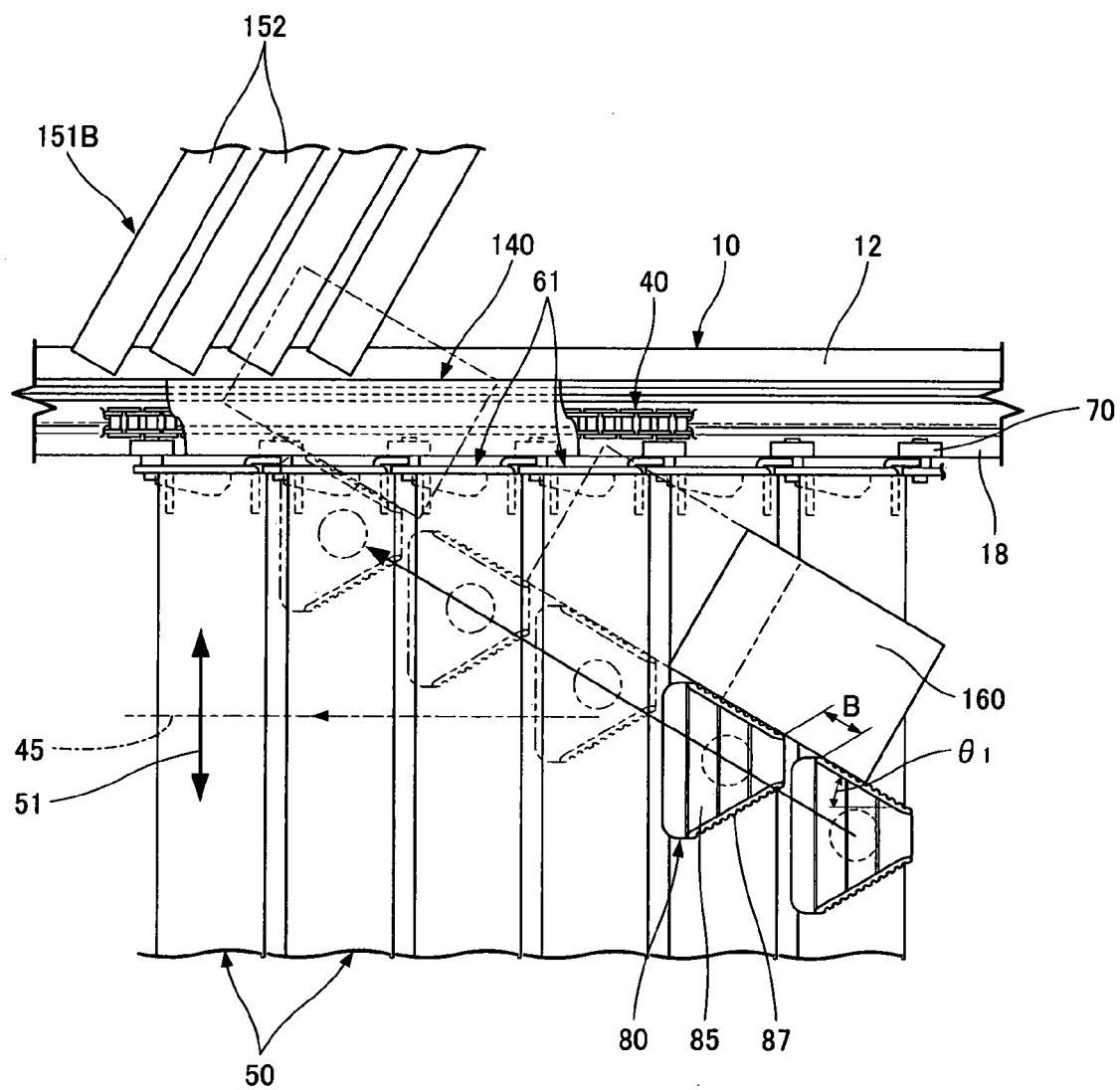
FIG. 8 is a plan view of the main components of the conveying apparatus.
Figure 9:
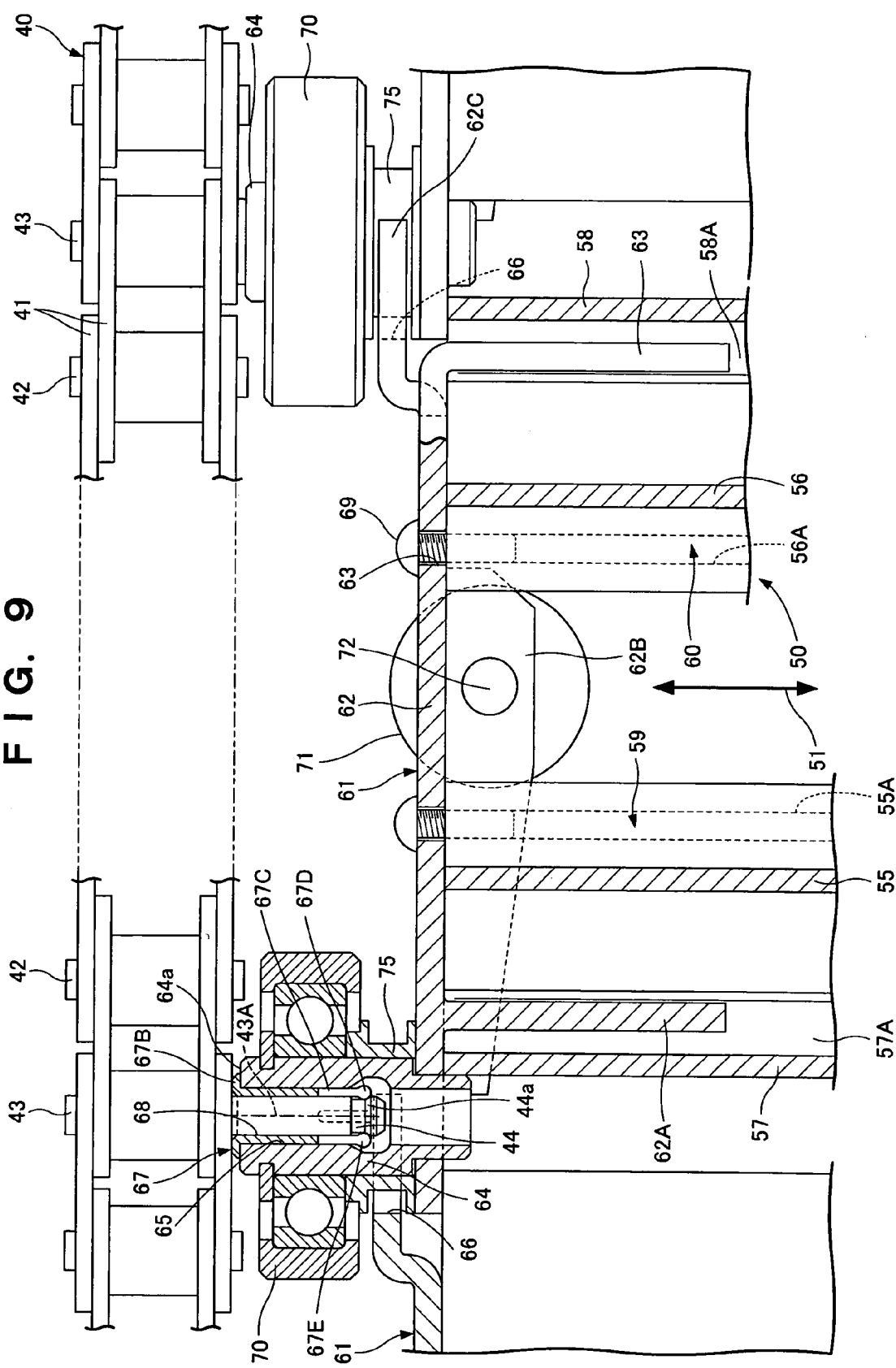
FIG. 9 is a partially cut out plan view of the main components illustrating the linked state of an endless rotary body in the conveying apparatus.
Figure 10:
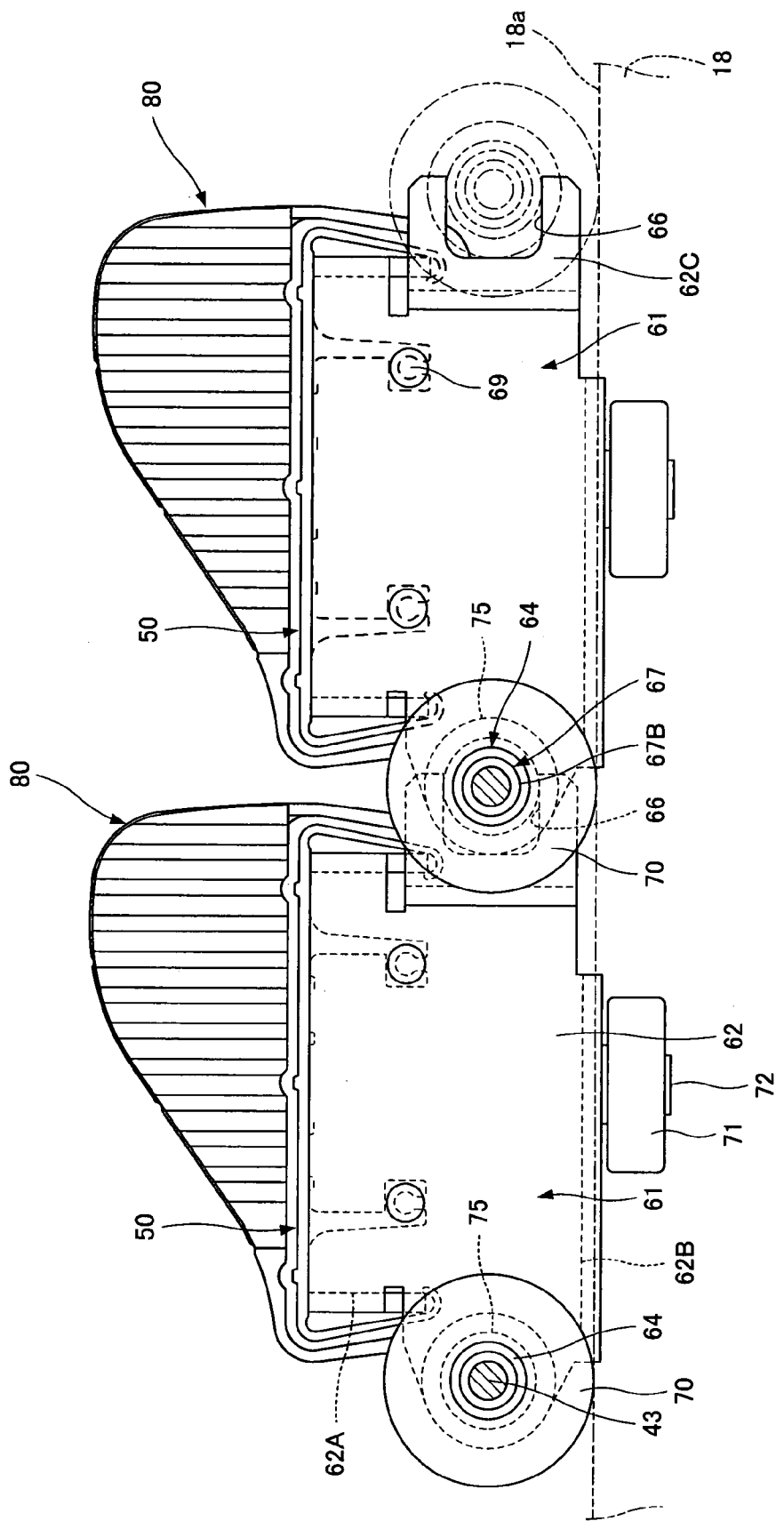
FIG. 10 is a partially cut out side view of the main components illustrating the linked state of a side bracket in the conveying apparatus.
Figure 11:
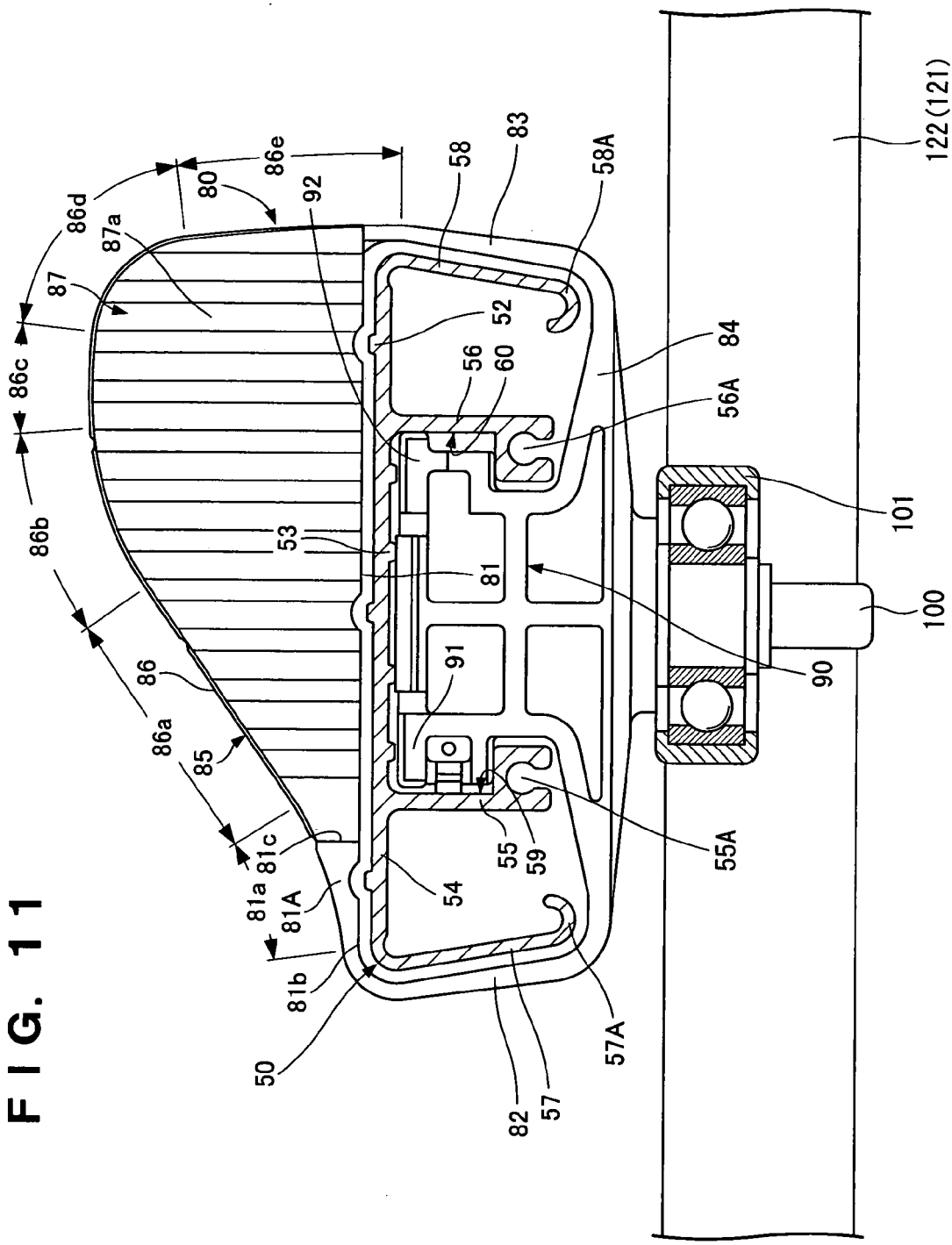
FIG. 11 is a partially cut out side view of a portion of an article support body having an article sidewise push body attached thereto in the conveying apparatus.
Figure 12:
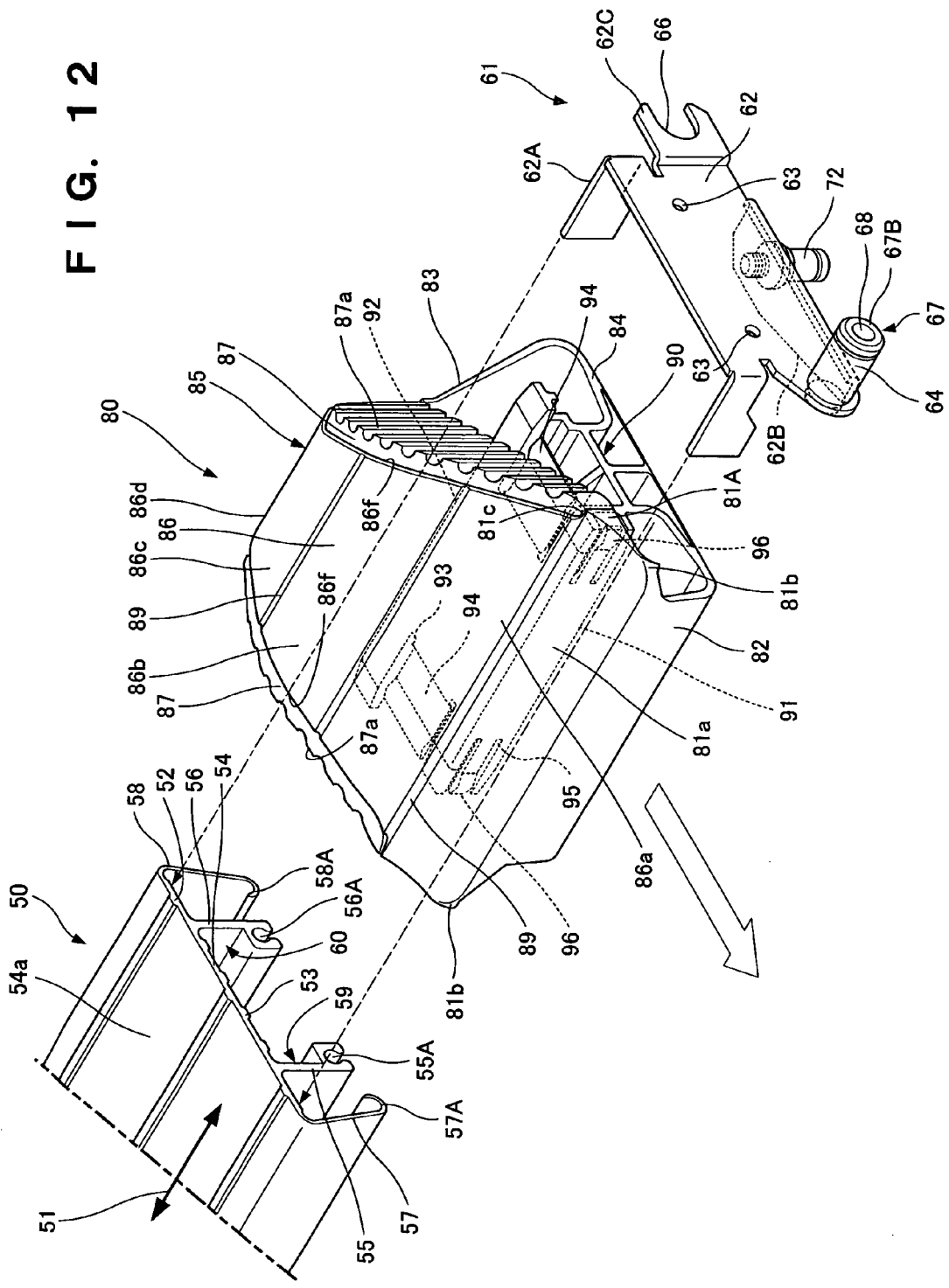
FIG. 12 is an exploded perspective view of the article support body, article sidewise push body, and side bracket in the conveying apparatus.
Figure 13:
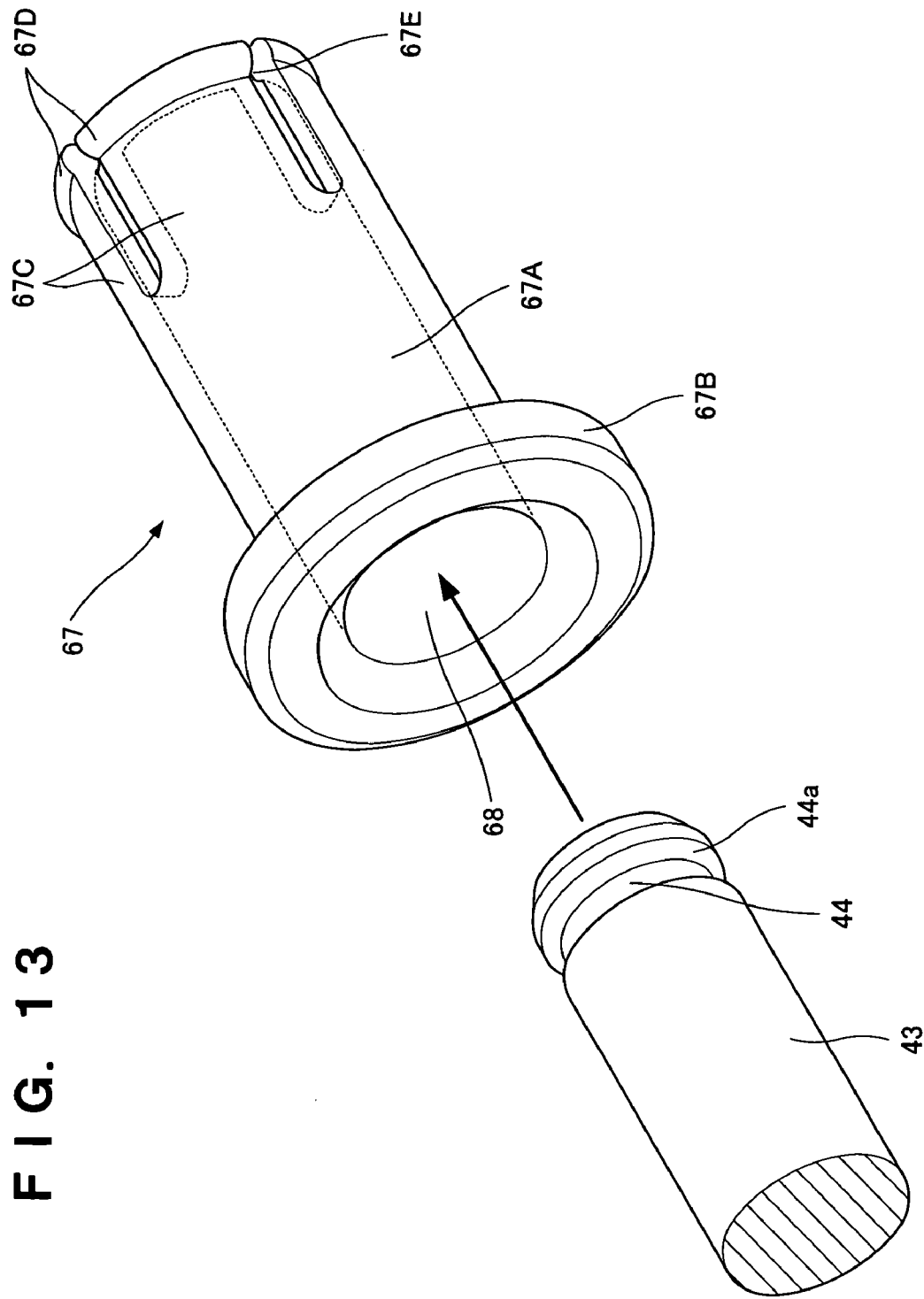
FIG. 13 is a perspective view of a tubular linking body and a protruding section in the conveying apparatus.

As shown in FIG. 2 and FIG. 8, branch conveyors 151A, 151B forming branch conveying paths 150A, 150B that are inclined downward and outward with respect to the main conveying path 45 are provided externally on both sides of the main frame 1. These branch conveyors 151A, 151B are configured by supporting a large number of rollers 152 on conveyor frames. The upward dovetail groove 15 of the upper frame member 10 may be used as a link to the branch conveyors 151A, 151B. The reference symbol 160 stands for an article.

The operations of assembling the conveying apparatus and conveying and branching the articles 160 that are performed in the first will be described below.

In the installation of the conveying apparatus, the main frame 1 is assembled into a frame set, the endless chains 40 and article support bodies 50 are incorporated in the main frame 1, and the cover body 140 is installed at the upper end of both upper frame members 10.

Thus, a pair of linking protruding sections 62A of the side brackets 61 are inserted into a pair of front and rear space sections formed in the article support body 50, the inner surface side of the bracket 61 is brought into contact with the end surface side of the article support body, and then the bolt body 69 inserted from the outside into the through hole 63 is screwed into and joined to any of the threaded sections 55A, 55B. As a result, the side brackets 61 can be attached to both ends of the article support body 50. In this case, before the two side brackets 61 are attached or after one side bracket 61 has been attached, the article side push body 80 is externally fitted onto the article support body 50. Furthermore, before the two side brackets 61 are attached or after one side bracket 61 has been attached, the tubular linking body 67, rotary body 70, and side roller 71 are set on the side of these side brackets 61.

Thus, the tubular linking body 67 is inserted from the outside into the insertion hole section 65 of the tubular body 64, and this insertion is performed, while a group of tongue piece bodies 67C are deformed toward the tubular shaft center against the elastic resistance thereof and a group of the outward convex sections 67D is caused to slide over the inner circumferential surface of the insertion hole section 65. As a result of such an insertion, as shown in FIG. 1, the collar section 67B is abutted against or brought close to the outer end surface 64a of the tubular body 64 and the outward convex sections 67D of a group of the tongue piece sections 67C are set opposite the inclined expanding surface 65a from the inner side via a withdrawal space A and engaged therewith, whereby the tubular linking body 67 can be linked to the tubular body 64 in an inner fitting mode and, therefore, the tubular linking body 67 can be set at the side of the side bracket 61. Further, the ring body 75 is fitted externally on the tubular body 64 and then the rotary body 70 is fitted and the lock wheel 73 is mounted. Then, the side roller 71 is attached, so that it can rotate, to the support protruding section 62B via the vertical shaft 72.

After the side brackets 61 have thus been attached to both ends of the article support body 50, a specific elongated linking pin 43 located in the endless chain 40 in inserted into the tubular linking body 67 and joined thereto, whereby both ends of the article support body 50 can be linked to the endless chains 40 via the side brackets 61. Thus, as shown in FIG. 14, by moving (bending) the predetermined zone of the endless chain 40 to the outside, it is possible to move this predetermined zone outwardly above the rising section 11, whereby the protruding portion of the elongated linking pin 43 is positioned above the lubricating oil receptacle 13.

Further, after the protruding portion of the elongated linking pin 43 and the tubular section 67A of the tubular linking body 67 have been set opposite each other, the protruding portion of the elongated linking pint 43 is inserted from the outside into the tubular body 67A. As this insertion process comes close to its completion, the distal end of the elongated linking pin 43 abuts against a group of inward convex sections 67E. At this time, the outward convex section 67D is withdrawn inwardly via a withdrawal space A with respect to the inclined expanding surface 65a, whereby the group of the tongue piece sections 67C are deformed so as to be withdrawn from the tubular shaft center against the elastic resistance thereof. As a result, the insertion of the elongated linking pin 43 is performed, while causing the group of the inward convex sections 67E to slide over the external circumferential surface of the distal end of the elongated linking pin 43. Further, as shown in FIG. 1, by elastically engaging the inward convex sections 67E of the group of tongue piece sections 67C with the annular concave sections 44, the elongated linking pin 43 can be joined to the side bracket 61.

As a result, both ends of the article support body 50 can be linked to the endless chains 40 via the respective side brackets 61. At this time, the insertion (linking) of the elongated linking pin 43 from the outside can be performed with good operability, rapidly and in an easy manner, without being hindered by the rising section 11. A large number of article support bodies 50 can be attached between a pair of left and right endless chains 40 by sequentially performing such a linking operation. At this time, the mating section 66 of the side bracket 61 is externally fitted on the ring body 75 in the adjacent side bracket 61.

The cover body 140 is then installed at the upper end of both upper frame members 10. Thus, the lower portion of the side plate section 141 is abutted from the outside against the rising section 11 and then the bolt body 143 that was inserted from the outside is screwed into the nut body 144 that was positioned in advance inside the outward groove grooves 14, thereby making it possible to fix the side plate section detachably to the rising section 11 of the upper frame member 10. Before or after the attachment of the article support body 50 or installation of the cover body 140, the forward guide device 110, return guide device 116, upper switching means 130, lower switching means 131, and distribution means 132A, 132B are installed on the side of the main frame 1. The conveying apparatus can thus be assembled.

After the conveying apparatus has thus been assembled, the two endless chains 40 can be rotated by actuating the motor 35 of the drive device 34 and forcibly rotating the sprocket 39 via the drive shaft 31 connected to the gear reduced 36. Following the rotation of the two endless chains 40, the group of the article support bodies 50 are supported and guided by the upward support surfaces 18*a*, 26*a* of the two guide rail sections 18, 26 via the rotary bodies 70 and also guided by the sidewise guide surface 18*b* of the guide rail section 18 or the sidewise guide surface 29*a* of the upper end extending section 29 via the side roller 71, thereby ensuring the stable movement. Because the upper end extending section 29 is positioned above the rotary body 70 at the return path side, the rotary body 70 is prevented from coming up and, therefore, the group of the article support bodies 50 can move in a stable state without any play in the vertical direction. As a result, the article support bodies 50 that perform a circulating motion make it possible to convey the articles 160 supplied onto the group of the support bodies 50 in the start-end section on the main conveying path 45.

In the conveying process, the movement of both endless chains 40 in the forward path proceeds below the cover body 140 and above the lubricating oil receptacle 13, and the movement of both endless chains 40 in the return path proceeds below the upper end extending section 29 and above the lubricating oil receptacle 25.

When such conveying is performed, the article side push body 80 that moves integrally with the group of article support bodies 50 moves back and forth in the lengthwise direction 51 of the article support body 50 via the guided section 91 or moves linearly along the main conveying path 45 together with the article support body 50 as the guide roller 101 of the article side push body is guided by the group of guide devices 110, 116.

Thus, for example, the guide roller 101 that has been guided by the start-end guide section 111A located on one side is guided linearly forward when the distribution means 132A is in a linear distribution mode, then advances forward in a state without such guiding action, and is then guided by the finish end guide section 114A. As a result, the article side push body 80 does not act upon the article 160, and the article 160 is conveyed linearly on the main conveying path 45. The same is true for the opposite side, and the guide roller 101 of the start-end guide section 111*b* moves from the distribution means 132B to the finish end guide section 114B.

Further, when the distribution means 132A is in an inclined distribution mode, the guide roller 101 that has been guided by the start-end guide section 111A located on one side is inclined and guided inwardly, then guided by the inner movement guide section 112A, moved inside, then transferred to the outer movement guide section 113B via the upper switching means 130, guided by the outer movement guide section 113B, moved to the outside, and then guided by the finish end guide section 114B. As a result, the group of the article sidewise push bodies 80 crosses the main conveying path 45, while moving in the conveying direction. Therefore, the sidewise push action section 85 located on the other side produces a sidewise push action upon the article 160, branches and moves the article 160 in the inclined state with respect to the main conveying path 45, while changing the direction of the article, and transfers the article to the other branch conveyor 151B.

The same is true for the opposite side, wherein the guide roller 101 of the start-end guide section 111B is guided by the distribution means 132B, inner movement guide section 112B, upper switching means 130, outer movement guide section 113A, and finish end guide section 114A, and the sidewise push action section 85 on one side of the article sidewise push body 80 produces a sidewise action with respect to the article 160 via the sidewise push abutment member 90 and transfers the article 160 to the branch conveyor 151A.

The guide roller 101 that has reached the end portion of the finish end guide sections 114A, 114B as described hereinabove is guided by reverse guide bodies 136A, 136B and reversed. Then, in the return guide device 116, the guide rollers are first guided by the inner movement guide sections 117A, 117B, moved to the central section, then distributed to the left and right with the lower switching means 131, and moved to the outside by guidance with the outer movement guide sections 118A, 118B. The rolls are then guided by the reverse guide bodies 135A, 135B, reversed and then moved to either one of the start-end guide bodies 111A, 111B.

When guidance and reversal are performed with such reverse guide bodies 135A, 135B, 136A, 136B, the distance between the front and rear side brackets 61 increases or decreases. As a result, the mating section 66 and ring body 75 are in sliding contact with each other. However, in this case, because the sliding contact is between the mating section 66 made from iron and the ring body 75 made from a resin, that is, between the mating surfaces composed of dissimilar materials, the occurrence of wear and noise can be reduced by comparison with the case of sliding contact between the mating surfaces composed of the same material.

The back and forth movement of the article sidewise push bodies 80 that was described above can be performed with good stability at all times, without play or sufficient changes in posture (orientation), in a state of mating with and guiding by the guiding sections 59, 60 in the article support bodies 50 via the front and rear guided sections 91, 92, that is, in a state in which advantageous sliding friction has been created by the elastic repulsion force of the groups of tongue piece bodies 94, 96. Furthermore, since the group of the tongue piece bodies 94, 96 are formed so that they are distributed to both ends in the lengthwise direction 51, the movement of the article sidewise push bodies 80 is performed in a state where advantageous sliding friction occurs to the same extent in the forward and return paths.

As described above, because the group of article sidewise push bodies 80 crosses the main conveying path 45, while moving in the conveying direction, the sidewise push action body 85 pushes the article 160 sidewise, and the article 160 is moved to a branch, and transferred to the branch conveyors 151A, 151B. However, because the article 160 is supported between the convex sections 52 and slides over the convex sections 52 in this process, this branching movement to a branch is performed in a state with a small friction resistance. Therefore, the expected branching movement is performed smoothly, without damaging the article 160 or causing wear of article support bodies 50. Furthermore, because the endless chain 40 is sealed from above, the article 160 that is moved to a branch is carried above the cover body 140 that is fixed to the upper frame member 10, whereby dust, etc., that has adhered to the article 160 is prevented from falling down on the endless chain 40.

In the side portion of the sidewise push action section 85, the sidewise push abutment member 87 is provided by forming the right and left corner portions of the front end section 81A by the circular-arc side surface 81*b* and connecting the sidewise push abutment surface 87*a* to the rear end of the circular-arc side surface 81*b*. Therefore, the side portion in the sidewise push action section 85 can serve as a sidewise push action surface over almost the entire length thereof, thereby enabling the stable sidewise push movement. At the same time, a gap B (see FIG. 8) between the sidewise push action sections 85 in the front and rear article sidewise push bodies 80 is decreased and the expected sidewise push movement can be performed without the risk of catching the article 160 in the spacing.

Further the upper portion of the sidewise push action section 85 is formed by the inclined upper surface 86*a* in which the middle portion in the front-rear direction is inclined forward and downward, and the start-end concave circular-arc upper surface 81*a* that has gradual inclination with respect to the inclined upper surface 86*a* is formed in the front end portion of the sidewise push action section continuously with the inclined upper surface 86*a*. As a result, for example, then the sidewise push action is started, and the state is assumed in which the article 160 is to be clasped between the front and rear article sidewise push bodies 80, the start-end concave circular-arc upper surface 81*a* that has gradual inclination smoothly passes below the article 160 and the article 160 is raised by the inclined upper surface 86*a*. As a result, the expected sidewise push movement is enabled without clasping the article, whereby the article 160 and article sidewise push bodies 80 can be prevented from damage. Further, because the left and right corner portions of the front end section 81A are formed by the circular-art side surface 81*b*, smoother introduction below the article 160 is made possible.

Figure 15A:
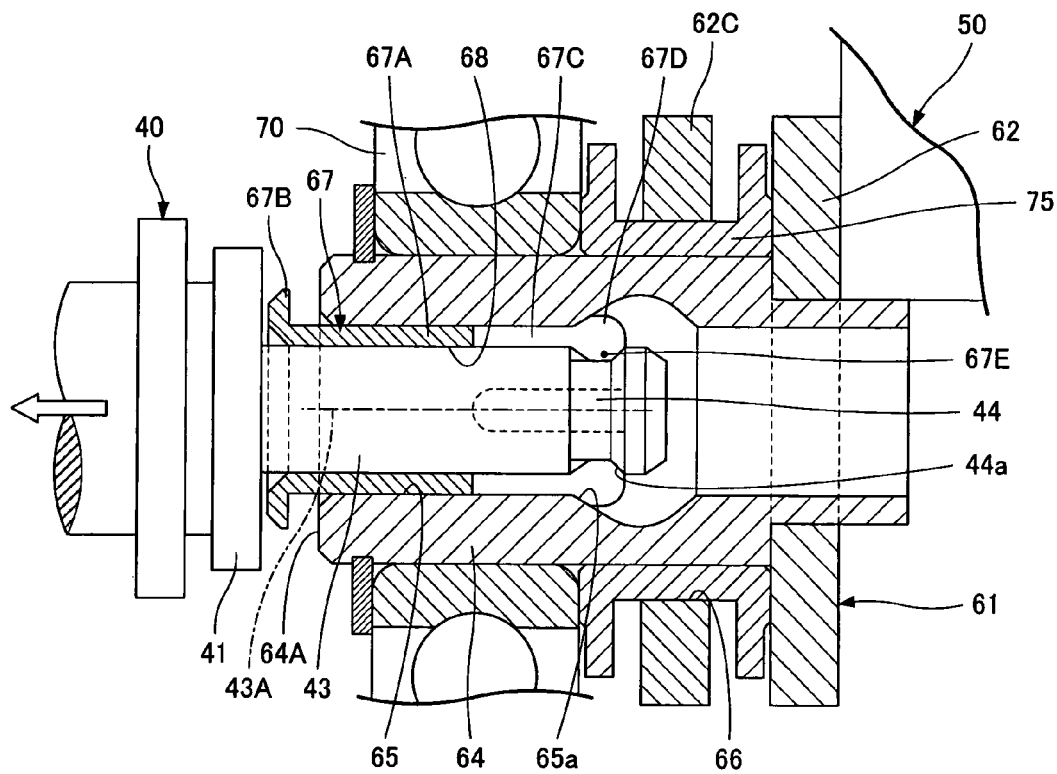
FIG. 15A is a partially cut out side surface view illustrating the state in which the pull-out movement is prevented and FIG. 15B is a partially cut out side surface view illustrating the state during the pull-out movement, these figures relating to a linking portion of the moving member and protruding section in the conveying apparatus.

When a force acts so as to withdraw the endless chain 40 and article support body 50 from each other in the lengthwise direction 51, that is, when a force acts in the direction of pulling the elongated linking pin 43 and tubular body 64 from one another due to a malfunction or secondary accident during the above-described operation, as shown in FIG. 15A, the group of outward convex sections 67D of the tubular linking body 67 that will be pulled out together with the elongated linking pins 43 will abut against the inclined expanding surface 65*a*, and the inclined surface 44*a* will abut against the group of the inward convex sections 67E. Therefore, since the outward convex sections 67D will abut against the inclined expanding surface 65*a*, the tubular linking body 67 will be prevented from being pulled out with respect to the tubular body 64, and because the inclined surface 44*a* will abut against the group of the inward convex sections 67E, the elongated linking pin 43 will be prevented from being pulled out with respect to the tubular linking body 67. Thus, the elongated linking pin 43 and tubular body 64 will be prevented from being pulled out with respect to each other, whereby the malfunction or accident can be automatically prevented from spreading.

Figure 15B:
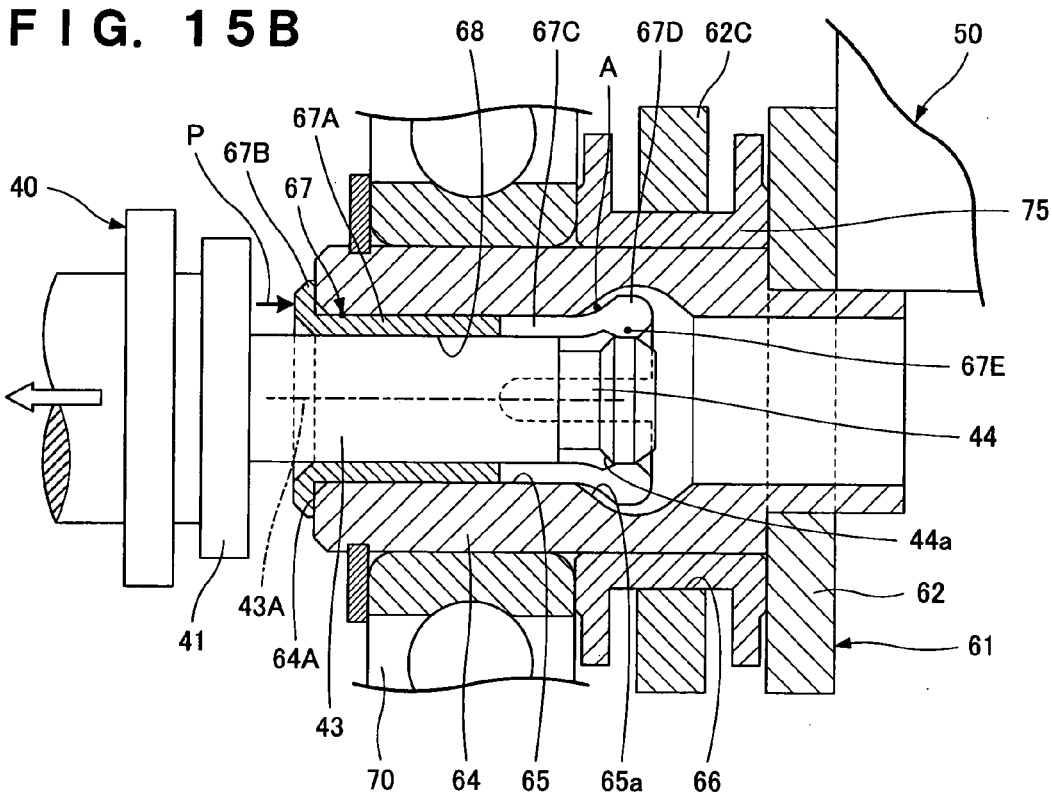
Figure 17:
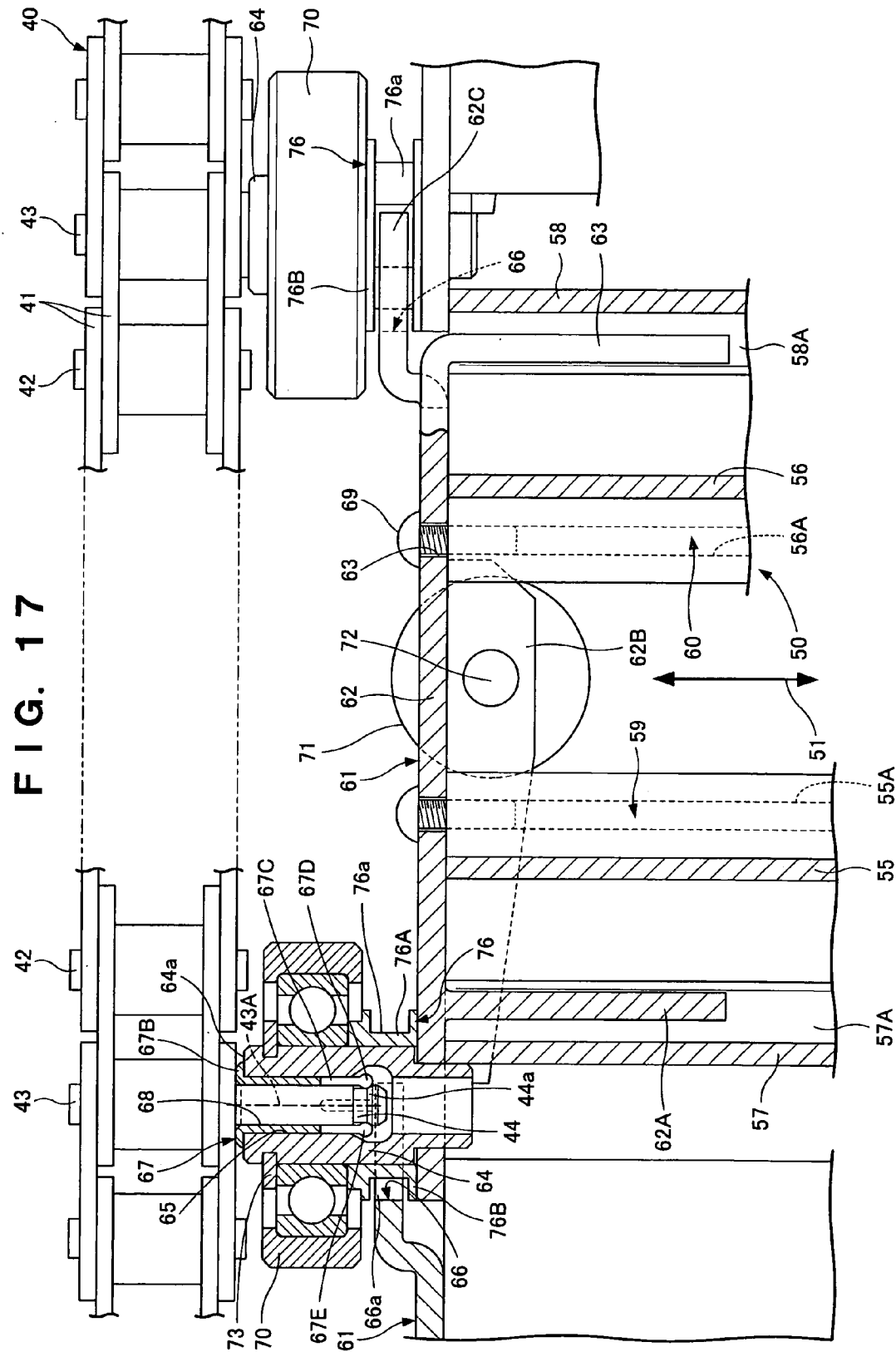
FIG. 17 is a partially cut out side view of the main components illustrating the linked state of an endless rotary body in the conveying apparatus.
Figure 18:
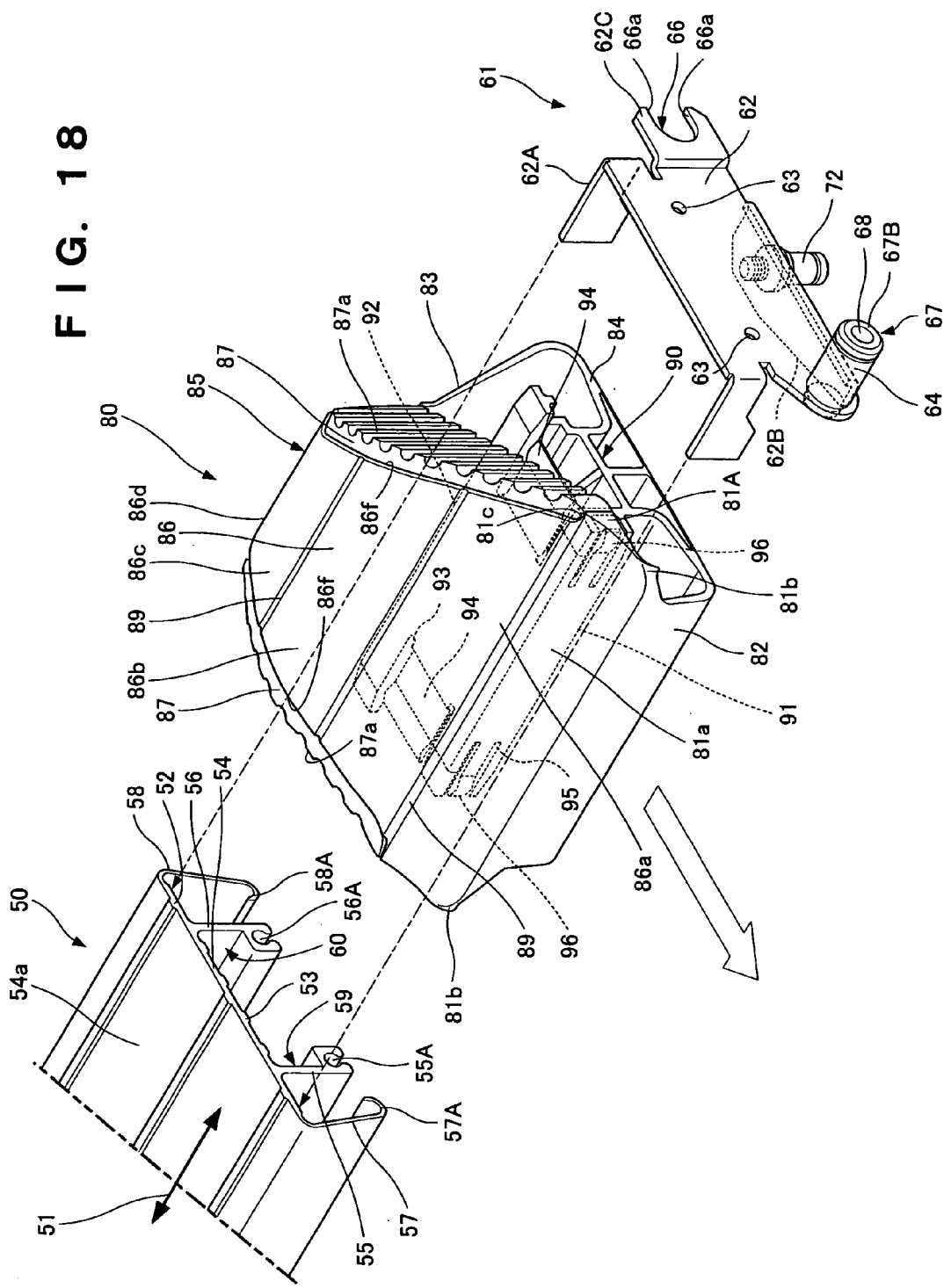
FIG. 18 is an exploded perspective view of an article support body, an article sidewise push body, and a side bracket in the conveying apparatus.
Figure 19:
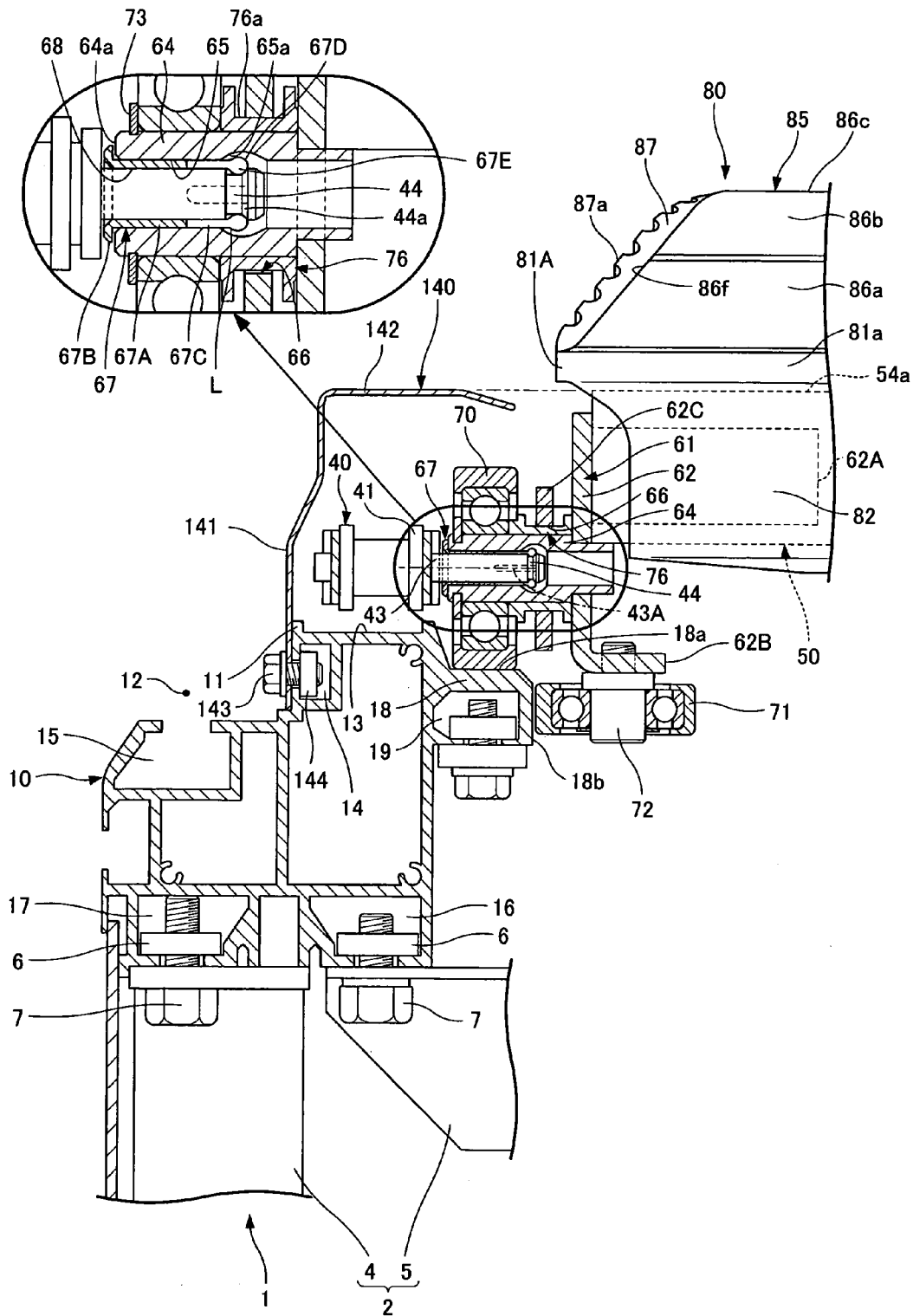
FIG. 19 is a vertical section of a rear surface view of a portion of the upper frame member in the conveying apparatus.
Figure 20A:
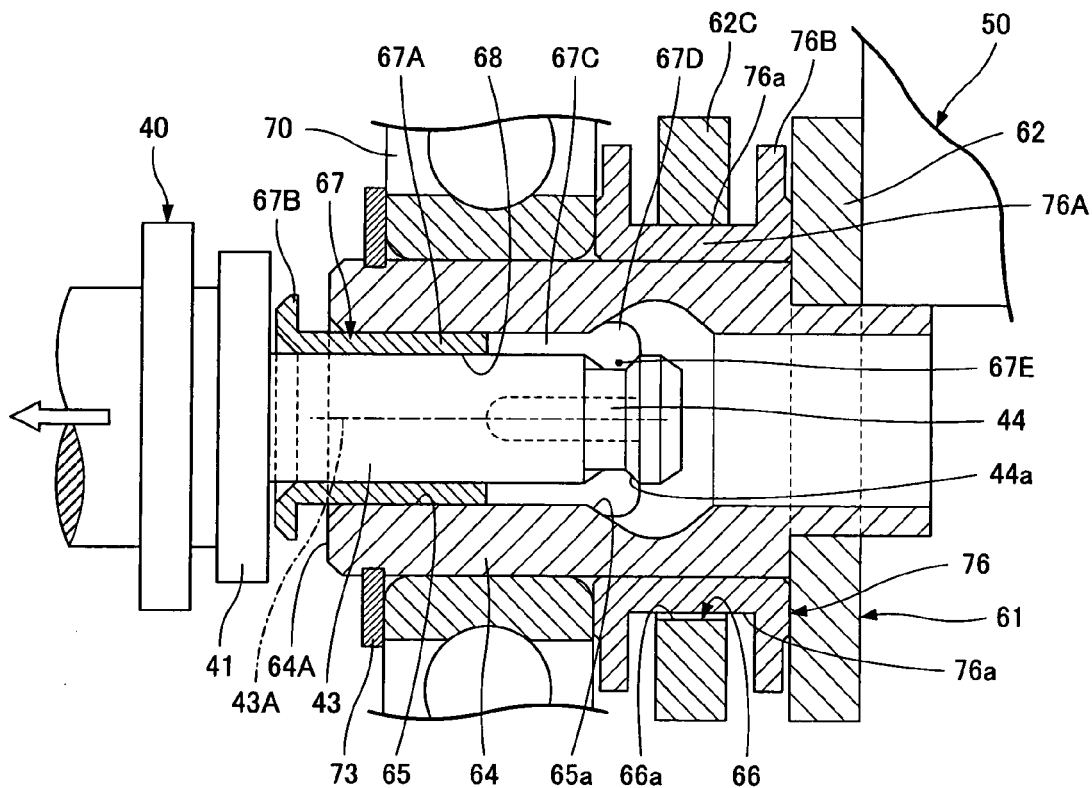
FIG. 20A is a partially cut out side surface view illustrating the state in which the pull-out movement is prevented and FIG. 20B is a partially cut out side surface illustrating the state during the pull-out movement, these figures relating to a linking portion of the moving member and protruding section in the conveying apparatus.
Figure 20B:
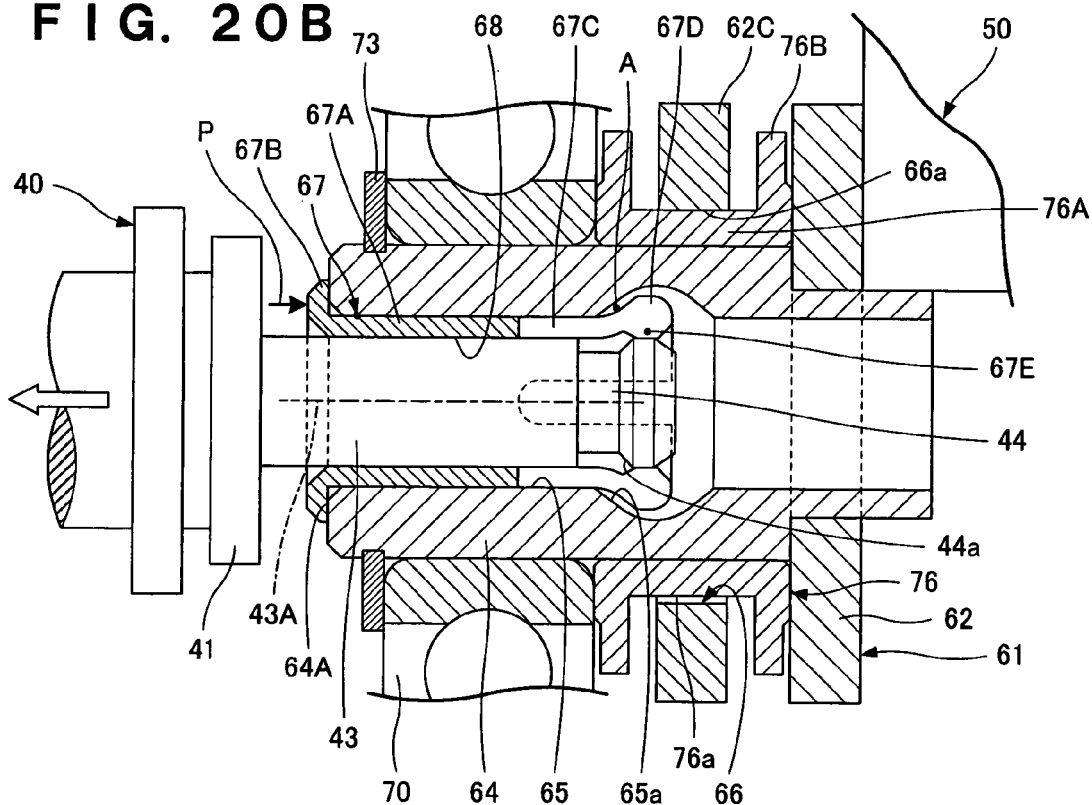

Further, in order to perform a repair in which the article sidewise push body 80 is replaced or an inspection operation, first, the elongated linking pin 43 is pulled out of (disconnected from) the tubular body 64. At this time, a tool such as a driver is positioned on the outside of the collar section 67B in a state in which the elongated linking pin 43 is joined to the side bracket 61, as shown in FIG. 15B, an external force P that causes abutment against the outer end surface 64*a* of the tubular body 64 is applied to the collar section 67B, and the outward convex section 67D of the group of tongue piece sections 67C is positioned opposite the inclined expanding surface 65*a* from the inner side thereof via the withdrawal space A. If the elongated linking pin 43 is pulled out, while maintaining the above-described state, the inclined surface 44*a* is brought into contact with the group of inward convex sections 67E, and the group of tongue piece sections 67C is deformed against the elasticity thereof in the direction of withdrawal from the tubular shaft center. At this time, because the outward convex section 67D faces the inclined expanding surface 65*a* from inside thereof via the withdrawal space A, the deformation of the group of tongue piece sections 67C against the elasticity thereof proceeds without any obstacle and, therefore, the elongated linking pin 43 can be pulled out, while leaving the tubular linking body 67 at the side of the side bracket 61. Thus, similarly to the operation of inserting (linking) the elongated linking pin 43 from the outside, the operation of pulling out the elongated linking pin 43 to the outside (unlinking) can be performed rapidly in an easy manner and with good operability.

In the first embodiment explained hereinabove, conveying apparatus of a transfer conveyor system was described in which a pair of left and right endless chains 40 were installed along the main conveying path 45, and a large number of moving members (article support bodies 50) for which a direction perpendicular to the main conveying path 45 serves as the lengthwise direction 51 are attached between the endless chains 40. However, the conveyor apparatus may be also of a system in which the endless chain 40 is installed only on one side of the main conveying path 45 and one end of each moving member is linked to the endless chain 40, or of a system in which a belt conveyor device for article support is employed as the moving member.

In the first embodiment explained hereinabove, the conveying apparatus of a transfer conveyor system was described in which article sidewise push bodies 80 fitted externally on the article support bodies 50 and guided in the lengthwise direction were provided at the article support bodies 50, but the conveyor apparatus may be also of a slat system in which the article sidewise push bodies 80 are omitted.

In the first embodiment explained hereinabove, a system was described in which side brackets 61 were provided at the article support bodies 50 and the tubular body 64 having the insertion hole section 65 formed therein was provided at the side bracket 61, but a system may be also used in which the side bracket 61 is omitted and the tubular body 64 is provided at the article support body 50.

In the first embodiment explained hereinabove, a system was described in which the endless chain 40 was used as an endless rotary body, and the protruding sections were configured of elongated linking pins 43 that were formed by protruding the predetermined linking pins inwardly, from amongst the group of linking pins 42 that link the links 41 to each other, but a system in which the protruding sections are formed in the predetermined zones of the endless chain 40, or a system using an endless belt having the protruding sections formed in the predetermined zones thereof may be also used.

In the first embodiment explained hereinabove, a system was described in which the article support bodies 50 were attached between endless rotary bodies (endless chains 40) via the side brackets 61 provided at both ends, the guide rail section 18 was formed in the upper section of the main frame 1, the upward support surface 18*a* and the sidewise guide surface 18*b* directed inwardly were formed at the guide rail section 18, and the guided member (rotary body 70) that is supported and guided by the upward support surface 18*a* and the guided member (side roller 71) that is guided by the sidewise guide surface 18*b* were provided at the side bracket 61, but a system in which the sidewise guide surface 18*b* and guided member are omitted may be also used.

In the first embodiment explained hereinabove, a system was described in which the guided members were composed of rotary bodies 70 that could rotate around the shaft center (linking shaft center 43A) extending along the lengthwise direction 51 and the upper end of the rising section 11 was positioned below the shaft center (linking shaft center 43A), but a system may be also used in which the shaft center (linking shaft center 43A) is positioned below the upper end of the rising section 11.

In the first embodiment explained hereinabove, a system was described in which the article support body 50 was configured as a shaped rail with open lower surface side, but a configuration without the open lower surface side may be also used.

In the first embodiment explained hereinabove, a system was described in which respective branch conveyors 151A, 151B were provided outwardly on both sides of the main frame 1 and the articles 160 were pushed sidewise, distributed and delivered outwardly at both sides of the main conveying path 45, but a system in which a branch conveyor (151A or 151B) is provided outwardly on one side of the main frame 1 may be also used. Further, the above-described configuration can also be incorporated in conveying apparatus of a system in which articles from a plurality of conveyors are merged in one conveyor or articles from one conveyor are branched to a plurality of conveyors.

In the first embodiment explained hereinabove, a system was described in which the upper frame member 10 and lower frame member 20 were separate members, but a system may be also used in which the lower frame member 20 is in the form of a side plate or side frame.

In the first embodiment explained hereinabove, the sidewise push abutment member 87 was attached in a state in which it was inclined at an angle $\theta_1$ of 30 degrees, but this inclination angle can be set to any value.

The second embodiment of the present invention, will be explained hereinbelow with reference to FIGS. 16 to 20.

When an article support body 50 is attached between endless chains 40, a ring-shaped mated body 76 is fitted externally and rotatably on a tubular body 64 of a side bracket 61. Thus, the mated body 76 comprises a tubular section 76A and collar sections 76B formed at both ends of the tubular section 76A and is molded integrally from a resin. In this case, the outer circumference of the tubular section 76A positioned between the two collar sections 76B is formed to have a regular octagonal shape (a regular polygon shape with an even number of sides), whereby flat surfaces (an example "polygon surface") 76*a* are formed in eight locations.

A mating section 66 is configured in the adjacent side bracket 61 so that the mating section can be fitted externally on the mated body 76. Thus, a recessed mating section 66 that is open on both the inner and outer sides and also on the rear side (other outer side) is formed to have a pair of upper and lower parallel mating surfaces 66*a*, and the mating section 66 is fitted externally on the mated body 76 in a state in which a pair of flat surfaces 76*a* that are displaced by 180 degrees face tightly, practically without a gap, the mating surfaces 66*a*. As a result, the mated body 76 and mating section 66 are mated so that they can slide with respect to each other in the rotation direction of the endless chain 40 due to surface contact of the flat surfaces 76*a* and mating surfaces 66*a*.

The operations of assembling the conveying apparatus and conveying and branching the articles 160 that are performed in the second embodiment will be described below.

When a large number of article support bodies 50 are attached between a pair of left and right endless chains 40, the mating section 66 of the side bracket 61 is fitted externally on the mated body 76 in the adjacent side bracket 61. Thus, the external fitting is performed, as shown in FIG. 16, by bringing the mating section 66 of the side bracket 61 and the mated body 76 of the adjacent side bracket 61 close to each other and tightly setting a pair of flat surfaces 76*a* in the mated body 76 that are displaced by 180 degrees opposite the pair of upper and lower parallel mating surfaces 66*a* in the mating section 66, so that practically no gap remains between the surfaces. At this time, because flat surfaces 76*a* are formed in eight locations on the outer periphery of the tubular section 76A, a pair of flat surfaces 76*a* that are positioned on the sides in the mating direction continuously with a pair of the flat surfaces 76*a* that are tightly set opposite the mating surfaces 66*a* will be positioned in inclined facing corners and will serve as guides, thereby ensuring that external fitting by bringing the surfaces close to each other will be always performed smoothly without any resistance.

When a guide roller 101 that reached the end portion of the finish end guide sections 114A, 114B is guided and reversed by reversal guide bodies 135A, 135B, 136A, 136B during the above-described conveying and branching operations, a state of relative expansion and contraction and relative bending in the rotation direction of the endless chain 40 is assumed between the front and rear side brackets 61. At this time, because the relative expansion and contraction is performed in a state where the flat surfaces 76*a* of the mated body 76 and the mating surfaces 66*a* of the mating section 66 are brought into surface contact in two (upper and lower) zones, the relative expansion and contraction is performed so that the noise produced by a play in the reversal section is reduced, and the expansion and contraction resulting from the surface contact hardly causes any wear of the flat surfaces 76*a* and mating surfaces 66*a* that are the contact portions. The relative bending is performed smoothly by the relative rotation of the tubular body 64 and mated body 76. Furthermore, because of the surface sliding movement of the mating section 66 made from iron and the mated body 76 made from a resin, that is, because of the sliding movement of surfaces made from dissimilar materials, the occurrence of wear and noise can be further reduced by comparison with sliding movement of surfaces made from the same material.

Further, when a certain wear appears on a pair of flat surfaces 76a in long-term operation, the elongated linking pin 43 is pulled out to the outside (unlinked), the front and rear side brackets 61 are moved so as to be withdrawn in the rotation direction of the endless chain 40, the mated body 76 is pulled out from the mating section 66, and then the mated body 76 is rotated through the predetermined angle (45 degrees) with respect to the tubular body 64, whereby a pair of new (different) flat surfaces 76a that have not been worn can be brought into surface contact with the mating surfaces 66a. Therefore, in the case of a regular octagonal mated body 76, operation modes can be switched 3 times (a total of four operation modes), thereby enabling the cost-efficient use.

A modification example of the second embodiment of the present invention will be described below with reference to FIG. 21.

Figure 21A:
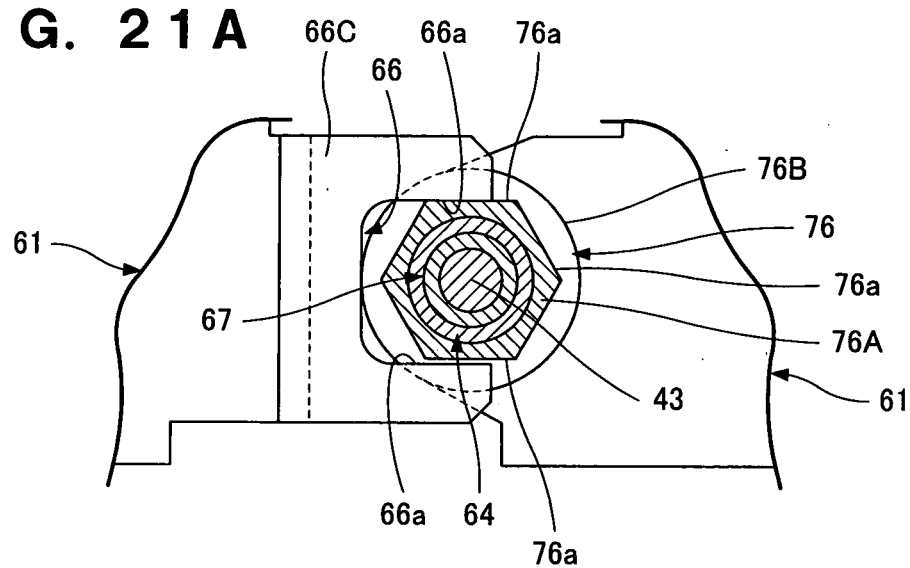
FIGS. 21A to 21C are vertical sections of rear surface views illustrating the linked state of side brackets in respective conveying apparatuses.
Figure 21B:
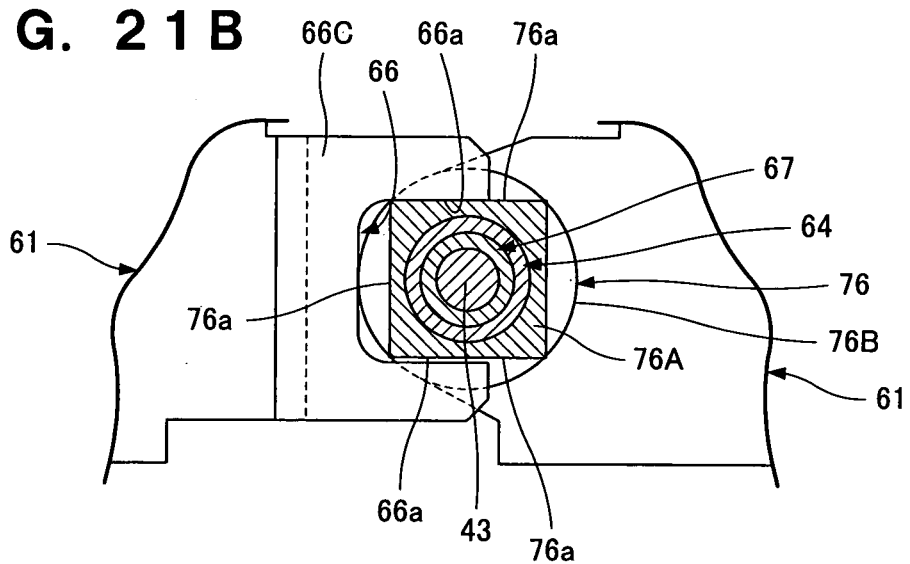
Figure 21C:
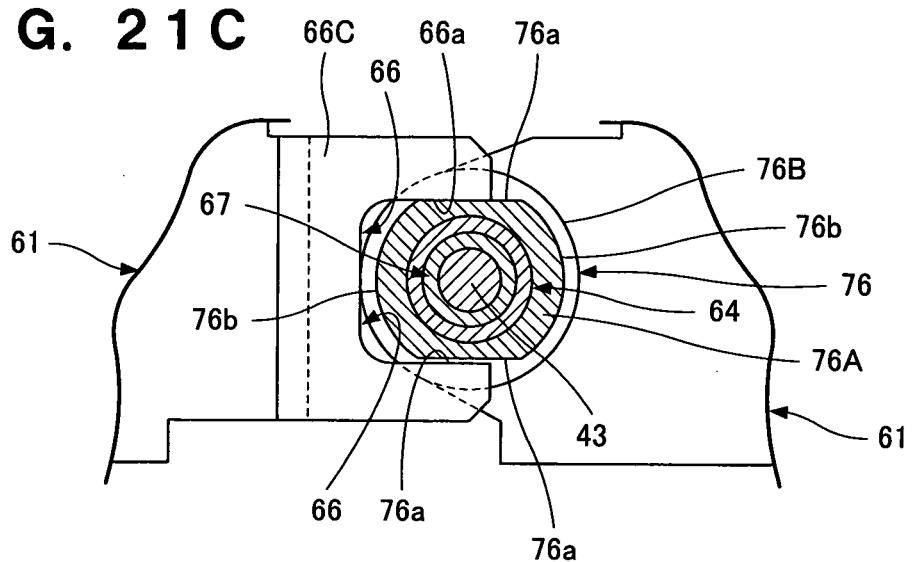
Figure 22:
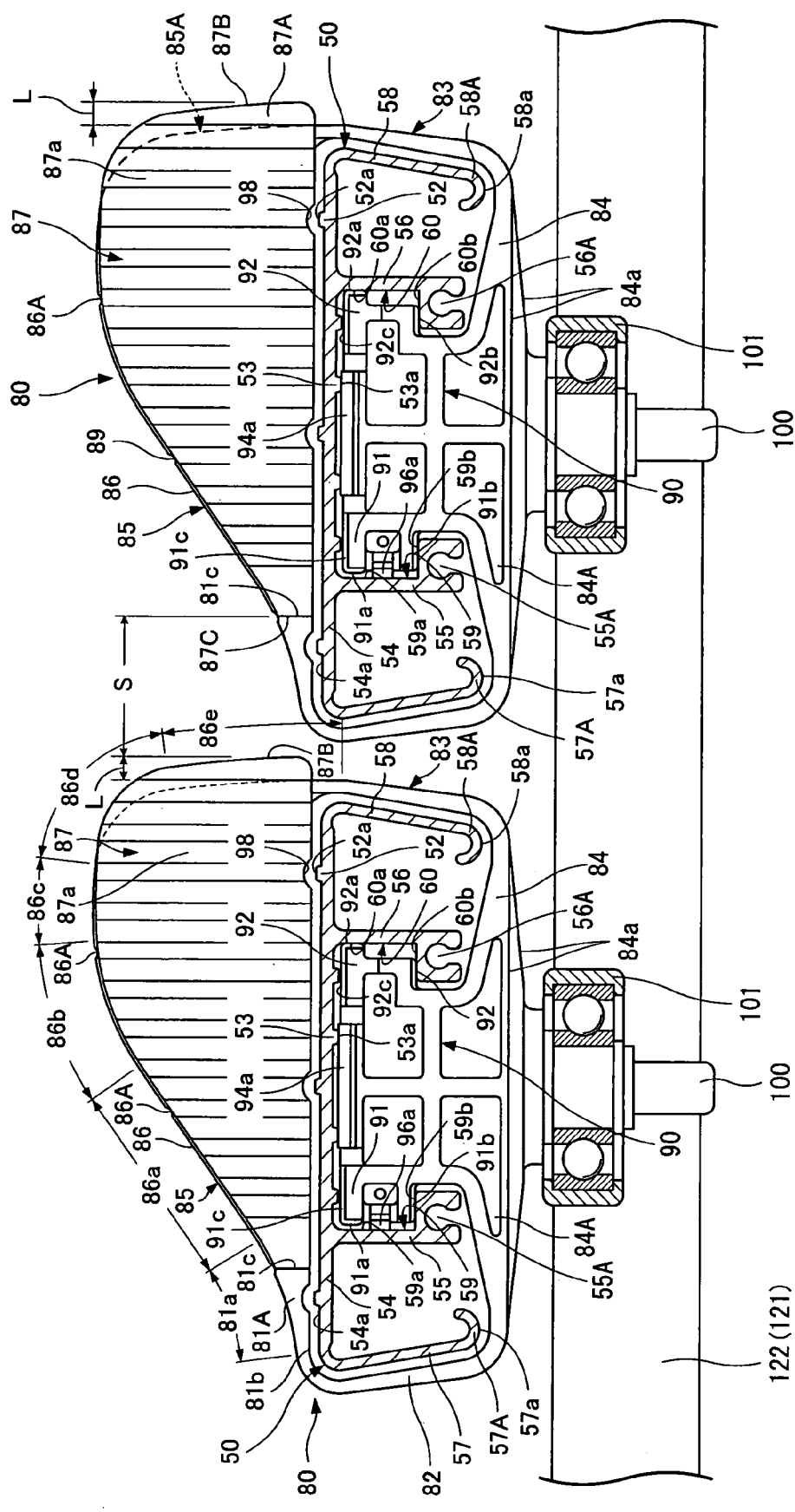
FIG. 22 is a partially cut out side view of a portion of an article support body having an article sidewise push body attached thereto in a conveying apparatus of the third embodiment of the present invention.
Figure 23:
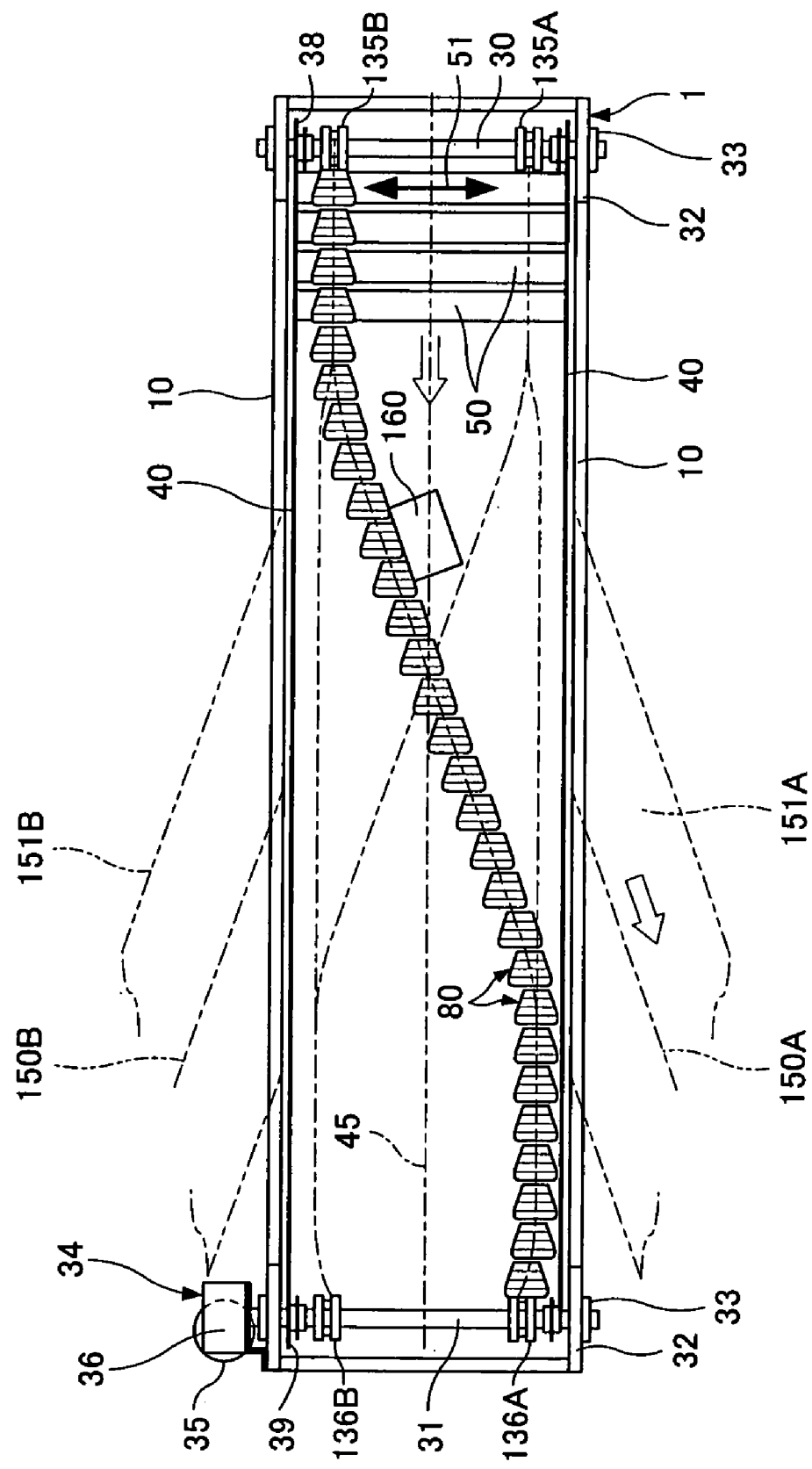
FIG. 23 is a schematic plan view of the conveying apparatus.
Figure 24:
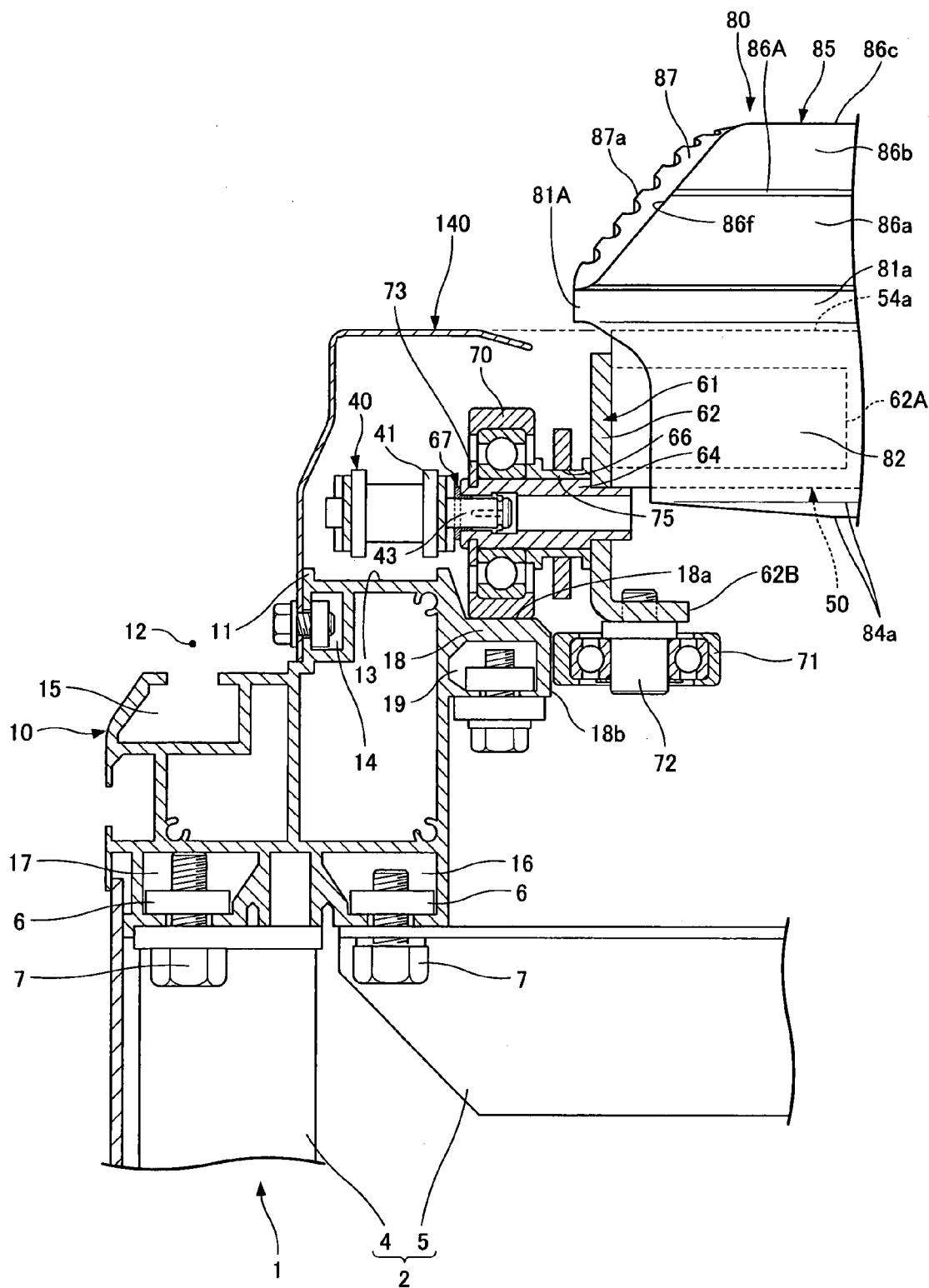
FIG. 24 is a vertical section of a rear surface view of a portion of the upper frame member of the conveying apparatus.
Figure 25:
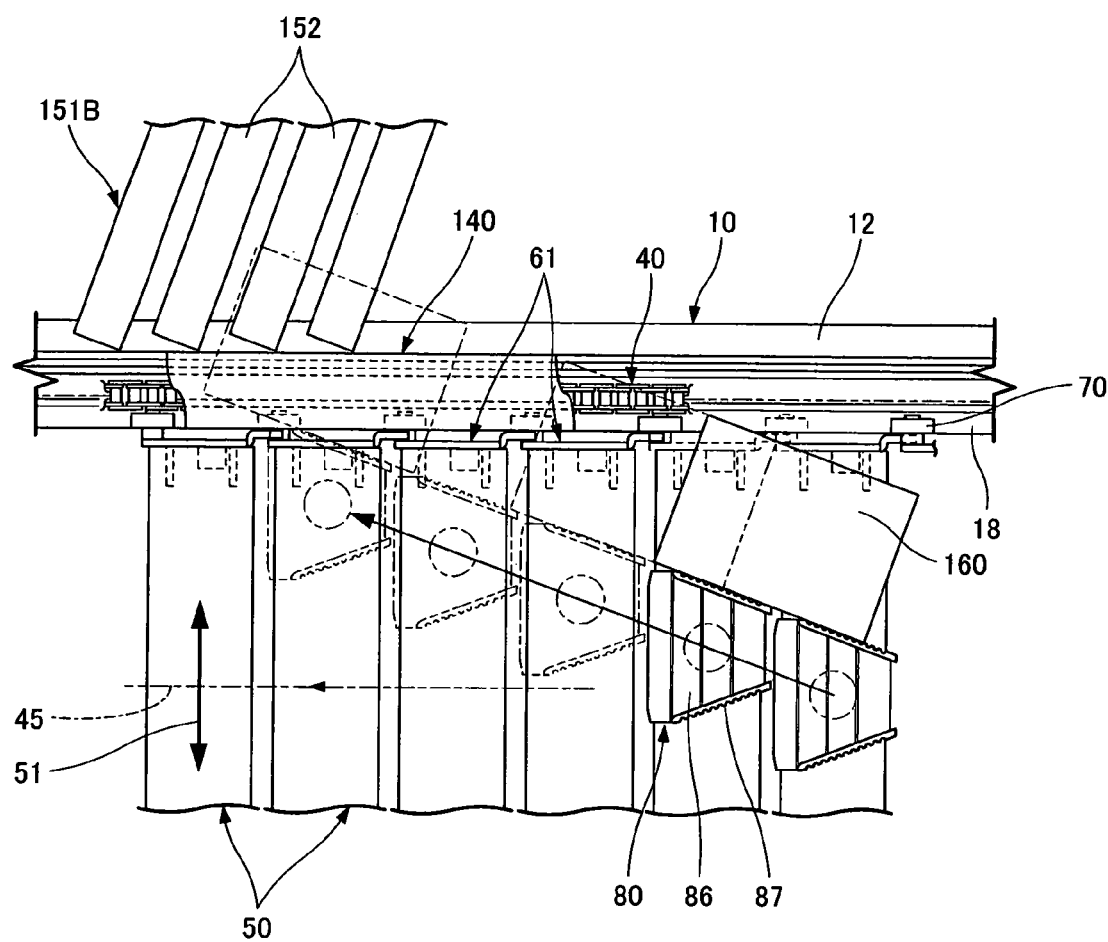
FIG. 25 is a plan view of the main components of the conveying apparatus.
Figure 26:
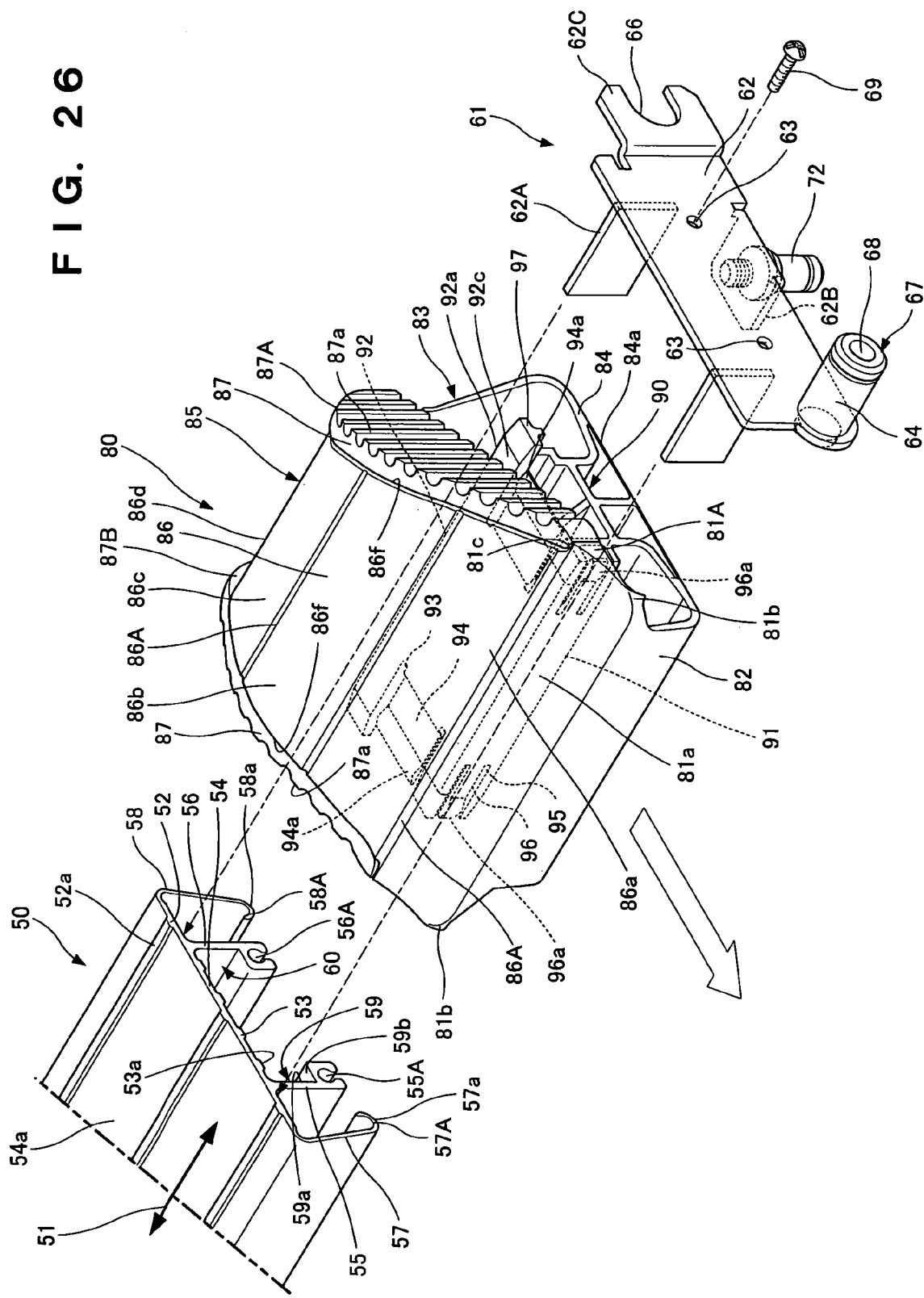
FIG. 26 is an exploded perspective view of an article support body, an article sidewise push body, and a side bracket in the conveying apparatus.
Figure 27:
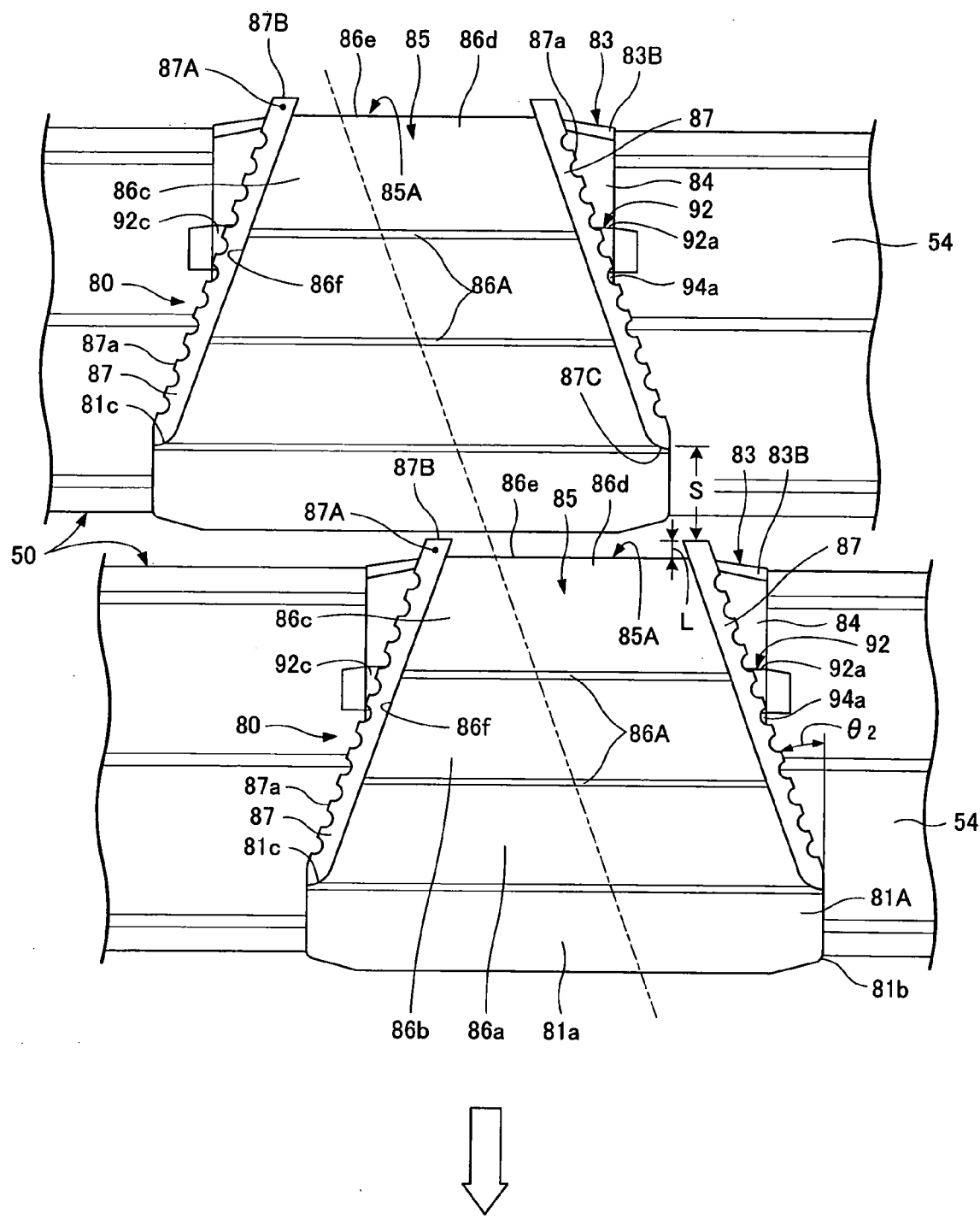
FIG. 27 is a plan view of a portion of the article sidewise push body in the conveying apparatus.
Figure 28:
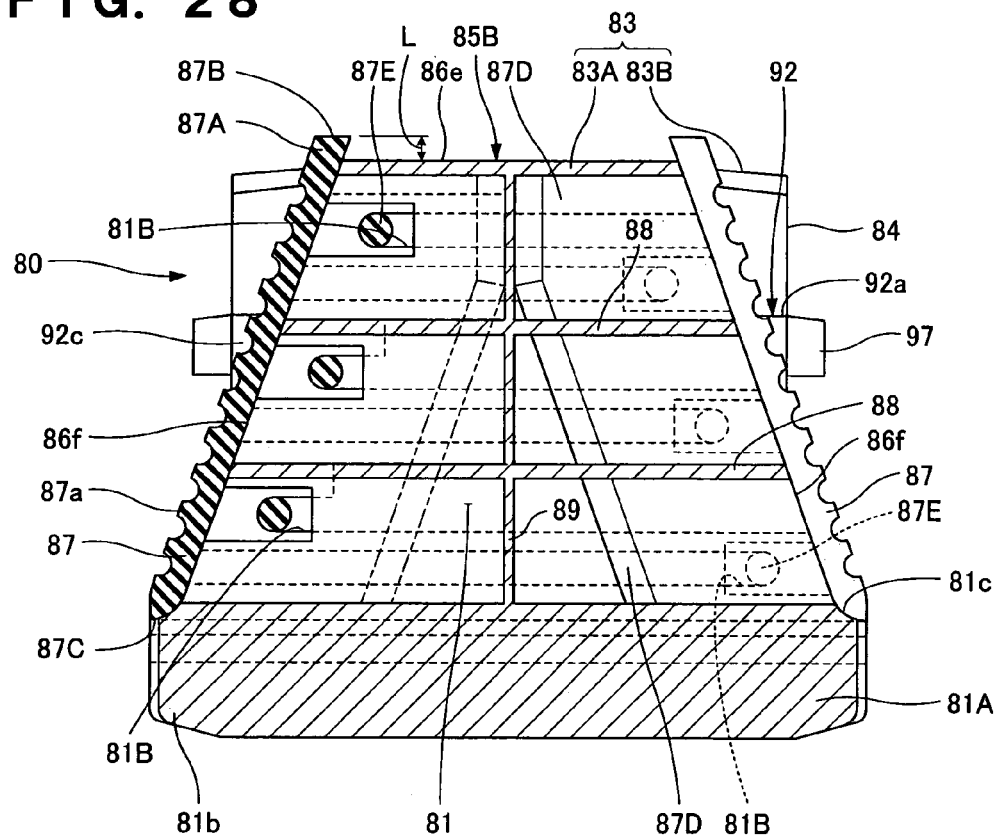
FIG. 28 is a partially cut out side surface view of the article sidewise push body in the conveying apparatus.
Figure 29:
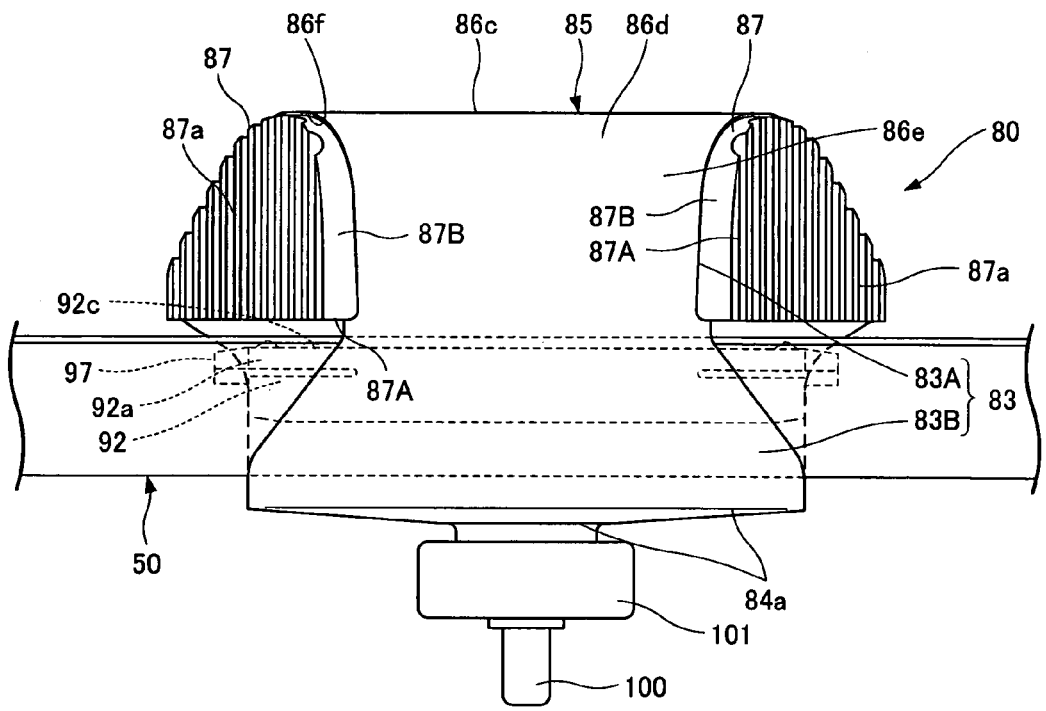
FIG. 29 is a plan view of the article sidewise push body in the conveying apparatus.
Figure 30:
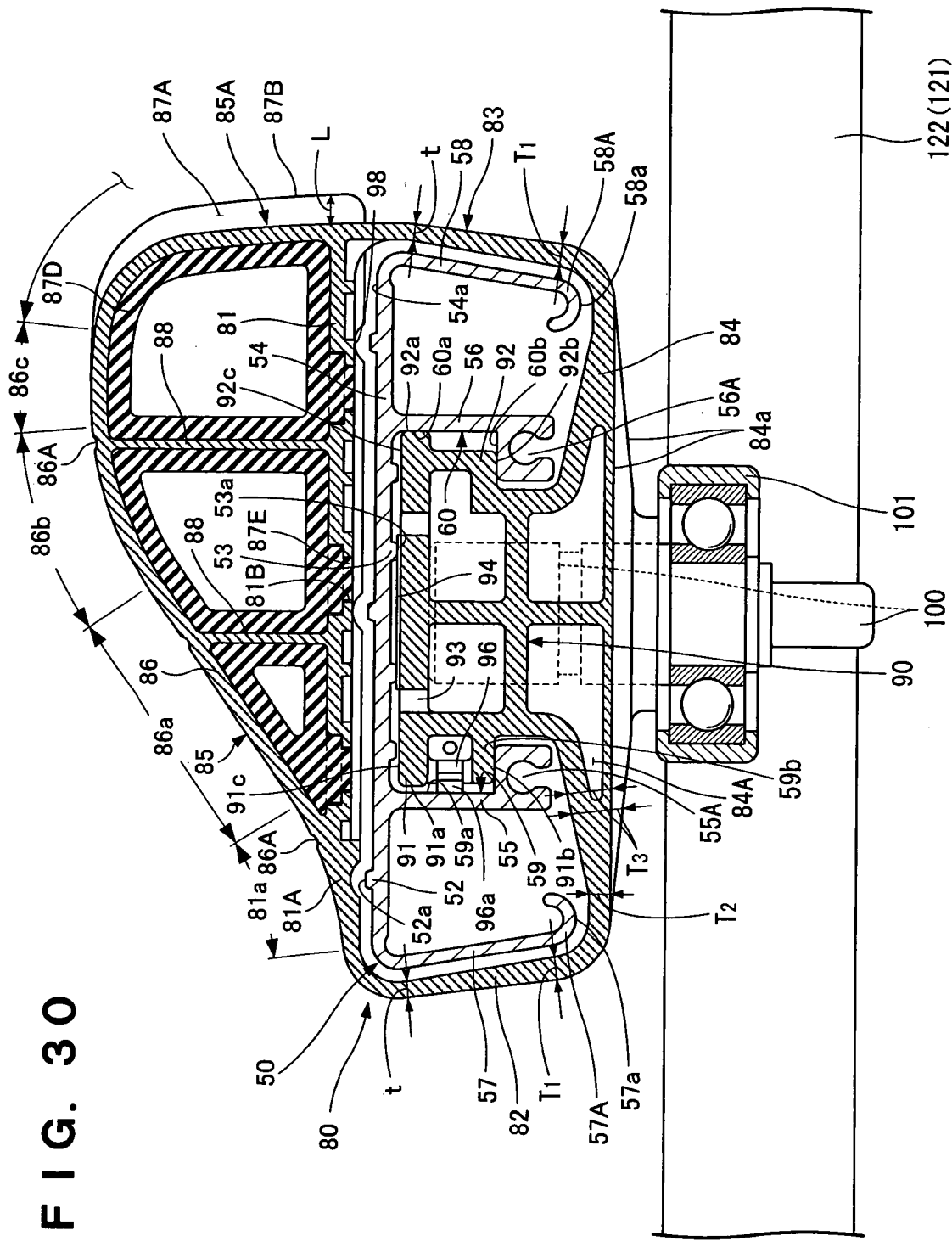
FIG. 30 is a vertical section of a side view of a portion of the article support body having an article sidewise push body attached thereto in the conveying apparatus.

Thus, by contrast with the system employing a regular octagonal mated body 76, in the modification example shown in FIG. 21A, the outer periphery of the tubular body 76A is formed to have a regular hexagonal shape (a regular polygon with an even number of sides) and flat surfaces (an example of "polygon surfaces") 76a are formed in six places. Further, in the modification example shown in FIG. 21B, the outer periphery of the tubular section 76A is formed to have a regular quadrangle shape (a regular polygon with an even number of sides) and flat surfaces (an example of "polygon surfaces") 76a are formed in four places. In the modification example shown in FIG. 21C, the outer periphery of the tubular section 76A is formed by a pair of flat surfaces 76a and a pair of circular-arc surfaces 76b.

In the second embodiment explained hereinabove, the conveying apparatus of a transfer conveyor system was described in which the article sidewise push bodies 80 that were fitted externally on the article support bodies 50 and guided in the lengthwise direction 51 were provided at the article support bodies 50, but the conveyor apparatus may be also of a slat system in which the article sidewise push bodies 80 are omitted.

In the second embodiment explained hereinabove, a system was described in which the endless chain 40 was used as an endless rotary body, and the protruding sections were configured of elongated linking pins 43 that were formed by protruding the predetermined linking pins inwardly, from amongst the group of linking pins 42 that link the links 41 to each other, but a system in which the protruding sections are formed in the predetermined zones of the endless chain 40, or a system using an endless belt having the protruding sections formed in the predetermined zones thereof may be also used.

In the second embodiment explained hereinabove, a system was described in which the article support bodies 50 were attached between the endless rotary bodies (endless chains 40) via the side brackets 61 provided at both ends, the guide rail section 18 was formed above the main frame 1, the upward support surface 18a and sidewise guide surface 18b extending inward were formed at the guide rail section 18, and the guided member (rotary body 70) that was supported and guided by the upward support surface 18a and the guided member (side roller 71) that was guided by the sidewise guide surface 18b were provided at the side bracket 61, but a system in which the sidewise guide surface 18b and guided member are omitted may be also used.

In the second embodiment explained hereinabove, a system was described which comprised the iron mating section 66 and the resin mated body 76, but a system comprising the resin mating section 66 and iron mated body 76 may be also used.

In the second embodiment explained hereinabove, a system was described in which the guided members were composed of rotary bodies 70 that could rotate around the shaft center (linking shaft center 43A) extending along the lengthwise direction 51 and the upper end of the rising section 11 was positioned below the shaft center (linking shaft center 43A), but a system may be also used in which the shaft center (linking shaft center 43A) is positioned below the upper end of the rising section 11.

In the second embodiment explained hereinabove, a system was described in which the article support body 50 was configured as a shaped rail with an open lower surface side, but a configuration without the open lower surface side may be also used.

In the second embodiment explained hereinabove, a system was described in which respective branch conveyors 151A, 151B were provided outwardly on both sides of the main frame 1 and the articles 160 were pushed sidewise, distributed and delivered outwardly at both sides of the main conveying path 45, but a system in which a branch conveyor (151A or 151B) is provided outwardly on one side of the main frame 1 may be also used. Further, the above-described configuration can be also incorporated in conveying apparatus of a system in which articles from a plurality of conveyors are merged in one conveyor or articles from one conveyor are branched to a plurality of conveyors.

In the second embodiment explained hereinabove, a system was described in which the upper frame member 10 and lower frame member 20 were separate members, but a system may be also used in which the lower frame member 20 is in the form of a side plate or side frame.

In the second embodiment explained hereinabove, the sidewise push abutment member 87 was attached in a state in which it was inclined at an angle $\theta_1$ of 30 degrees, but this inclination angle can be set to any value.

The third embodiment of the present invention will be explained hereinbelow with reference to FIGS. 22 to 30.

In an article support body 50 that is configured to have a rail-like shape open at the lower surface side, the upper portions of a group of upward convex sections 52 thereof are formed by a flat surface 52a, and the lower portions of a group of downward convex sections 53 positioned between the leg plate sections 55, 56 are formed by a flat surface 53a. Further, in groove-shaped guide sections 59, 60 that are open at mutually opposing sides, front and rear guide surfaces 59a, 60a are formed by the mutually opposing surfaces, and lower guide surfaces 59b, 60b are formed by the upper surface of a thick section. The upper guide surface is formed by flat surfaces 53a of a group of protruding sections 53 that are downward surfaces of the article carrying plate 54. Further, the lower surface (outer surface) of a front circular arc section 57A and rear circular arc section 58A are formed by downward circular arc surfaces 57a, 58a.

A sidewise push action section 85 is provided on the upper surface side (above) the upper plate member 81 of the article sidewise push body 80 that is fitted externally of the article support body 50 and guided thereby so as to be capable of moving in the lengthwise direction 51. Thus, the sidewise push action section 85 is formed by a top plate member 86 that covers the upper side of the remaining portion (flat portion) of the upper plate member 81, except the front end section 81A, a pair of front and rear (one pair or a plurality of pairs) of rib plate members 88 in the left-right direction that link the top plate member 86 to the upper plate member 81, and rib plate members 89 in the front-rear direction in a left-right centers (one center of a plurality of centers). Here, the group of rib plate members 88, 89 increase the strength of the sidewise push action section 85.

Further, the upper portion of the sidewise push action section 85 is formed by the inclined upper surface 86a in which the middle portion in the front-rear direction is inclined forward and downward, and a start-end concave upper surface 81a that has gradual inclination with respect to the inclined upper surface 86a is formed in the front end portion continuously with the inclined upper surface 86a. Further, the start-end concave upper surface 81a, inclined upper surface 86a, front convex circular-arc upper surface 86b, rear convex circular-arc upper surface 86c, corner surface 86d, and convex circular-arc rear surface 86e are formed continuously in the order of description from the front section to the rear section. Such continuous formation ensures curved configuration of the entire structure in the side view thereof and provides for good appearance.

By making the rear end portion of the top plate member 86 as a convex circular-arc corner surface 86d, for example, when conveying means (e.g., a belt conveyor apparatus; not shown in the figure) for carrying in and carrying out the articles are installed in front and behind the conveying apparatus, if an article sidewise push body 80 that is being reversed comes into contact with a belt or the like, e.g., due to an erroneous operation, the belt can be prevented from damage by contact with the corner surface 86d.

At the upper surface of the top plate member 86, a convex section 86A is formed along the entire length in the left-right direction in the boundary portion of a front end section 81A and a top plate member 86 and in a position above the rib plate members 88 extending in the left-right direction. Therefore, for example, when the sidewise push action section 80 is molded from a resin, the design capabilities can be improved by using effectively the group of convex sections 86A that are produced along the entire length in the portion of the group of the rib plate members 88 extending in the left-right direction.

Further, in a plan view (side surface shape) of the top plate member 86 (sidewise push action section 85) and front end section 81A of the upper plate member 81, the left and right corner sections of the front end section 81A are formed by a circular-arc side surface 81b that has a convex circular arc shape, and a concave side surface 81c that has a concave circular arc shape and recedes sharply is formed continuously with the rear end of the circular-arc side surface. Both side surfaces of the top plate member 86 are formed by rising sidewise inclined surfaces 86f in which the rear section is inclined toward the other side surface with respect to the front section, that is, so that the front end section linked to the concave side surface 81c has a large width and this width decreases gradually, resulting in the formation of a narrow rear end section. As a result, the top plate member 86 is formed to have a trapezoidal shape with an inclination angle $\theta_2$ of 20 degrees in the plan view thereof. The portion of the upper plate member 81, excluding the front end section 81A, and the group of rib plate members 88, 89 are formed so as to be confined within this trapezoidal shape.

The rear end portion 87A of the sidewise push abutment member 87 that is to be detachably attached to a portion of the sidewise inclined surface 86f protrudes rearward by a predetermined length L with respect to the rear end of the sidewise push action section 85, that is, the rear end 85A composed of the corner surface 86d and convex circular arc rear surface 86e. The set length L in this case is set so that a gap S appears between the rear end (rear end surface) 87B of the sidewise push abutment member 87 provided at the article sidewise push body 80 positioned in front and the front end (front end surface) 87C of the sidewise push abutment member 87 provided at the article sidewise push body 80 positioned behind. Here, since the sidewise push abutment member 87 is made from a rubber plate, the rear end portion 87A is formed so that it can be deformed elastically in the left-right direction.

Protruding sections 87D having a deformed tubular shape that can be inserted into cavities of the sidewise push action sections 85 are formed integrally from three front and rear locations (a plurality of front and rear locations) at the inner side surface of the sidewise push abutment member 87, and locking sections 87E are formed in a downward protruding condition from the flat lower surfaces of these protruding sections 87D. A group of engagement hole sections 81B that can be engaged with the group of the locking sections 87E are formed in the upper plate member 81. Here, the engagement hole sections 81B are formed in three front and rear locations (a plurality of front and rear locations) on the left side and three front and rear locations (a plurality of front and rear locations) on the right side so as to avoid the rib plate members 88 in the left-right direction, but the group of engagement hole sections 81B of the left row and the group of the engagement hole sections 81B of the right row are formed in a different manner (with a displacement) in the front-rear direction.

Therefore, the sidewise push abutment member 87 is detachably attached to the sidewise push action section 85 by inserting the protruding sections 87D into the cavities of the sidewise push action section 85 and engaging the group of the locking sections 87E with the group of the engagement hole sections 81B, whereby the inner side surfaces thereof are abutted against the sidewise inclined surface 86f, the convex side surface section of the sidewise push abutment surface 87a becomes connected to the rear end of the circular-arc side surface 81b, and the sidewise push abutment surface 87a becomes inclined forward at an inclination angle $\theta_2$ of 20 degrees, while the rear section becomes inclined to the other side surface. At this time, the sidewise push abutment member 87 is strongly attached due to the engagement of the group of the locking sections 87E and the group of the mating hole sections 81B, and because the left and right row are arranged in a different manner in the front-rear direction, the sidewise push abutment member 87 can be easily formed by resin molding. An example of the sidewise push action section 85 is configured by the above-descried components 86 to 89.

An upward protruding mated section 90 that is to be joined between a pair of leg plate sections 55, 56 is installed on the upper surface side of the bottom plate member 84, and the upper half-portion of the mating section 90 is caused to protrude to opposite sides (outwardly) so as to form thick sections. These thick sections form guided sections 91, 92 that mate with the guide sections 59, 60 and are slidingly guided thereby. Thus, front and rear guided surfaces 91a, 92a that are slidingly guided by the front and rear guiding surfaces 59a, 60a are formed by opposing surfaces (outer surfaces) at the upper end portion of the guided sections 91, 92, the lower guided surfaces 91b, 92b that are slidingly guided by the lower guiding surfaces 59b, 60b are formed by the lower surface, and upper guided surfaces 91c, 92c that face the flat surface 53a of the convex section 53 from below and are slidingly guided thereby are formed by the upper surfaces of the thick sections. As a result, the article sidewise push body 80 is configured so as to be mated with and guided by the guiding sections 59, 60 in the article support body 50 via the front and rear guided sections 91, 92.

Here, in the plan view (upper surface shape), the upper plate member 81 in the article sidewise push body 80 and the top plate member 86 of the sidewise push action section 85 are formed, as described hereinabove, to have a trapezoidal shape such that the front end section thereof is wide, the width decreases gradually, and the rear end section is narrow. Further, the front plate member 82 is formed to have a rectangular plate-like shape such that the width thereof is slightly less than that of the front end section of the upper plate member 81 due to the width reduction caused by the circular arc side surface 81b. The rear plate member 83 is formed to have an inverted T shape by a narrow upper half section 83A connected to the narrow rear end section of the upper plate member 81 and a trapezoidal lower half section 83B that gradually decreases in width and assumes a width equal to a slightly reduced width of the front plate member 82. A bottom plate member 84 is formed to have a rectangular plate shape that is close to a square of a width enabling the connection of the lower ends of the front plate member 82 and rear plate member 83. Thus, the bottom plate member 84 in the form of a rectangular is formed to protrude at both sides of the lengthwise direction 51 with respect to the trapezoidal upper plate member 81 and top plate member 86. As a result, the width of the portion facing a downward circular arc surface 57a of the front circular arc section 57A and a downward circular arc surface 58a of the rear circular arc section 58A can be increased.

Further, the mated section 90 has an elongated shape extending in the lengthwise direction 51 in a plan view thereof, a front guided section 91 is set to a width equal to that of the bottom plate member 84, and the rear guided section 92 is set to a width larger than that of the bottom plate member 84, whereby a stopper section 97 is formed by the protruding portions. With such a configuration, the movement limit in the lengthwise direction 51 is controlled by the stopper section 97 abutting against the inner side surface of a body section 62 in the side bracket 61. The abutment surface of the stopper section 97 has a linear shape, but it may also be a convex circular arc surface protruding outwardly.

An upward elastic body that can come into contact from below with the article carrying plate 54 in the article support body 50 and a forward elastic body that can come into contact from inside with the front leg plate section 55 are provided on the sides of the guided sections 91, 92 of the article sidewise push body 80. Thus, upward tongue bodies (an example of "upward elastic body") 94 are formed via a pair of slits 93 in the direction of the main conveying path 45 between the two guided sections 91, 92 at both end portions of the mating section 90 in the lengthwise direction 51, and these upward tongue piece bodies 94 are configured so that they can be elastically deformed in the up-down direction. Upward abutment portions 94a are formed at the free end of both upward tongue piece bodies 94, and since the abutment portions 94a are formed to protrude upward from the upper surface of the mated section 90, they can elastically abut from below against the article carrying plate 54.

Further, forward tongue piece bodies (an example of "forward elastic body") 96 are formed via a pair of slits 95 in the up-down direction at both end portions of the front guided section 91 in the lengthwise direction 51, and these forward tongue piece bodies 96 are configured so that they can be elastically deformed in the front-rear direction. Forward abutment sections 96a are formed at the free ends of both forward tongue piece bodies 96, and since the abutment sections 96a are formed to protrude forward from the front-rear guided surface 91a, they can elastically abut from inside against the front leg plate section 55.

In the article sidewise push body 80 of the above-described configuration, the upper plate member 81, front plate member 82, and rear plate member 83 are formed to have a non-uniform thickness in parts thereof. Thus, the front plate member 82 and rear plate member 83 are formed so that the thickness thereof increases gradually toward the opposite side (central side) as the two members extend downward with respect to the upper plate member 81.

In other words, the front plate member 57 and rear plate member 58 of the article support body 50 are tapered on the inner side (reduced in width on the inner side) so that they come close to each other as they extend downward with respect to the article carrying plate section 54. Therefore, the thickness $T_1$ of the lower end portion is formed larger than the thickness t of the upper end portion of the front plate member 82 and rear plate member 83 by using the space produced by such a configuration. Further, the thickness $T_2$ of the bottom plate member 84 is formed to be continuous with the thickness $T_1$ of the lower end portion of the front plate member 82 and rear plate member 83 and large accordingly, and the actual plate thickness $T_3$ increases gradually, sandwiching a hollow space 84A with the extension from the portion continuous with the lower end of the front plate member 82 and rear plate member 83 to the central portion. In other words, the components are so formed that $[t<T_1 \approx T_2<T_3]$. Because of such change in thickness, the strength of the entire article sidewise push body 80 is increased without increasing the length (size) of the article sidewise push body 80 in the front-rear direction.

In this case, the bottom plate member 84 is formed to have inclined sections such that the central section thereof is flat and thick and the circumferential portions gradually increase in thickness from the front-rear ends and left-right ends, but the lower surface 84a of the bottom plate member has a flat shape as a whole, thereby preventing it from being caught on other articles. Further, three concave groove sections 98 that face from above the convex section 52 formed in the article carrying plate section 54 of the article support body 50 are formed in the lower surface of the upper plate member 81 in the article sidewise push body 80. An example of the article sidewise push body 80 is configured by the components 81 to 98. Such an article sidewise push body 80 is molded integrally from a synthetic resin, except the sidewise push abutment member 87.

A guided body is attached by using the mating section 90 to the lower side of the article sidewise push body 80. Thus, a roller shaft (an example of "support shaft") 100 is provided vertically from the central portion of the mated section 90, that is, from the central portion between the guided sections 91, 92 by supporting the upper section of the roller shaft by embedded molding. A guide roller (an example of "guided body") 101 is attached, so that it can rotate, to the protruding lower section of the roller shaft 100, whereby the guide roller 101 is positioned outwardly of the rear surface of the article sidewise push body 80. Thus, the upper section of the roller shaft 100 is supported by embedded molding in the central portion between the guided sections 91, 92, whereby support section of the roller shaft 100 can be positioned between the two leg plate sections 55, 56, that is, can be positioned above the circular arc sections 57A, 58A that are the lower ends of the article support body 50. As a result, the guide roller 101 can be disposed close to the circular arc sections 57A, 58A and the height of the article sidewise push body 80 itself can be decreased. In addition, the roller shaft 100 can be firmly supported between the guided sections 91, 92 that have a sufficient height.

The operations of conveying and branching the articles 160 that are performed in the third embodiment will be described below.

Thus, by guiding the guide roller 101 by the group of guide devices 110, 116, the article sidewise push bodies 80 that move integrally with the group of article support bodies 50 when conveying is performed can be moved back and forth in the lengthwise direction 51 of the article support bodies 50 via the guided section 91 and can be moved linearly along the main conveying path 45 together with the article support bodies 50.

If the article sidewise push bodies 80 are thus moved, when the article sidewise push bodies 80 are in an unloaded state and no sidewise movement is performed or when a light load is applied to move lightweight articles 160 sidewise, the abutment sections 94*a* of both upward tongue piece bodies 94 abut from below against the flat surfaces 53*a* of the convex sections 53, the lower guided surfaces 91*b*, 92*b* are pushed against the lower guiding surfaces 59*b*, 60*b* by the push-down force created by the elastic repulsion force thereof by the lower guiding surfaces, and also the abutment sections 96*a* of both forward tongue piece bodies 96 abut from inside against the front and rear guiding surfaces 59*a* of the guiding sections 59 and the front and rear guided surfaces 92*a* are pressed against the front and rear guiding surfaces 60*a* of the guide section 60 by the rear-push force created by the elastic repulsion force thereof by the front and rear guiding surfaces.

As a result, the back and forth movement of the article sidewise push body 80 in the lengthwise direction 51 of the article support body 50 is performed in a state in which the abutment section 94*a* abuts elastically against and slides over the flat surface 53*a*, the lower guided surfaces 91*b*, 92*b* abut against and slide over the lower guiding surfaces 59*b*, 60*b*, the abutment section 96*a* abuts elastically against and slides over the front-rear guiding surface 59*a*, and the front-rear guided surface 92*a* abuts against and slides over the front-rear guiding surface 60*a*.

Further, when the article sidewise push body 80 is in a heavy-load state in which the sidewise push movement of a heavy article 160 is performed, the article sidewise push body 80 is slightly shifted with respect to the article support body 50 by this sidewise-push heavy load. Thus, at the side of abutment against the article 160, the guided sections 91, 92 rise against the elastic force of the upward tongue piece body 94, and the upper guided surfaces 91*c*, 92*c* abut from below against the flat surface 53*a* of the convex section 53, whereas at the side opposite that of abutment against the article 160, the front-rear guided surface 91*a* abuts from inside against the front-rear guiding surface 59*a* against the elastic force of the forward tongue piece body 96.

As a result, the back and forth movement of the article sidewise push body 80 in the lengthwise direction 51 of the article support body 50 is performed in a state in which the upper guided surfaces 91*c*, 92*c* or abutment section 94*a* abuts against and slides over the flat surface 53*a*, the lower guided surfaces 91*b*, 92*b* abut against and slide over the lower guiding surfaces 59*b*, 60*b*, the front-rear guided surface 91*a* or abutment section 96*a* abuts against and slides over the front-rear guiding surface 59*a*, and the front-rear guided surface 92*a* abuts against and slides over the front-rear guiding surface 60*a*.

Therefore, the back and forth movement of the article sidewise push bodies 80 is performed with high stability at all times, without play or sufficient changes in posture (orientation), in a state of mating with and guiding by the guiding sections 59, 60 in the article support bodies 50 via the front and rear guided sections 91, 92, that is, in a state in which advantageous sliding friction occurs. Furthermore, since the group of tongue piece bodies 94, 96 are formed so that they are distributed to both ends in the lengthwise direction 51, the movement of the article sidewise body 80 is performed in a state in which the advantageous sliding friction occurs to the same extent in the forward and return paths.

Further, since the downward convex section 53 is formed at the lower surface of the article carrying plate 54, the lower portion of the convex section 53 is formed at the flat surface 53*a*, and the upper surfaces of the guided sections 91, 92 are formed at the upper guided surfaces 91*c*, 92*c* that face the flat surface 53*a* from below, when the group of article sidewise push bodies 80 move in the lengthwise direction 51, the upper guided surfaces 91*c*, 92*c* slide over the flat surface 53*a*. Therefore, this movement is performed in a state with a low friction resistance and, therefore, the expected movement is performed smoothly, without damaging the article sidewise push bodies 80 or causing wear of article support bodies 50.

As described above, because the group of article sidewise push bodies 80 crosses the main conveying path 45, while moving in the conveying direction, the sidewise push action body 85 pushes the article 160 sidewise, and the article 160 is moved to a branch and transferred to the branch conveyors 151A, 151B. However, because the article 160 is supported between the flat surfaces 52*a* of the group of convex sections 52 and slides over the flat surfaces 52*a* in this process, this branching movement is performed in a state with a small friction resistance. Therefore, the expected branching movement is performed smoothly, without damaging the article 160 or causing wear of article support bodies 50.

In the side portion of the sidewise push action section 85, the sidewise push abutment member 87 is provided by forming the right and left corner portions of the front end section 81A by the circular-arc side surface 81*b* and connecting the sidewise push abutment surface 87*a* to the rear end of the circular-arc side surface 81*b*, and the rear end portion 87A of the sidewise push abutment member 87 is caused to protrude rearward by a set length L with respect to the rear end 85A of the sidewise push action section 85. Therefore, a sidewise push action surface (push surface) created by the sidewise push abutment member 87 can be increased in size (length), whereby a stable sidewise push movement is enabled. At the same time, a spacing S (see FIG. 27) between the sidewise push abutment members 87 in the front and rear article sidewise push bodies 80 is decreased and the expected sidewise push movement can be performed in a state where the article 160 can hardly be clasped. If, for any reason, the article 160 is clasped between the front and rear article sidewise push bodies 80, the rear end portion 87A of the sidewise push abutment member 87 made from a rubber sheet is elastically deformed (bent) in the left-right direction and recedes, whereby the article sidewise push bodies 80 and article 160 are prevented from damage.

As described above, because the group of article sidewise push bodies 80 crosses the main conveying path 45, while moving in the conveying direction, the sidewise push action bodies 85 push the articles 160 sidewise and the articles 160 are moved to the branches and distributed and transferred to the branch conveyors 151A, 151B. However, because the articles 160 located on the article support bodies 50 are carried above the cover body 140 that is fixed to the upper frame member 10 in order to seal the endless chain 40 from above, dust, etc., that has adhered to the articles 160 is prevented from falling down on the endless chain 40.

Figure 31:
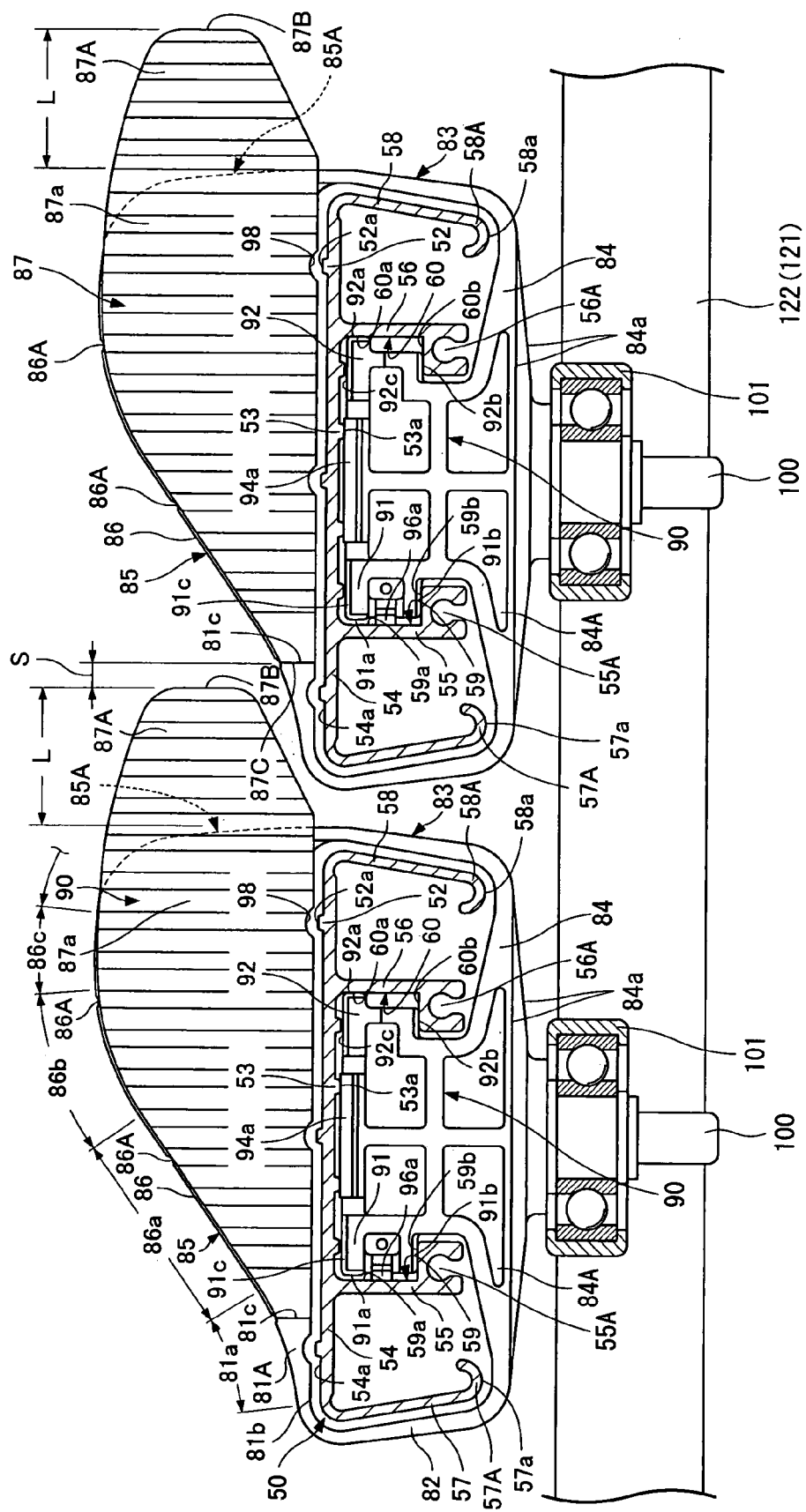
FIG. 31 is a vertical section of a side view of a portion of the article support body having an article sidewise push body attached thereto in the conveying apparatus, this figure illustrating a modification example of the second embodiment.

A modification example of the third embodiment of the present invention will be described below with reference to FIG. 31.

In the third embodiment, the rear end 87B of the rear end section 87A in the sidewise push abutment member 87 is positioned in front of the front surface of the front plate member 82 in the article sidewise push body 80 positioned behind, whereby a spacing S is formed. By contrast, in the modification example, the rear end section 87A in the sidewise push abutment member 87 protrudes by a set length L above the front end section 81A in the article sidewise push body 80 positioned behind. In this case, too, the set length L is so set that the spacing S appears between the rear end (rear end surface) 87B of the sidewise push abutment member 87 provided in the article sidewise push body 80 positioned in front and the front end (front end surface) 87C of the sidewise push abutment member 87 provided in the article sidewise push body 80 positioned behind.

With such a modification example, the sidewise push abutment surface (push action surface) 87a created by the sidewise push abutment member 87 can be increased in size (length).

Another modification example of the third embodiment of the present invention will be described below with reference to FIG. 32.

In the third embodiment, the article sidewise push body 80 was described that had a shape such that both side surfaces of the sidewise push action section 85 were formed by sidewise inclined surfaces 86f and the sidewise push abutment members 87 were provided in portions of these sidewise inclined surfaces 86f, but the article sidewise push body 80 may have a variety of shapes in a plan view thereof.

Figure 32A:
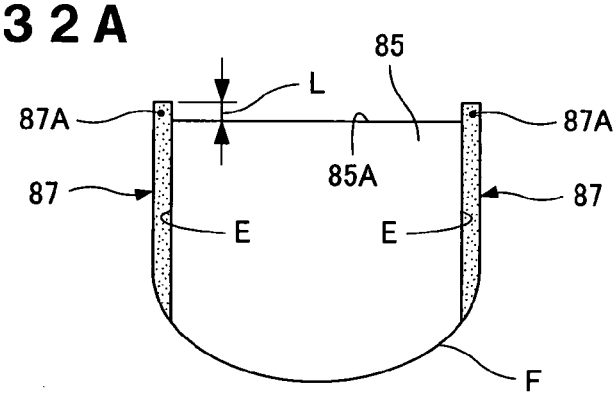
FIGS. 32A to 32D are schematic plan views of the article sidewise push body in respective conveying apparatuses, these figures illustrating another modification example of the second embodiment.

Thus, in another modification example shown in FIG. 32A, the article sidewise push body 80 is presented in which both side surfaces of the sidewise push action section 85 are formed as sidewise linear surfaces E, the sidewise push abutment members 87 are provided in portions of the sidewise linear surfaces E, and the front surface side along the sidewise push action section 85 and both sidewise push abutment members 87 is formed by semicircular surface F.

Figure 32B:
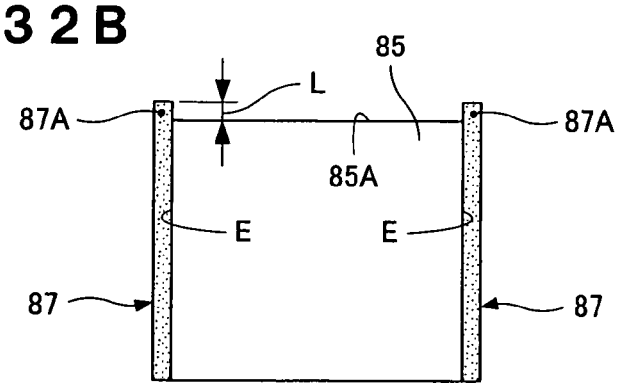

In another modification example shown in FIG. 32B, the article sidewise push body 80 is presented in which both side surfaces of the sidewise push action section 85 are formed as sidewise linear surfaces E and the sidewise push abutment members 87 are provided in portions of the sidewise linear surfaces E, whereby the two sidewise push abutment members 87 are made parallel to each other.

Figure 32C:
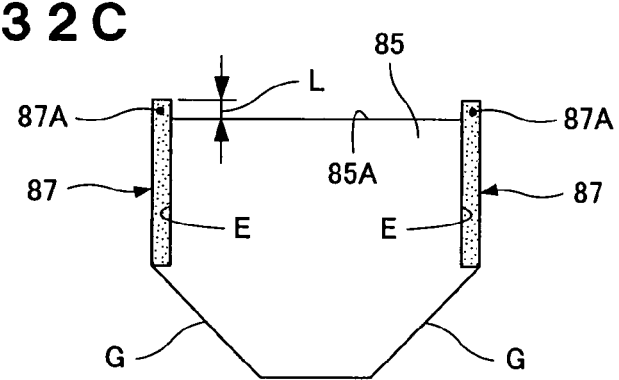

In another modification example shown in FIG. 32C, the article sidewise push body 80 is presented in which both side surfaces of the rear half portion of the sidewise push action section 85 are formed as sidewise linear surfaces E, the sidewise push abutment members 87 are provided in portions of the sidewise inclined surfaces E, and both side surfaces of the front half portions of the sidewise push action section 85 are formed as sidewise inclined surfaces G that are inclined inwardly towards the front.

Figure 32D:
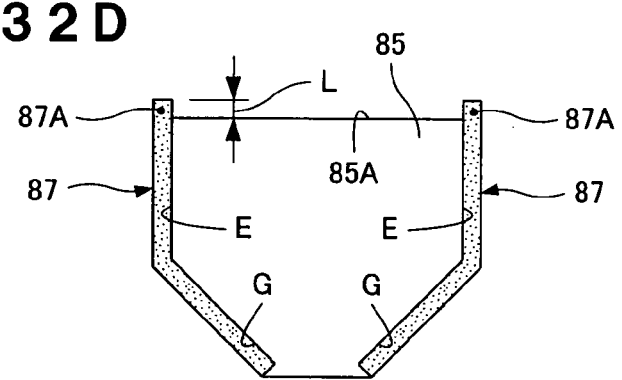

In yet another modification example shown in FIG. 32D, the article sidewise push body 80 is presented in which both side surfaces of the rear half portion of the sidewise push action section 85 are formed as sidewise linear surfaces E, both side surfaces of the front half portion of the sidewise push action section 85 are formed as sidewise inclined surfaces G that are inclined inwardly towards the front, and the sidewise push abutment members 87 are provided from the sidewise linear surfaces E along the sidewise inclined surfaces G.

In the third embodiment, the sidewise push abutment member 87 was attached so as to be inclined at an angle $\theta_2$ of 20 degrees, but this inclination angle can be set to any value.

In the third embodiment, the rear end portion 87A thereof is formed so that it can be deformed elastically in the left-right direction because the sidewise push abutment member 87 is made from a rubber plate, but the sidewise push abutment member may be also formed from an elastically deformable material such as a cellular material (sponge or the like) or resin plate.

In the third embodiment, the rear end portion 87A of the sidewise push abutment member 87 was formed so that it can be deformed elastically in the left-right direction, but the sidewise push abutment member with the rear end portion that is not elastically deformable may be also used.

In the third embodiment, the rear end portion 87A of the sidewise push abutment member 87 was formed integrally, but a configuration is also possible in which the rear end portion 87A is provided as a separate body.

In the third embodiment, the upper portion of the sidewise push action section 85 was formed by the inclined upper surface 86a in which the middle portion in the front-rear direction was inclined forward and downward and the start-end upper surface that had gradual inclination with respect to the inclined upper surface 86a was formed in the front end portion continuously with the inclined upper surface 86a, but a configuration may be used in which the inclined upper surface 86a and start-end upper surface are formed continuously at the same angle.

In the third embodiment, the start-end upper surface was formed at the start-end concave upper surface 81a that had a concave circular arc shape and was formed to rise gradually with a small inclination and the inclined upper surface 86a was formed so as to have a linear shape and to rise gradually an inclination angle larger than that of the start-end concave upper surface 81a, but a configuration in which the start-end concave circular arc upper surface 81a is formed by a linear upper surface or convex circular art upper surface or a configuration in which the inclined upper surface 86a is formed by a concave or convex circular arc upper surface may be also used.

In the third embodiment, the rear end portion in the upper portion of the sidewise push action section 85 was formed by the convex circular art corner surface 86d, but a configuration in which it is formed by a right-angle corner may be also used.

In the third embodiment, in the upper portion of the sidewise push action section 85, the start-end concave upper surface 81a that rose gradually with a small inclination and had a concave circular arc shape, the inclined upper surface 86a that had a linear shape and rose gradually at an inclination angle larger than that of the start-end concave upper surface 81a, the front convex circular-arc upper surface 86b that had a convex circular arc shape and rose gradually, the rear convex circular art upper surface 86c that had a convex circular arc shape and formed an apex section, the corner surface 86d that had a convex circular arc shape and descended, and the convex circular arc rear surface 86e that had a convex circular arc shape and descended were formed continuously from the front section to the rear section, but a configuration in which the entire region of the upper portion of the sidewise push action section 85 is formed by a continuous circular arc surface or a configuration in which the entire region of the upper portion is formed by continuously joining a plurality of linear surfaces also may be used.

In the third embodiment, the side portion of the sidewise push action section 85 was formed by forming the left and right corner sections of the front end section 81A by a circular-arc side surface 81*b* and providing the sidewise push abutment members 87 in a state such that the sidewise push abutment surface 87*a* was connected to the rear end of the circular-arc side surface 81*b*, but a configuration in which the left and right corner sections are in the form of squares or a configuration in which the sidewise push abutment surface 87*a* is formed as a concave or convex step with respect to the circular-arc side surface 81*b*, in the plan view thereof, may be also used.

In the third embodiment, a configuration is described in which the sidewise push abutment member 87 is attached by an engagement system to a portion of the sidewise push inclined surface 86*f* of the sidewise push action section 85, but a configuration in which the sidewise push abutment member 87 is fixed to the portion of the sidewise push inclined surface 86*f* by adhesive bonding or joining with a bolt may be also used.

In the third embodiment, the article support body 50 was composed of a flat article carrying plate 54, leg plate sections 55, 56 that were installed in pairs from the middle section of the lower surface of the article carrying plate 54 and forming guiding sections 59, 60, a front plate section 57 extending downward from the front end of the article carrying plate 54, a front circular arc section 57A facing rearward from the lower end of the front plate section 57, a rear plate section 58 extending downward from the rear end of the article carrying plate 54, and a rear circular arc section 58A facing forward from the lower end of the rear plate section 58, and in the article sidewise push body 80, the guided sections 91, 92 mating with the guiding sections 59, 60 were formed at the upper surface side of the bottom plate member 84 that faced from below the two circular-arc sections 57A, 58A, and the two circular-arc sections 57A, 58A were formed in a position below the lower end of the two leg plate sections 55, 56, but a configuration in which the free end portions of the two circular-arc sections 57A, 58A are linked to the two leg plate sections 55, 56 may be also used.

In the third embodiment, the upward convex section 52 extending in the lengthwise direction 51 was formed at the upper surface 54*a* of the article carrying plate 54, the convex groove section 98 facing the convex section 52 from above was formed at the article sidewise push body 80, and the upper portion of the convex section 52 was formed at the flat surface 52*a*, but a configuration in which the protrusion and recess are inverted, a configuration in which the protrusion or recess is not formed, and a configuration in which the upper portion of the convex section 52 is not a flat surface may be used.

In the third embodiment, a configuration was described in which the guided body (guide roller 101) that was guided by the guiding devices 110, 116 located on the main frame 1 below the article sidewise push body 80 was attached to the protruding lower section of the support shaft (roller shaft 100) that was provided vertically by embedding and supporting the upper section of the guided body in the central portion of the guided sections 91, 92, but a configuration in which the guided body is attached to the support shaft section that is provided integrally in a vertical condition from the lower portion of the article sidewise push body 80 may be also used.

In the third embodiment, a configuration was presented in which the article support body 50 was configured to have a rail-like shape open at the lower surface side, but a configuration in which the article support body is not opened may be also used.

In the third embodiment, a configuration was described in which the endless chain 40 was employed as an endless rotary body, and protruding sections were configured of elongated linking pins 43 that were formed by causing the predetermined linking pins, from amongst the linking pins 42 performing linking between the links 41, to protrude inwardly. However, a configuration in which protruding sections are formed in the predetermined locations of the endless chain 40 or a configuration employing an endless belt with protruding sections formed in the predetermined locations may be also used.

In the third embodiment, a configuration was presented in which branch conveyors 151A, 151B were provided outwardly at both sides of the main frame 1 and the articles 160 were pushed sidewise, distributed and delivered outwardly at both sides of the main conveying path 45. However, a configuration in which a branch conveyor (151A or 151B) is provided outwardly only on one side of the main frame 1 may be also used. Furthermore, the conveying apparatus can be also incorporated in a system in which articles from a plurality of conveyors are merged in one conveyor or articles from one conveyor are branched to a plurality of conveyors.

In the third embodiment, a configuration was presented in which the upper frame member 10 and lower frame member 20 were integrated, but a configuration in which the lower frame member 20 is a side plate or a side frame may be also used.

What is claimed is:

1. A conveying apparatus, configured to comprise an insertion hole section in the direction perpendicular to the rotation direction of an endless rotary body is formed at a side of a moving member linked to the endless rotary body, an inclined expanding surface that has a diameter increasing inwardly is formed at the inner side of the insertion hole section in the insertion direction thereof, a tubular linking body that can be inserted into said insertion hole section is provided, a collar section that can abut against an outer end surface of said moving member side is formed at the outer end of a tubular section of the tubular linking body, an inner end forming portion of the tubular section is formed as a plurality of tongue piece sections split in the circumferential direction, a protruding section that protrudes from said endless rotary body side is configured to be freely inserted from the outside into the tubular section of said tubular linking body, an annular concave section is formed at the inner end portion of the protruding section, the inner side of the annular concave section is formed as an inclined surface that has a diameter increasing inwardly, an outward convex section that can be set opposite said inclined expanding surface from the inside and an inward convex section that can be elastically engaged with said annular concave section are formed at said tongue piece section, when the collar section is abutted against the outer end surface on the side of said moving member the outward convex section is inwardly separated from the inclined expanding surface and the tongue piece section can be withdrawn against elasticity thereof, and when the collar section is separated from the outer end surface the outward convex section is abutted against the inclined expanding surface, thereby preventing the withdrawal motion of the tongue piece section against the elasticity thereof.

2. The conveying apparatus according to claim 1, wherein the endless rotary bodies are installed as a pair of left and right bodies along a main conveying path, and a large number of the moving members, for which a direction perpendicular to the main conveying path is taken as a lengthwise direction, are attached between these endless rotary bodies.

3. The conveying apparatus according to claim 1, wherein the moving members are article support bodies.

4. The conveying apparatus according to claim 3, comprising article sidewise push bodies that are fitted externally on the article support bodies and guided in the lengthwise direction.

5. The conveying apparatus according to claim 1, wherein a side bracket is provided on the side of the moving member, and a tubular body having the insertion hole section formed therein is provided at the side bracket.

6. The conveying apparatus according to claim 1, wherein the endless rotary body is formed of an endless chain, and the protruding section is configured by an elongated linking pin that is formed by causing a predetermined linking pin, from amongst a group of linking pins that perform linking between links, to protrude inwardly.

7. A conveying apparatus comprising a pair of left and right endless rotary bodies installed along a main conveying path and a large number of article support bodies that are attached between the endless rotary bodies and have a direction perpendicular to the main conveying path as a lengthwise direction thereof, both ends of the article support body are linked to the endless rotary body via respective side brackets, a linking section for linking to the endless rotary body is provided protruding outwardly at one of front and rear sections at the outer surface side of these side brackets, a mated body is externally fitted on the linking section so that the mated body can rotate thereon, a mating section in the form of a recess that is open on both inner and outer sides and outwardly on the other side is formed at the other side bracket, this mating section is configured to be freely fitted externally on the mated body in the adjacent side bracket, and said mated body and mating section are mated to slide freely with respect to each other in the rotation direction of the endless rotary body due to surface contact.

8. The conveying apparatus according to claim 7, wherein the outer periphery of the mated body is formed as a regular polygon with an even number of sides, a pair of parallel mating surfaces are formed in the mating section, and a pair of polygonal surfaces displaced by 180 degrees are set opposite these mating surfaces.

9. The conveying apparatus according to claim 7, comprising article sidewise push bodies that are fitted externally on the article support bodies and guided in the lengthwise direction.

10. The conveying apparatus according to claim 7, wherein
an insertion hole section in the lengthwise direction is formed in the linking section, and a protruding section that protrudes from the side of the endless rotary body is configured to be freely inserted from the outside into this insertion hole section.

11. The conveying apparatus according to claim 7, wherein
the endless rotary body is formed of an endless chain, and an elongated linking pin that is formed by causing a predetermined linking pin, from amongst a group of linking pins that perform linking between links, to protrude inwardly is linked to the linking section of the side bracket.

12. The conveying apparatus according to claim 7, wherein
a guide rail section that supports and guides the article support body is provided along the main conveying path, and a guided member that is positioned outside the mated body and guided by said guide rail section is fitted externally on the linking sections.

13. A conveying apparatus comprising a pair of left and right endless rotary bodies installed along a main conveying path, a large number of article support bodies that are attached between the endless rotary bodies and have a direction perpendicular to the main conveying path as a lengthwise direction thereof, and an article sidewise push body that is fit externally on the article support body and guided thereby, wherein the article sidewise push body is provided with a sidewise push action section in the upper section thereof, sidewise push abutment members are provided on both side surfaces of the sidewise action section, and the rear end portions of these sidewise push abutment members are protruded rearward with respect to the rear end of the sidewise push action section.

14. The conveying apparatus according to claim 13, wherein
the rear end portion of the sidewise push abutment member is formed to be elastically deformed in the left-right direction.

15. The conveying apparatus according to claim 13, wherein
both side surfaces of the sidewise push action section are formed as sidewise inclined surfaces in which the rear section is inclined with respect to the front section toward the other side surface, and the sidewise push abutment members are provided in portions of these sidewise inclined surfaces.

16. The conveying apparatus according to claim 13, wherein
the article sidewise push body is configured of a lower rectangular tubular portion and an upper sidewise action section, the sidewise action section that is provided on an upper surface side of an upper plate member of the rectangular tubular portion has a top plate member that covers from above the remaining section excluding a front end section of the upper plate member, and a front end section of the upper plate member is formed at a start-end upper surface that has a concave circular arc shape and rises gradually with small inclination.

17. The conveying apparatus according to claim 13, wherein
a gap is present between the rear end of the sidewise push abutment member provided at the article sidewise push body that is positioned in front and a front end of the sidewise push abutment member provided at the article sidewise push body that is positioned behind.

* * * * *